(12) United States Patent
Kodama et al.

(10) Patent No.: US 7,885,003 B2
(45) Date of Patent: Feb. 8, 2011

(54) OPTICAL DIFFUSING SHEET, OPTICAL DEFLECTING SHEET, AND TRANSMISSION TYPE SCREEN

(75) Inventors: Daijiro Kodama, Shinjuku-Ku (JP); Tsuyoshi Kashiwagi, Shinjuku-Ku (JP); Kei Kato, Shinjuku-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 954 days.

(21) Appl. No.: 11/575,613

(22) PCT Filed: Jan. 11, 2006

(86) PCT No.: PCT/JP2006/300212

§ 371 (c)(1),
(2), (4) Date: Mar. 20, 2007

(87) PCT Pub. No.: WO2006/075617

PCT Pub. Date: Jul. 20, 2006

(65) Prior Publication Data

US 2009/0190211 A1     Jul. 30, 2009

(51) Int. Cl.
G03B 21/60 (2006.01)
(52) U.S. Cl. .................. 359/457; 359/460
(58) Field of Classification Search ........... 359/443, 359/452–453, 457, 460
See application file for complete search history.

(56) References Cited

U.S. PATENT DOCUMENTS

| | | | | |
|---|---|---|---|---|
| 4,739,412 A * | 4/1988 | Lee | .................. | 348/824 |
| 5,743,778 A * | 4/1998 | Arimoto et al. | .................. | 445/8 |
| 6,329,041 B1 * | 12/2001 | Tsuchiya et al. | .................. | 428/195.1 |
| 6,548,177 B2 * | 4/2003 | Hieda et al. | .................. | 428/441 |
| 6,630,235 B2 * | 10/2003 | Oshima et al. | .................. | 428/339 |
| 6,686,031 B2 * | 2/2004 | Matsufuji et al. | .................. | 428/212 |
| 6,773,778 B2 * | 8/2004 | Onozawa et al. | .................. | 428/40.1 |
| 7,005,176 B2 * | 2/2006 | Tojo et al. | .................. | 428/141 |

(Continued)

FOREIGN PATENT DOCUMENTS

JP          63-078139 A1     4/1988

(Continued)

OTHER PUBLICATIONS

Machine tranlation of JP2004-117545 published Apr. 15, 2004.*

*Primary Examiner*—Christopher Mahoney
(74) *Attorney, Agent, or Firm*—Burr & Brown

(57) ABSTRACT

An optical diffusing sheet is provided, which prevents deterioration in image quality which might result from warping of the sheets due to environmental changes, and is capable of, even if a substrate is broken by an accident, preventing scattering of pieces of the broken substrate. An optical diffusing sheet is used in a transmission type screen that emits imaging light projected from an incident side to an emergent side. The optical diffusing sheet includes a highly rigid substrate layer with a light-transmissibility and a high rigidity, and a plurality of layers laminated on the highly rigid substrate layer. The plurality of layers includes at least a pair of anti-scattering layers disposed on opposite sides of the highly rigid substrate layer for preventing scattering of the highly rigid substrate layer. At least one layer of the two or more layers includes an optical diffusing element that diffuses imaging light.

6 Claims, 32 Drawing Sheets

U.S. PATENT DOCUMENTS

| | | | |
|---|---|---|---|
| 7,005,794 B2 * | 2/2006 | Watanabe et al. | 313/489 |
| 7,503,988 B2 * | 3/2009 | Hayashi et al. | 156/64 |
| 2001/0005554 A1 * | 6/2001 | Nakamura et al. | 428/461 |
| 2003/0142375 A1 | 7/2003 | Oshima et al. | |

FOREIGN PATENT DOCUMENTS

| | | |
|---|---|---|
| JP | 63-199338 A1 | 8/1988 |
| JP | 01-307297 A1 | 12/1989 |
| JP | 02-042401 A1 | 2/1990 |
| JP | 02-183241 A1 | 7/1990 |
| JP | 02-252639 A1 | 10/1990 |
| JP | 09-149346 A1 | 6/1997 |
| JP | 10-114006 A1 | 5/1998 |
| JP | 10-128899 A1 | 5/1998 |
| JP | 2001-154274 A1 | 6/2001 |
| JP | 2001-355999 A1 | 12/2001 |
| JP | 2002-006400 A1 | 1/2002 |
| JP | 2002-215056 A1 | 7/2002 |
| JP | 2002-357868 A1 | 12/2002 |
| JP | 2003-098602 A1 | 4/2003 |
| JP | 2003-177482 A1 | 6/2003 |
| JP | 2004-117545 A1 | 4/2004 |
| JP | 2004-133154 A1 | 4/2004 |

* cited by examiner

OPTICAL DIFFUSING SHEET, OPTICAL DEFLECTING SHEET, AND TRANSMISSION TYPE SCREEN

FIELD OF THE INVENTION

The present invention relates to an optical diffusing sheet and an optical deflecting sheet for use in a transmission type screen that emit imaging light projected from a light source to an emergent side, and to a transmission type screen that uses at least one of the optical diffusing sheet and the optical deflecting sheet.

BACKGROUND OF THE INVENTION

In a rear-projection type display device that projects imaging light on a screen from its rear, a transmission type screen has been used as a screen for displaying enlarged imaging light projected thereon. Generally, this transmission type screen has been used by combining an optical deflecting sheet (e.g., Fresnel lens sheet) that collimates imaging light projected from a light source by deflecting the same in parallel light rays, and emits the light to an observation surface side, and an optical diffusing sheet (e.g., lenticular lens sheet) that diffuses imaging light.

The optical deflecting sheet or the optical diffusing sheet used in such a transmission type screen has been conventionally formed by laminating an optical element such as a Fresnel lens or a lenticular lens on a plastic substrate made of, e.g., an acryl resin and a polycarbonate resin.

However, since the plastic substrate is sensitive to changes in the environment typified by temperature, humidity, and so on, the thickness and the size of the substrate tend to vary in accordance with changes in the environment. Thus, there may be a case in which the sheet is warped so as to generate a float (clearance) between the Fresnel lens sheet and the lenticular lens sheet. When imaging light is projected on the transmission type screen under such conditions, there arises a problem of significant decrease in an image quality, such as defocusing, a deterioration in reproducing colors, a double image, and a distorted image. In particular, when the transmission type screen is used in a thin rear-projection television, an angle of incidence of imaging light incident on the transmission type screen is large. Thus, only a small warp or a float generated in the screen considerably deteriorates an image quality of an image projected on the screen. In addition, as compared with a small-sized screen, a large-sized transmission type screen involves a problem in that deterioration in an image caused by a warp or a float, which has been generated by changes in the environment, is more conspicuous. At the same time, the large-sized transmission type screen is more likely to be inflected because of its own weight.

Therefore, a transmission type screen has been developed, that uses a glass substrate which is not easily warped under the influence of changes in the environment such as temperature and humidity.

JP2002-357868A discloses a transmission type screen that includes, in combination, a Fresnel lens sheet (described as "Fresnel lens plate" in the document), and a lenticular lens sheet (described as "lenticular lens plate" in the documents) having a lenticular lens (described as "lenticular lens sheet" in the document) laminated on one surface of a glass substrate. However, this transmission type screen has a problem in that, since a frontmost surface (surface closest to an observation side) of an emergent side of the transmission type screen is provided by the glass substrate, if the glass substrate is damaged by an accident or the like, pieces of broken glass are scattered. In this transmission type screen, mixture of a diffusing agent in the glass substrate is illustrated by way of an example, in order to impart a diffusing effect to the glass substrate. However, there exist the following problems. That is to say, it is not easy to mix a diffusing agent in a glass substrate, which increases the manufacturing cost of the glass substrate. In addition, mixture of a diffusing agent undesirably makes the glass substrate fragile, whereby the glass substrate is liable to be broken.

Besides, JP2001-154274A discloses a structure in which a glass substrate interposed between a lenticular lens sheet and a Fresnel lens sheet is tightly supported by the sheets that have been previously curved in opposite directions by means of a heat treatment. The method disclosed in this Patent Document 2 can be embodied, with use of a Fresnel lens sheet having a Fresnel lens disposed on its incident side. However, when a Fresnel lens sheet having a Fresnel lens disposed on its emergent side (glass-substrate side) is used, this is disadvantageous in that the Fresnel lens is rubbed by the glass substrate which tightly contacts a surface on which the Fresnel lens is disposed.

Further, JP2-183241A discloses a transmission type screen that includes a glass substrate with a Fresnel lens directly formed on one surface thereof, and a plastic sheet with a lenticular lens formed thereon, wherein the plastic sheet is integrally laminated on the other surface of the glass substrate. However, there are the following problems. That is to say, it is not technically easy to directly form a Fresnel lens on a glass substrate, which leads to increase in the manufacturing cost of the glass substrate. Further, it is only one surface of the glass substrate that is protected by the plastic sheet, while the opposite surface of the glass substrate with the Fresnel lens formed thereon is not protected. Thus, if the glass substrate is broken by an accident or the like, pieces of the broken glass substrate are scattered, or the Fresnel lens is scratched or stained by the pieces. Furthermore, there is another problem in that, since a concave portion of the Fresnel lens is concentrically subjected to a stress, the Fresnel lens can be easily broken.

Furthermore, JP2-42401A discloses a screen that includes: a plate-like Fresnel lens sheet having a lens layer attached to a surface of a glass substrate via an ultraviolet curing resin, and a protective layer of an ultraviolet curing resin layer formed on a surface of the lens layer; and another glass substrate attached on the protective layer. However, in the screen disclosed in this document wherein a frontmost surface is provided by the glass substrate, there is a problem in that, if the glass substrate is broken, pieces of the broken glass substrate are scattered.

SUMMARY OF THE INVENTION

The object of the present invention is to provide an optical diffusing sheet and an optical deflecting sheet that are capable of preventing a deterioration in an image quality which might be caused by warps of the sheets because of changes in the environment, and are capable of, even if a substrate is broken by an accident, preventing scattering of pieces of the broken substrate. The another object of the present invention is to provide a transmission type screen including the optical diffusing sheet and/or the optical deflecting sheet.

An optical diffusing sheet according to the present invention is an optical diffusing sheet for use in a transmission type screen that emits imaging light projected from an incident side to an emergent side, comprising: a highly rigid substrate layer with a light-transmissibility and a high rigidity; and two or more layers laminated on the highly rigid substrate layer, the layers including at least a pair of anti-scattering layers disposed on opposite sides of the highly rigid substrate layer for preventing scattering of the highly rigid substrate layer; wherein at least one layer of the two or more layers includes an optical diffusing element that diffuses imaging light.

According to the optical diffusing sheet of the present invention, due to the highly rigid substrate layer with a light-transmissibility and a high rigidity, it is possible to restrain a warp of the optical diffusing sheet, which might be caused by changes in the environment such as temperature and humidity, and also restrain a flexure of the optical diffusing sheet, which might be caused by its own weight. Moreover, since the anti-scattering layers are formed on opposite sides of the highly rigid substrate layer, even when the highly rigid substrate layer is broken by an accident such as a collision, scattering of pieces of the broken substrate can be prevented.

In the optical diffusing sheet according to the present invention, the optical diffusing element may be a lenticular lens that is formed by arranging a plurality of unit optical shape portions each having a refracting surface that refracts at least a part of imaging light incident thereon. Alternatively, in the optical diffusing sheet according to the present invention, the optical diffusing element may be formed by arranging a plurality of unit optical shape portions each having a total reflecting surface that totally reflects at least a part of imaging light incident thereon.

In the optical diffusing sheet according to the present invention, at least one layer of the two or more layers may have a first optical diffusing element formed by arranging along one direction a plurality of unit optical shape portions each having a refracting surface for refracting at least a part of imaging light incident thereon or a total reflecting surface that totally reflects at least a part of imaging light incident thereon; and another layer different from the one layer of the two or more layers may have a second optical diffusing element formed by arranging the plurality of unit optical shape portions along the other direction substantially perpendicular to the one direction. According to the optical diffusing sheet, a viewing angle can be enlarged in two directions perpendicular to each other, e.g., a vertical direction and a lateral direction. Further, according to the optical diffusing sheet, a first light absorbing part for absorbing light can be arranged along one direction to correspond to the first optical diffusing element, and a second light absorbing part for absorbing light can be arranged along the other direction substantially perpendicular to the one direction to correspond to the second optical diffusing element. With the provision of the first light absorbing part and the second light absorbing part, stray light and external light can be effectively absorbed therein, whereby an inconvenience of a double image can be alleviated, and contrast can be enhanced.

An optical deflecting sheet according to the present invention is an optical deflecting sheet for use in a transmission type screen that emits imaging light projected from an incident side to an emergent side, comprising: a highly rigid substrate layer with a light-transmissibility and a high rigidity; and two or more layers laminated on the highly rigid substrate layer, the layers including at least a pair of anti-scattering layers disposed on opposite sides of the highly rigid substrate layer for preventing scattering of the highly rigid substrate layer; wherein at least one layer of the two or more layers includes an optical deflecting element that deflects imaging light by refracting or reflecting the imaging light.

According to the optical deflecting sheet of the present invention, due to the highly rigid substrate layer with a light-transmissibility and a high rigidity, it is possible to restrain a warp of the optical deflecting sheet, which might be caused by changes in the environment such as temperature and humidity, and also restrain a flexure of the optical deflecting sheet, which might be caused by its own weight. Moreover, since the anti-scattering layers are formed on opposite sides of the highly rigid substrate layer, even when the highly rigid substrate layer is broken by an accident such as a collision, scattering of pieces of the broken substrate can be prevented.

In the optical deflecting sheet according to the present invention, the optical deflecting element may be a Fresnel lens. Alternatively, the optical deflecting element may be a prism part formed by arranging a plurality of unit prisms each having an incident surface on which light is incident and a total reflecting surface for reflecting at least a part of light incident on the incident surface.

In the optical deflecting sheet according to the present invention, at least one layer of the two or more layers may include an optical diffusing element that diffuses imaging light incident thereon. In this case, the optical diffusing element may be formed by arranging a plurality of unit optical shape portions each having a total reflecting surface that totally reflects at least a part of imaging light incident thereon. Such an optical deflecting sheet can provide an integrally-formed transmission type screen in which troubles such as a double image can be prevented.

Alternatively, in the optical deflecting sheet according to the present invention, at least one layer of the two or more layers may have a first optical diffusing element formed by arranging along one direction a plurality of unit optical shape portions each having a refracting surface that refracts at least a part of imaging light incident thereon or a total reflecting surface that totally reflects at least a part of imaging light incident thereon; and another layer different from the one layer of the two or more layers may have a second optical diffusing element formed by arranging the plurality of unit optical shape portions along the other direction substantially perpendicular to the one direction. Such an optical deflecting sheet can provide an integrally-formed transmission type screen in which troubles such as a double image can be prevented. According to the optical deflecting sheet, a viewing angle can be enlarged in two directions perpendicular to each other, e.g., a vertical direction and a lateral direction. Further, according to the optical deflecting sheet, a first light absorbing part for absorbing light can be arranged along one direction to correspond to the first optical diffusing element, and a second light absorbing part for absorbing light can be arranged along the other direction substantially perpendicular to the one direction to correspond to the second optical diffusing element. With the provision of the first light absorbing part and the second light absorbing part, stray light and external light can be effectively absorbed therein, whereby an inconvenience of a double image can be alleviated, and contrast can be enhanced.

Besides, in the optical diffusing sheet or the optical deflecting sheet according to the present invention, the highly rigid substrate layer may be formed of glass or translucent ceramic. This constitution can provide an optical diffusing sheet or an optical deflecting sheet with a high degree of flatness, that is not easily warped by changes in the environment such as temperature and humidity.

Further, in the optical diffusing sheet or the optical deflecting sheet according to the present invention, at least one layer of the two or more layers may have a diffusing part that diffuses light. In this case, at least one layer of the two or more layers that is laminated on a position closer to the incident side than the highly rigid substrate layer, and at least one layer of the two or more layers that is laminated on a position closer to the emergent side than the highly rigid substrate layer, may have the diffusing parts, respectively. Due to the provision of the diffusing parts, scintillation (glaring on the screen) can be reduced, a viewing angle can be enlarged, and uniformity in diffusion can be improved.

Furthermore, in the optical diffusing sheet or the optical deflecting sheet according to the present invention, at least one layer of the anti-scattering layers may have at least one of the following functions: diffusing function, anti-reflection function, anti-glaring function, coloring function, dimmer function, ultraviolet absorption function, antistatic function, soil-resistant function, sensing function, or hard-coating function.

Moreover, in the optical diffusing sheet or the optical deflecting sheet according to the present invention, the two or more layers may include a joining layer that is interposed between the highly rigid substrate layer and the anti-scattering layer so as to join the highly rigid substrate layer and the anti-scattering layer to each other. In this case, a diffusing agent and an ultraviolet absorbing agent may be included in the joining layer. When a diffusing agent is included in the joining layer, scintillation (glaring on the screen) can be reduced, a viewing angle can be enlarged, and uniformity in diffusion can be improved. When an ultraviolet absorbing agent is included therein, the screen can be prevented from turning yellow, which might be caused by ultraviolet light.

The present invention is a transmission type screen that includes either one or both of any of the above-described optical diffusing sheets and one of any of the above-described optical deflecting sheets.

DETAILED DESCRIPTION OF THE INVENTION

Embodiments of an optical diffusing sheet, an optical deflecting sheet, and a transmission type screen will be described hereinafter, with reference to the drawings.

In the following embodiments, the transmission type screen includes either one of the optical diffusing sheet and the optical deflecting sheet, or both the optical diffusing sheet and the optical deflecting sheet. A rear-projection type display device is formed by using the thus obtained transmission type screen. The optical diffusing sheet comprises: a highly rigid substrate layer with a light-transmissibility and a high rigidity; and two or more layers laminated on the highly rigid substrate layer, the layers including at least a pair of anti-scattering layers disposed on opposite sides of the highly rigid substrate layer for preventing scattering of the highly rigid substrate layer; wherein at least one layer of the two or more layers includes an optical diffusing element that diffuses imaging light. Such an optical diffusing sheet is a sheet-like member for diffusing imaging light incident thereon. The optical deflecting sheet is for use in a transmission type screen that emits imaging light projected from an incident side to an emergent side, and comprises: a highly rigid substrate layer with a light-transmissibility and a high rigidity; and two or more layers laminated on the highly rigid substrate layer, the layers including at least a pair of anti-scattering layers disposed on opposite sides of the highly rigid substrate layer for preventing scattering of the highly rigid substrate layer; wherein at least one layer of the two or more layers includes an optical deflecting element that deflects imaging light by refracting or reflecting the imaging light. Such an optical deflecting sheet is a sheet-like member for emitting imaging light incident thereon by deflecting the imaging light in a direction substantially perpendicular to the optical deflecting sheet.

The optical diffusing sheet, the optical deflecting sheet, and the transmission type screen are described below, based on some concrete embodiments. However, it should be noted that the present invention is not limited to the following embodiments.

First Embodiment

Figure 1:
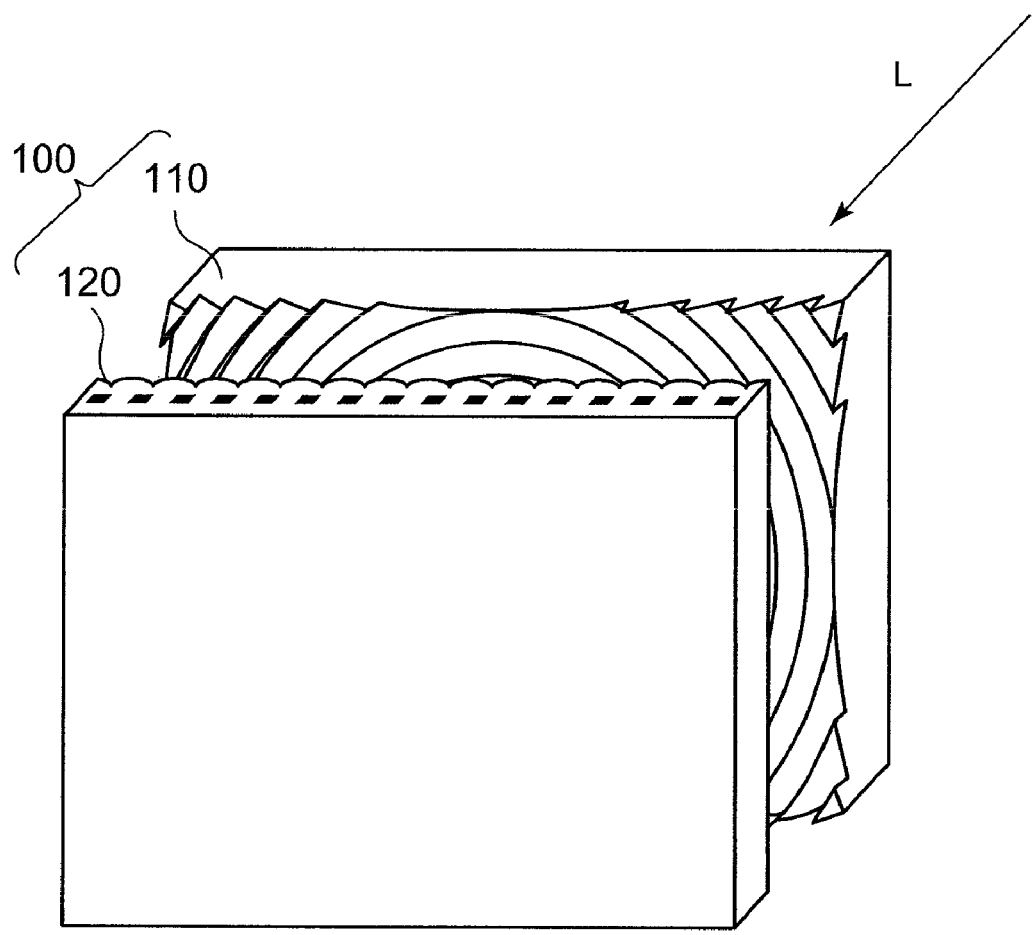
FIG. 1 is a perspective view of a first embodiment of a transmission type screen according to the present invention.
Figure 1:
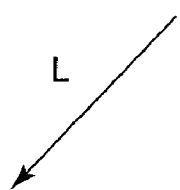
Figure 2:
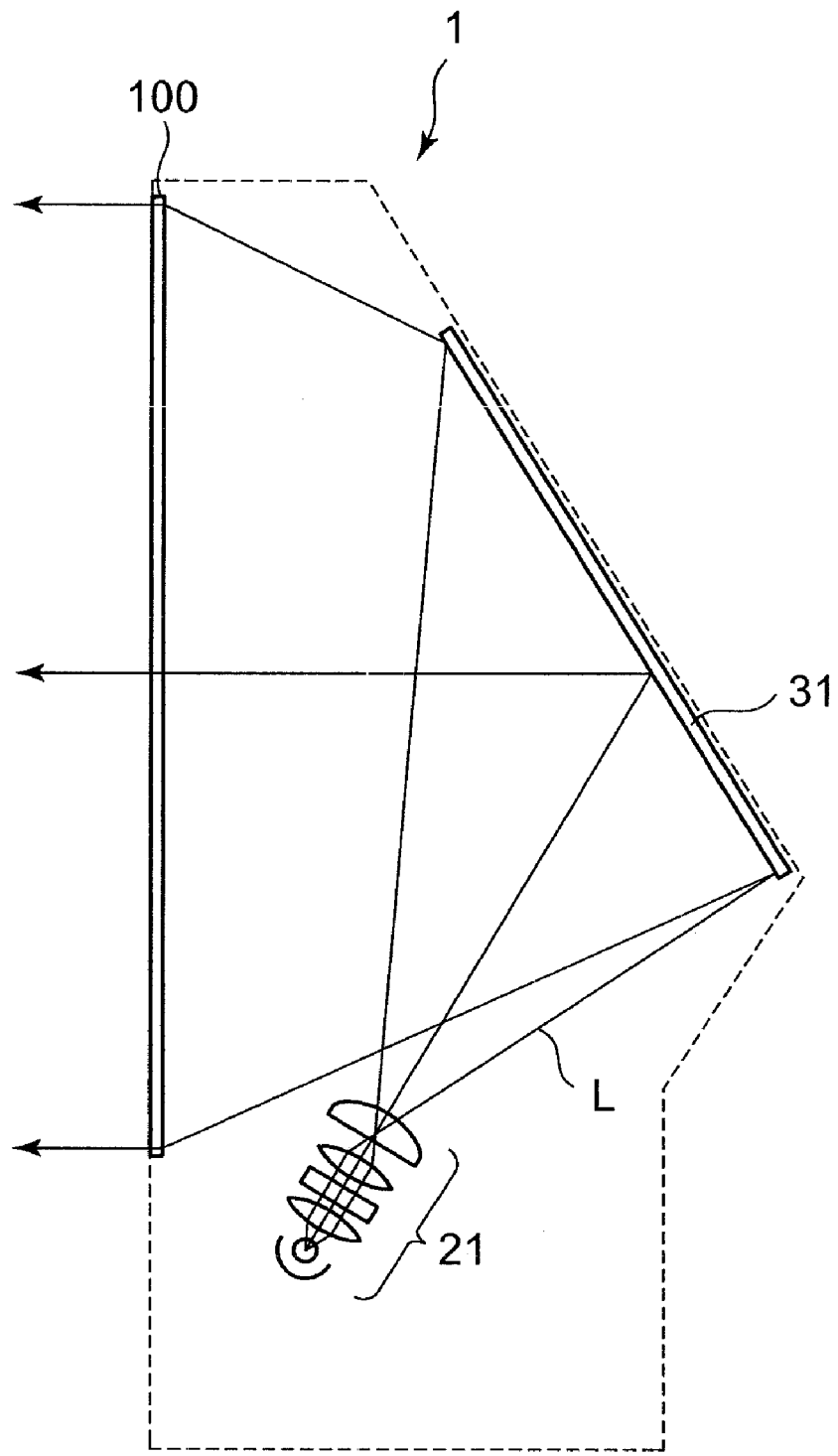
FIG. 2 is a sectional view of a rear projection television using the first embodiment of the transmission type screen.

FIG. 1 is a view of a first embodiment of a transmission type screen according to the present invention. FIG. 2 is a sectional view of a rear projection television using the first embodiment of the transmission type screen.

As shown in FIG. 1, the transmission type screen 100 in the first embodiment includes an optical deflecting sheet disposed on an incident side (light source side) of imaging light L, and an optical diffusing sheet disposed on an emergent side (observation surface side) of the imaging light L. The transmission type screen 100 is positioned on an image-formation surface of the imaging light L. In this transmission type screen, the optical diffusing sheet is formed as a lenticular lens sheet having a lenticular lens, while the optical deflecting sheet is formed as a Fresnel lens sheet having a Fresnel lens.

As shown in FIG. 2, the rear projection television 1 is an image display device of rear-projection type that includes: the transmission type screen 100, a light source part 21 disposed on an opposite side (hereinafter also referred to as "incident side") of the transmission type screen 100 relative to the observation surface side; and a mirror part 31 for reflecting the imaging light L projected from the light source part 21. In this embodiment, the light source part 21 is of a single tube type using a DMD.

Figure 3:
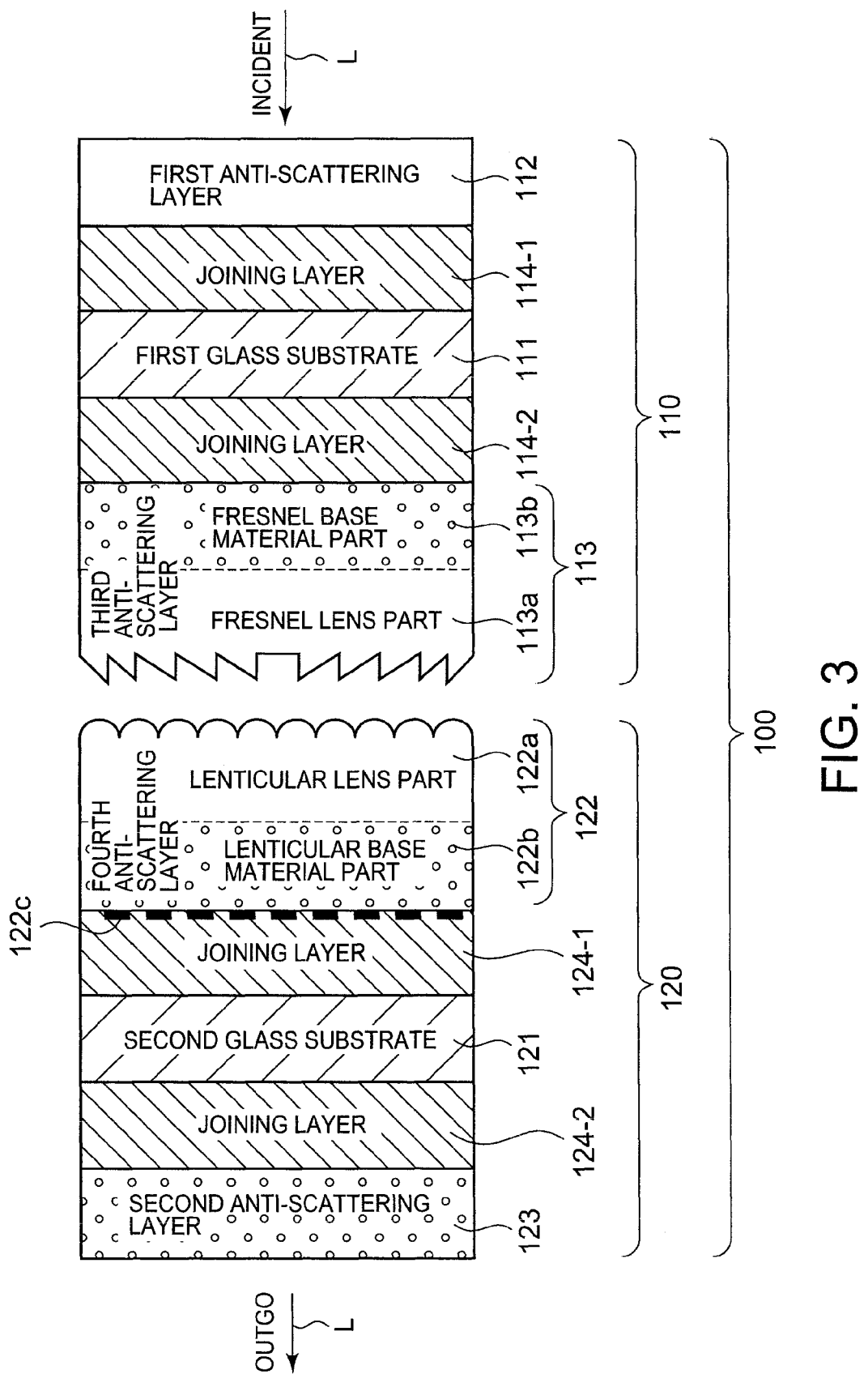
FIG. 3 is a schematic view of a layer structure of the first embodiment of the transmission type screen.

FIG. 3 is a schematic view of a layer structure of the first embodiment of the transmission type screen. A traveling direction of the imaging light L is designated by an arrow in FIG. 3, and in the views schematically showing a layer structure of the transmission type screen, which are referred to hereinbelow. In the respective views, a layer in which circles are distributed denotes a layer that contains a diffusing agent for diffusing light without directivity.

(Fresnel Lens Sheet (Optical Deflecting Sheet))

The Fresnel lens sheet 110 is described at first. As shown in FIG. 3, the Fresnel lens sheet 110 includes a first glass substrate 111, a first anti-scattering layer 112, a third anti-scattering layer 113, and joining layers 114-1 and 114-2. The Fresnel lens sheet 110 is disposed on the incident side of the transmission type screen 100.

The first glass substrate (highly rigid substrate layer) 111 in this embodiment is a glass plate formed of silicate glass. The first glass substrate 111 has a high light-transmissibility and a high rigidity. A thickness of the glass plate used in the first glass substrate 111 is preferably in a range between 1.5 mm to 3 mm. In this embodiment, the glass plate is 2 mm in thickness. It is preferable that a transmittance of the first glass substrate 111 relative to light whose wavelength band is between 400 nm and 700 nm be equal to or more than 90%.

The joining layer 114-1 is a layer for integrally joining the first glass substrate 111 and the below-described first anti-scattering layer 112, while the joining layer 114-2 is a layer for integrally joining the first glass substrate 111 and the below-described third anti-scattering layer 113. The joining layers 114-1 and 114-2 are formed of an ultraviolet-curing type acryl resin which is cured by an ultraviolet irradiation. A thickness of each of the joining layers 114-1 and 114-2 may be 100 μm, for example. The joining layer 114-1 is interposed between the first glass substrate 111 and the first anti-scattering layer 112. The joining layer 114-2 is interposed between the first glass substrate 111 and the third anti-scattering layer.

The first anti-scattering layer 112 is integrally laminated on the incident side of the first glass substrate 111 through the joining layer 114-1. If the first glass substrate 111 is, for example, broken and damaged, the first anti-scattering layer 112 exhibits a function for preventing scattering of pieces of the damaged first glass substrate 111. In this embodiment, the first anti-scattering layer 112 is an all-purpose anti-reflection sheet having a function of preventing reflection, that is formed of an acryl resin or the like, with a thickness of 80 μm.

The third anti-scattering layer 113 is integrally laminated on the emergent side of the first glass substrate 111 through the joining layer 114-2. If the first glass substrate 111 is, for example, broken and damaged, the third anti-scattering layer 113 exhibits a function for preventing scattering of pieces of the damaged first glass substrate 111. The third anti-scattering layer 113 includes an optical deflecting element base material part (Fresnel base material part) 113b, and an optical deflecting element (Fresnel lens part) 113a that is formed on one surface of the Fresnel base material part 113b by using an ultraviolet curing resin. The third anti-scattering layer 113 as a layered body composed of the Fresnel base material part 113b and the Fresnel lens part 113a is further laminated on the first glass substrate 111.

The Fresnel base material part 113b is a member that serves as a base for the third anti-scattering layer 113. A thickness of the Fresnel base material part 113b may be, e.g., 200 μm. The Fresnel base material part 113b may be formed of an acryl resin, in which glass beads are mixed as a diffusing agent, so as to function as a diffusing part for diffusing light. It is preferable to use glass beads each having a diameter equal to or more than 1 μm, in order that the diffusion does not depend on a wavelength of light. Herein, the "diffusing part" means a part having a diffusing function without directivity, that is, for example, formed by: dispersing particles formed of organic or inorganic compounds in a member serving as a base material; coating a surface of the member with particles formed of organic or inorganic compounds; or providing fine irregular-shaped portions on the surface of the member.

The Fresnel lens part (optical deflecting element) 113a is integrally formed on the emergent side of the Fresnel base material part 113b. The Fresnel lens part 113a functions as a Fresnel lens that refracts the imaging light L incident thereon from the incident side in a predetermined direction, and emits the imaging light L to the emergent side as parallel light rays. The Fresnel lens part 113a may be formed by means of a die for molding a Fresnel lens, not shown, having an inverted shape of the Fresnel lens. Specifically, a molding die is heated at first, and a surface of the molding die is coated with an ultraviolet curing resin. Then, the Fresnel base material part 113b is compressively laminated on the ultraviolet curing resin filled in the die, with maintaining a temperature of the coated ultraviolet curing resin. Thereafter, the ultraviolet curing resin is irradiated with an ultraviolet light so as to be cured, and the cured resin is peeled from the die. In this manner, the Fresnel lens part 113a can be integrally formed on the Fresnel base material part 113b. The ultraviolet curing resin is preferably urethane acrylate, epoxy acrylate, and so on, but is not specifically limited thereto.

(Lenticular Lens Sheet (Optical Diffusing Sheet))

Next, the lenticular lens sheet 120 is described. As shown in FIG. 3, the lenticular lens sheet 120 includes a second glass substrate 121, a second anti-scattering layer 123, a fourth anti-scattering layer 122, and joining layers 124-1 and 124-2. The lenticular lens sheet 120 is an optical diffusing sheet that diffuses the imaging light L by refracting the same, and is disposed on the emergent side of the transmission type screen 100.

Similar to the first glass substrate 111, the second glass substrate (highly rigid substrate layer) 121 is a glass plate formed of silicate glass, with a thickness of, e.g., 2 mm. The second glass substrate (highly rigid substrate layer) 121 has a high light-transmissibility and a high rigidity, and preferably has a transmittance of equal to or more than 90% relative to light whose wavelength band is between 400 nm and 700 nm, similar to the first glass substrate 111. The joining layer 124-1 is a layer for integrally joining the second glass substrate 121 and the fourth anti-scattering layer 122, while the joining layer 124-2 is a layer for integrally joining the second glass substrate 121 and the second anti-scattering layer 123. Each of the joining layers 124-1 and 124-2 is a layer which is formed of, e.g., an ultraviolet-curing type acryl resin, and has a thickness of 100 µm.

The fourth anti-scattering layer 122 is integrally laminated on the incident side of the second glass substrate 121 through the joining layer 124-1. If the second glass substrate 121 is damaged, the fourth anti-scattering layer 122 exhibits a function for preventing scattering of pieces of the damaged second glass substrate 121. The fourth anti-scattering layer 122 includes: an optical diffusing element base material part (lenticular base material part) 122b; an optical diffusing element (lenticular lens part) 122a formed on one surface of the lenticular base material part 122b by using a thermoplastic resin; and light absorbing parts 122c for absorbing light that are formed on the lenticular base material part 122b on a surface thereof which does not face the lenticular lens part 122a. In this case, the fourth anti-scattering layer 122 may be formed by extrusion molding. In this embodiment, the lenticular lens part 122a is formed by using a thermoplastic resin by way of example. However, not limited thereto, the lenticular lens part 122a may be formed by curing an ultraviolet curing resin or the like on the optical diffusing element base material part (lenticular base material part) 122b formed of a polyethylene terephthalate resin, similar to the Fresnel lens part 113a. The fourth anti-scattering layer 122 as a layered body composed of the lenticular base material part 122b and the lenticular lens part 122a is further laminated on the second glass substrate 121.

The lenticular base material part 122b is a sheet-like member with a thickness of, e.g., 200 µm, that serves as a base for the fourth anti-scattering layer 122. The lenticular base material part 122b may be formed of an acryl resin in which glass beads are mixed as a diffusing agent, to function as a diffusing part.

The lenticular lens part 122a is an optical diffusing element that is integrally formed on an incident-side surface of the lenticular base material part 122b. The optical diffusing element is an optical element including a lens shape or prism shape having a light diffusing effect, and is constituted by arranging a plurality of unit optical shape portions that refract or reflect light. The lenticular lens part 122a is formed by arranging, along one direction substantially perpendicular to a line normal to the lenticular base material part 122b, for example, along a horizontal direction or vertical direction, a plurality of unit lenses (unit optical shape portions) having a function of diffusing imaging light. The unit lenses have almost semielliptic-shaped cross-sections, and protrude toward the incident side. The unit lenses are unit optical shape portions each having a refracting surface that refracts at least a part of imaging light incident thereon. The light absorbing parts 122c are arranged so as to form a stripe pattern on an emergent-side surface of the lenticular base material part 122b at areas through which the imaging light does not pass. Thus, the arranging direction of the light absorbing parts 122c and that of the unit lenses (unit optical shape portions) conform to each other.

The second anti-scattering layer 123 is integrally joined to the emergent side of the second glass substrate 121 through the joining layer 124-2. If the second glass substrate 121 is, for example, broken and damaged, the second anti-scattering layer 123 exhibits a function for preventing scattering of pieces of the damaged second glass substrate 121. The second anti-scattering layer 123 may be formed by substantially uniformly mixing glass beads as a diffusing agent in a polyethylene terephthalate resin or the like, and may be a sheet-like member which is 188 µm in thickness, for example. In this case, the second anti-scattering layer 123 functions as a light diffusing part for diffusing light without directivity.

The transmission type screen 100 composed of, in combination, the lenticular lens sheet 120 and the Fresnel lens sheet 110 in this embodiment provides the following effects. The Fresnel lens sheet 110 and the lenticular lens sheet 120 respectively include the first glass substrate 111 and the second glass substrate 121 as substrates. Thus, it is possible to restrain the generation of a warp and a float of the Fresnel lens sheet 110 or the lenticular lens sheet 120, which might be caused by changes in the environment such as temperature and humidity. It is also possible to restrain the generation of a flexure of the Fresnel lens sheet 110 or the lenticular lens sheet 120, which might be caused by their own weights. As a result, distortion of an image can be prevented, while a high degree of flatness of the sheets can improve an image quality.

In the Fresnel lens sheet 110, the first and third anti-scattering layers 112 and 113 are integrally laminated on the opposite surfaces of the first glass substrate 111. In the lenticular lens sheet 120, the second and fourth anti-scattering layers 123 and 122 are disposed on the opposite surfaces of the second glass substrate 121. Thus, if the first or second glass substrate 111 or 121 is damaged by an accident or the like, during an operation where the Fresnel lens sheet 110 or the lenticular lens sheet 120 is independently handled, scattering of pieces of the damaged substrate can be prevented.

In the transmission type screen 100 using the Fresnel lens sheet 110 and the lenticular lens sheet 120, a surface closest to the incident side and a surface closest to the emergent side of the transmission type screen 100 are respectively covered with the anti-scattering layers. Thus, if the first and the second glass substrates 111 and 121 in the transmission type screen 100 are cracked or broken by an accident such as a collision, scattering of pieces of the cracked or broken substrates can be prevented.

Since the first anti-scattering layer 112 is an anti-reflection sheet having a function of preventing reflection, when the imaging light L enters the transmission type screen 100, the first anti-scattering layer 112 reduces stray light which is generated by the reflection of the imaging light L on a surface closest to the incident side (surface closest to the light source) of the transmission type screen 100. Thus, the generation of a double image (ghost), which is caused when the stray light is reflected again by the mirror part 31 so as to re-enter the transmission type screen 100, can be reduced so as to thereby enhance an image quality.

The lenticular base material member 122b and the second anti-scattering layer 123 include therein substantially uniformly mixed glass beads as a diffusing agent so as to function as diffusing parts. Thus, a viewing angle can be enlarged, while a uniformity of diffusion can be improved. In addition, it is possible to reduce scintillation (glaring on the screen) which tends to be generated because of the use of the light source part of a single tube type such as a DMD. Therefore, an image of a high quality can be provided to an observer.

The Fresnel base material member 113b and the lenticular base material part 122b include therein substantially uniformly mixed glass beads as a diffusing agent so as to function as diffusing parts. Thus, it is not required to additionally dispose a diffusing layer having a diffusing effect, which can result in the reduced number of layers in the entire transmission type screen 100. As a result, a thickness and a weight of the transmission type screen 100 can be reduced, and the manufacturing process of the transmission type screen 100 can be simplified:

(Modifications of First Embodiment)

Figure 4:
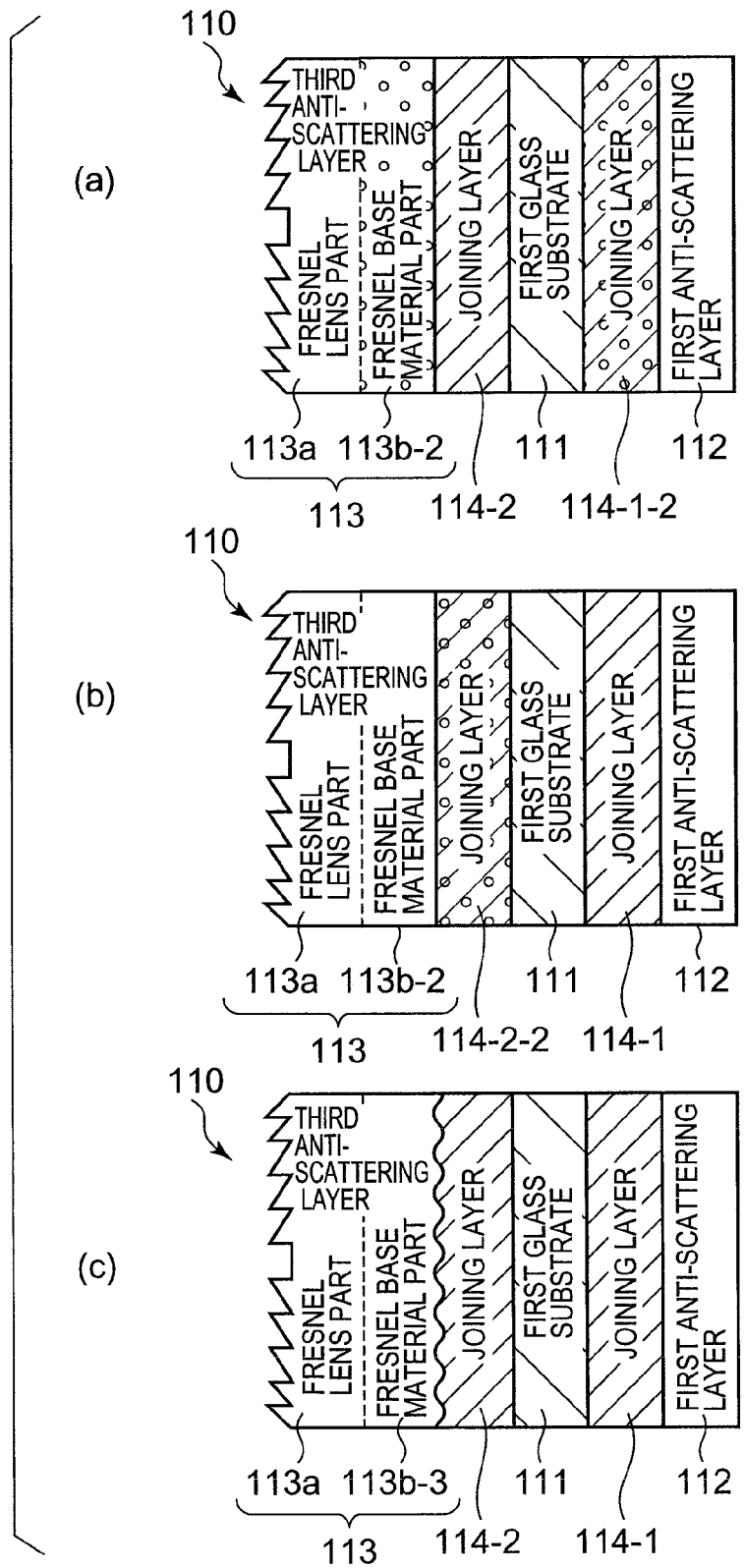
FIG. 4 is a schematic view of a layer structure of a modification of a Fresnel lens sheet of the first embodiment of the transmission type screen.
Figure 5:
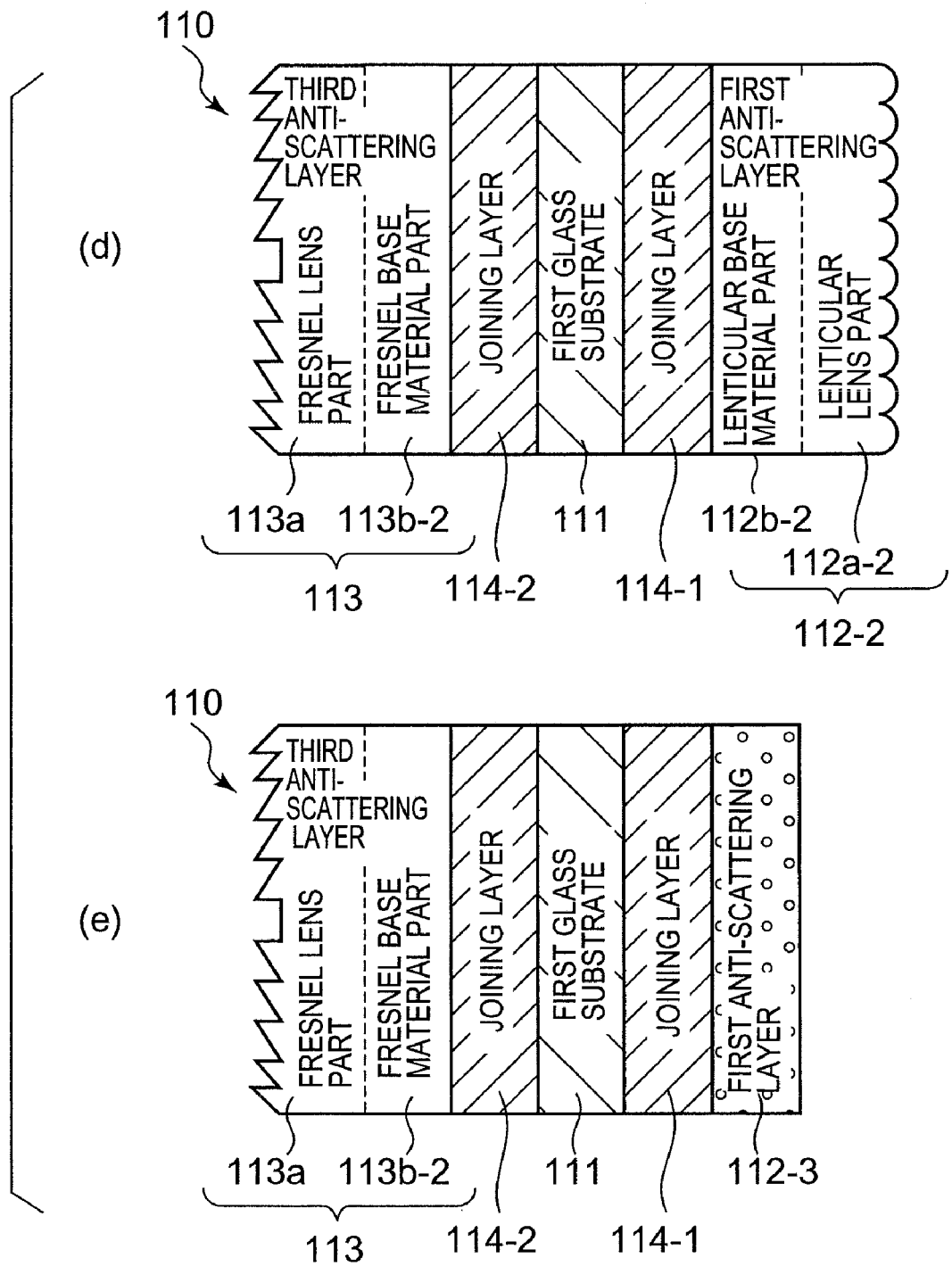
FIG. 5 is a schematic view of a layer structure of a modification of the Fresnel lens sheet of the first embodiment of the transmission type screen.
Figure 6:
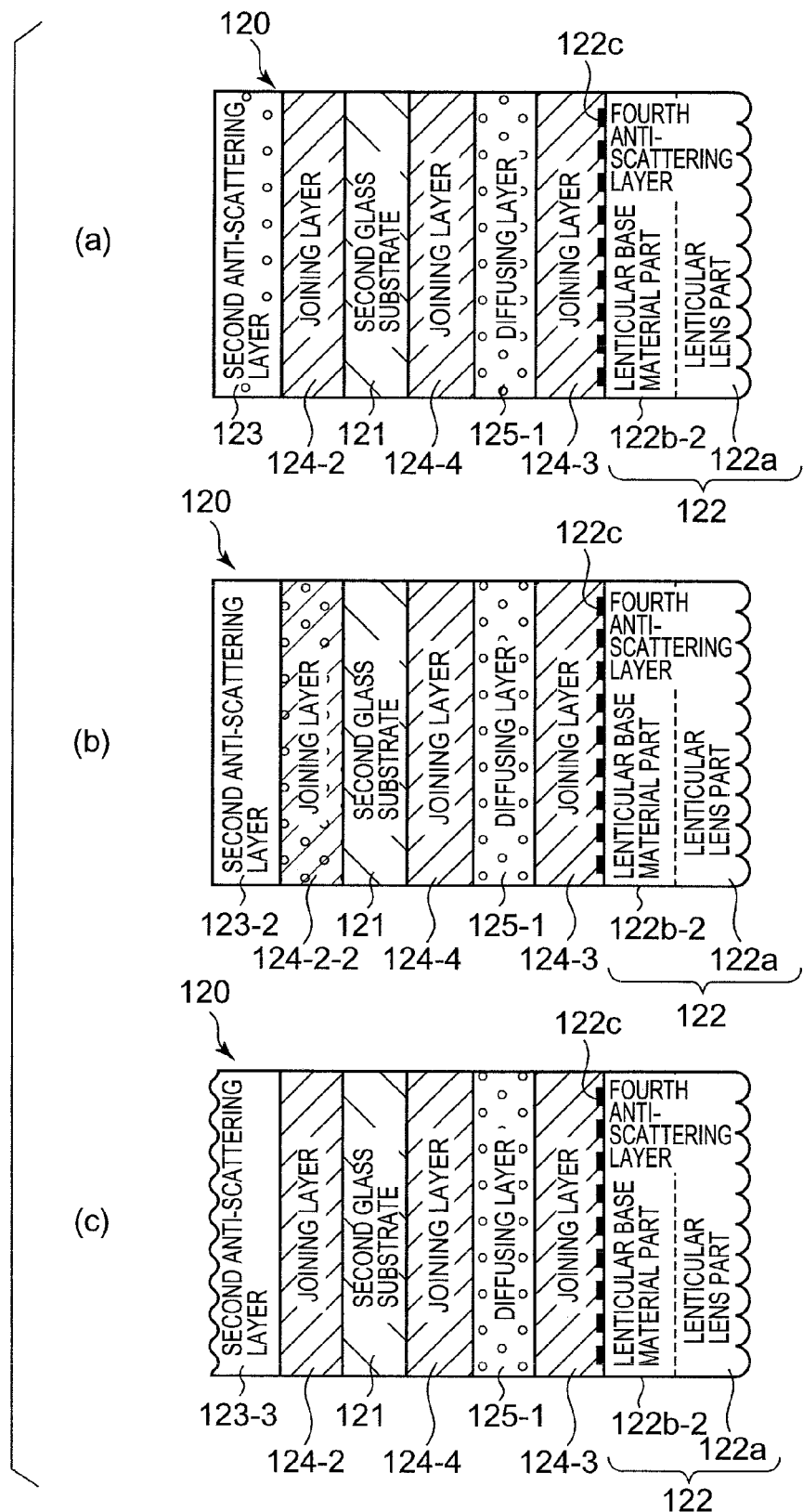
FIG. 6 is a schematic view of a layer structure of a modification of a lenticular lens sheet of the first embodiment of the transmission type screen.
Figure 7:
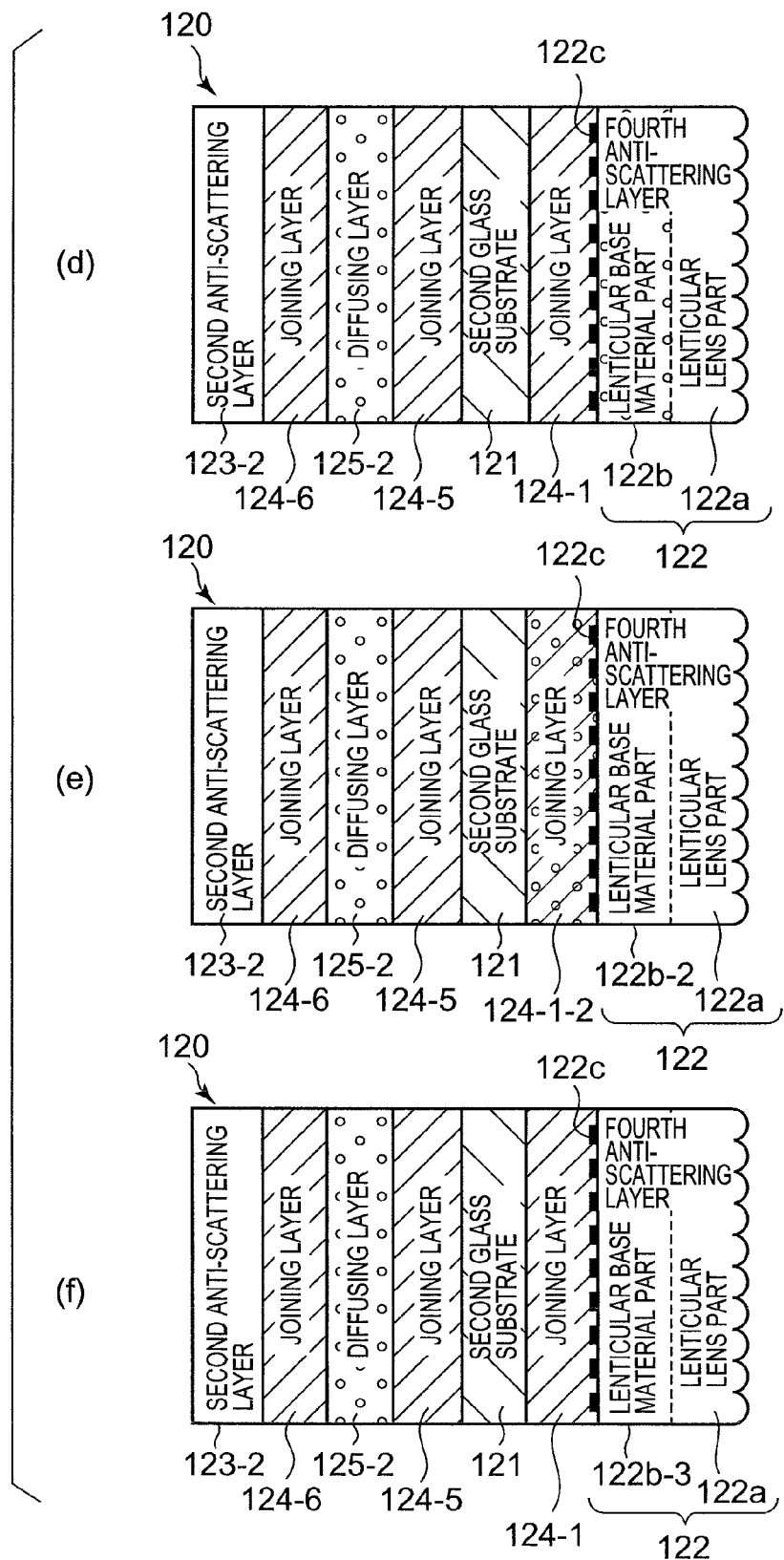
FIG. 7 is a schematic view of a layer structure of a modification of the lenticular lens sheet of the first embodiment of the transmission type screen.

(1) FIGS. 4 and 5 are schematic views of layer structures of modifications of the Fresnel lens sheet (the optical deflective sheet) in the first embodiment. In FIGS. 4 and 5, and other schematic views of a layer structure of the transmission type screen, which are referred to hereinbelow, a layer whose boundary face (interface) portion is represented by a corrugated line denotes a layer having fine irregular-shaped portions on its surface.

In this embodiment, the Fresnel lens sheet 110 functions as a diffusing part, since glass beads as a diffusing agent are substantially uniformly mixed in the Fresnel base material part 113b. However, a position of the layer functioning as a diffusing part where light is diffused without directivity, and the number thereof are not specifically limited to this example. Although modifications of the diffusing part is shown below, a constitution of the diffusing part is not limited to the following modifications.

As shown in FIG. 4(a), in addition to mixing a diffusing agent in a Fresnel base material part 113b-2 in a Fresnel lens sheet 110, a diffusing agent may be mixed in a joining layer 114-1-2 interposed between a first glass substrate 111 and a first anti-scattering layer 112, so that the joining layer 114-1-2 can function as a diffusing part. Alternatively, as shown in FIG. 4(b), a diffusing agent may be mixed in a joining layer 114-2-2 interposed between a first glass substrate 111 and a third anti-scattering layer 113, so that the joining layer 114-2-2 can function as a diffusing part. Alternatively, as shown in FIG. 4(c), instead of mixing a diffusing agent, an incident-side surface of a Fresnel base material part 113b-3 may have fine irregular-shaped portions, so that the Fresnel base material part 113b-3 can function as a diffusing part. In this modification, a difference between a refractive index of the Fresnel base material part 113b-3 and that of a joining layer 114-2 is preferably large, in order to obtain a more advantageous diffusion effect. Not limited to this example, when fine irregular-shaped portions are formed on a surface of a layer so as to impart thereto a function as a diffusing part, it is preferable that a difference between refractive indexes of two layers, between which the irregular interface is formed, be as large as possible, in terms of achieving a significantly high diffusing effect.

Alternatively, as shown in FIG. 5(d), instead of mixing a diffusing agent in a Fresnel base material part 113b-2 in a Fresnel lens sheet 110, a lenticular lens part 112a-2 having an effect of diffusing light in a vertical direction and a lenticular base material part 112b-2 may be disposed on a first anti-scattering layer 112-2, so that the first anti-scattering layer 112-2 can function as a diffusing part. Although not shown, the first anti-scattering layer 112-2 may have, instead of the lenticular lens part 112a-2, an optical diffusing element formed by arranging a plurality of unit prism shape portions each having a substantially triangular-shaped cross-section and protruding toward the incident side.

Alternatively, as shown in FIG. 5(e), instead of mixing a diffusing agent in a Fresnel base material part 113b-2 in a Fresnel lens sheet 110, a first anti-scattering layer 112-3 may be formed of a 188 μm thick layer which is formed by substantially uniformly mixing glass beads (diffusing agent) in a polyethylene terephthalate resin, so that the first anti-scattering layer 112-3 can function as a diffusing part. Although not shown, fine irregular-shaped portions may be formed on an incident-side surface of the first anti-scattering layer, so that the first anti-scattering layer can function as a diffusing part.

(2) FIGS. 6 to 10 are schematic views of layer structures of modifications of the lenticular lens sheet (the optical diffusing sheet) in the first embodiment.

In this embodiment, the lenticular lens sheet 120 functions as a diffusing part, since glass beads as a diffusing agent are substantially uniformly mixed in the lenticular base material part 122b. The second anti-scattering layer 123 functions as a diffusing part, since glass beads as a diffusing agent are substantially uniformly mixed therein. However, a position of the layer functioning as a diffusing part where light is diffused without directivity, and the number thereof are not specifically limited to this example. Although modifications of the diffusing part are shown below, a constitution of the diffusing part is not limited to the following modifications.

As shown in FIGS. 6(a) to 6(c), layers functioning as diffusing parts may be disposed on the incident side and the emergent side of a second glass substrate 121, without mixing a diffusing agent in a lenticular base material part 122b-2 in a lenticular lens sheet 120. In the example shown in FIG. 6(a), between a second glass substrate 121 and a fourth anti-scattering layer 122, there is laminated a 188 μm thick diffusing layer 125-1 which is formed by substantially uniformly mixing a diffusing agent such as glass beads in a polyethylene terephthalate resin. The diffusing layer 125-1 is laminated through joining layers 124-3 and 124-4. In the modification shown in FIG. 6(b), a diffusing layer 125-1 is laminated through joining layers 124-3 and 124-4, similar to the example shown in FIG. 6(a). Instead of mixing a diffusing agent in a second anti-scattering layer 123-2, a diffusing agent is mixed in a joining layer 124-2-2 interposed between a second glass substrate 121 and a second anti-scattering layer 123-2, so that the joining layer 124-2-2 can function as a diffusing part. Alternatively, in the modification shown in FIG. 6(c), instead of mixing a diffusing agent in a second anti-scattering layer 123-3, fine irregular-shaped portions are formed on a surface of the second anti-scattering layer 123-3, so that the second anti-scattering layer 123-3 can function as a diffusing part.

Alternatively, as shown in FIG. 7(d), instead of mixing a diffusing agent in a second anti-scattering layer 123-2 in a lenticular lens sheet (the optical diffusing sheet) 120, a diffusing layer 125-2 similar to the diffusing layer 125-1 may be laminated between a second glass substrate 121 and the second anti-scattering layer 123-2 through joining layers 124-5 and 124-6. Alternatively, in the example shown in FIG. 7(e), instead of mixing a diffusing agent in a lenticular base material part 122b-2, a diffusing agent is substantially uniformly mixed in a joining layer 124-1-2 interposed between a second glass substrate 121 and a fourth anti-scattering layer 122, so that the joining layer 124-1-2 can function as a diffusing part. On the other hand, in the example shown in FIG. 7(f), instead of mixing a diffusing agent in a lenticular base material part 122b-3, fine irregular-shaped portions are formed on a surface of the lenticular base material part 122b-3, so that a fourth anti-scattering layer 122 (lenticular base material part 122b-3) can have a diffusing part.

Figure 8:
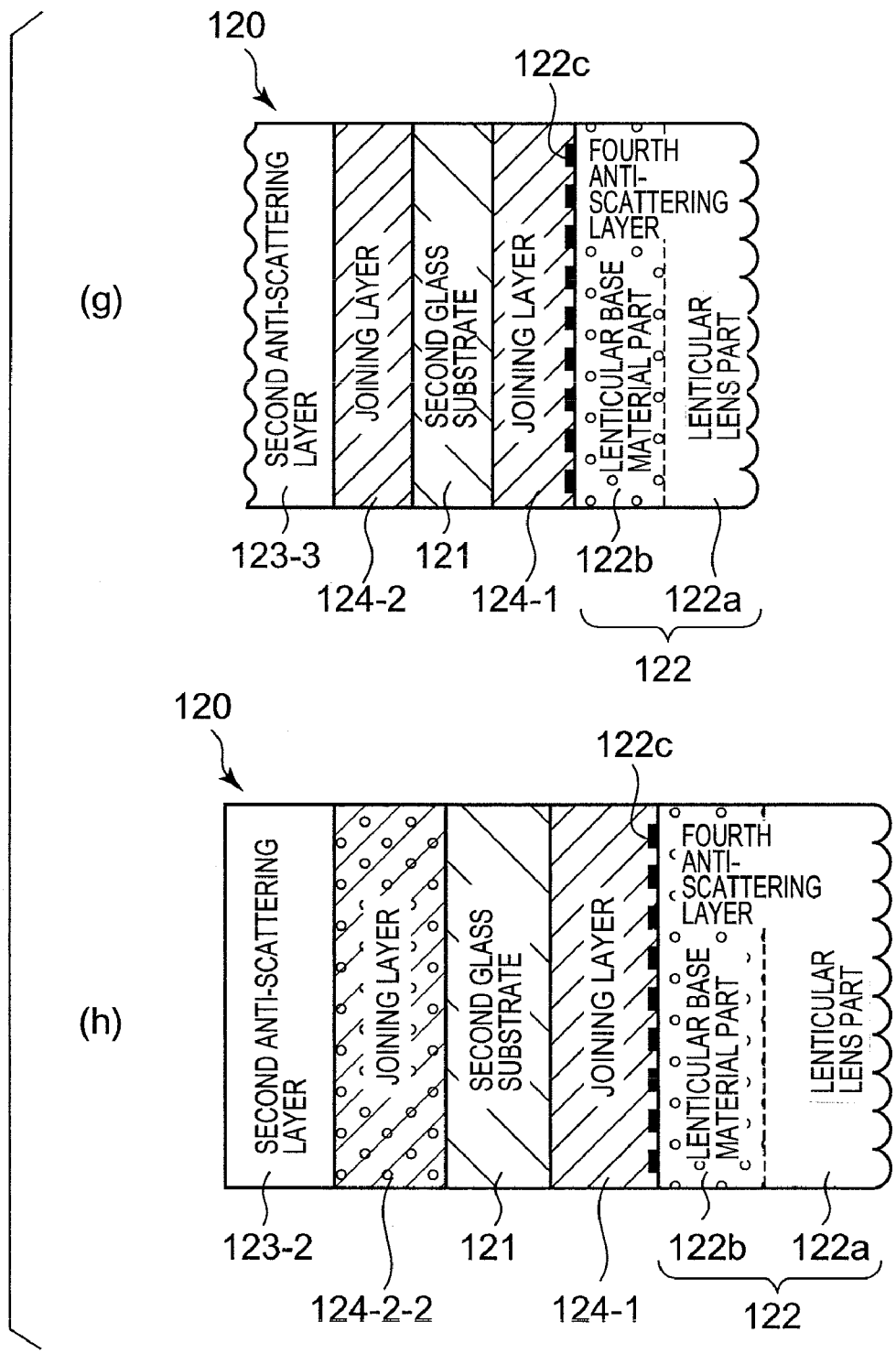
FIG. 8 is a schematic view of a layer structure of a modification of the lenticular lens sheet of the first embodiment of the transmission type screen.
Figure 9:
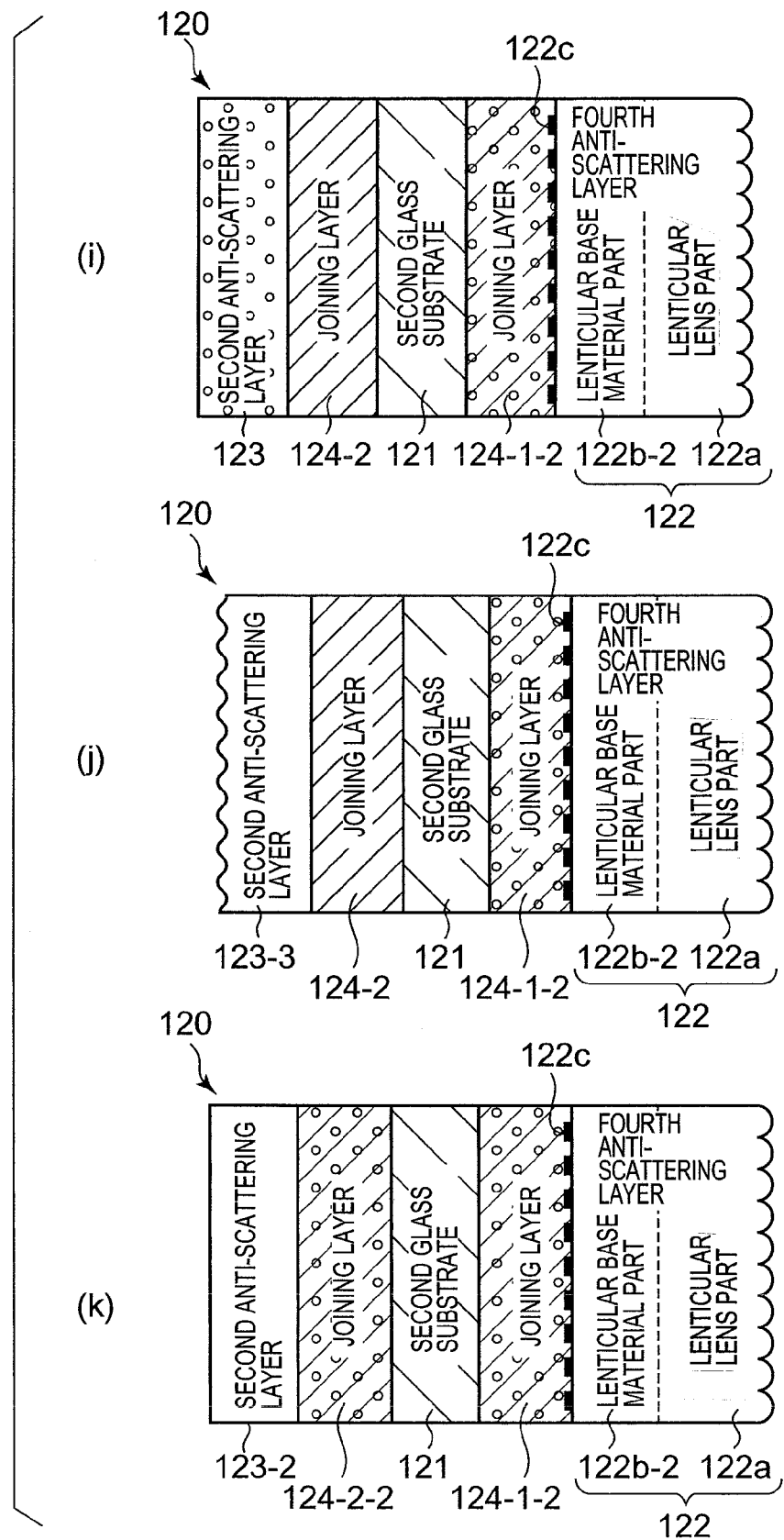
FIG. 9 is a schematic view of a layer structure of a modification of the lenticular lens sheet of the first embodiment of the transmission type screen.
Figure 10:
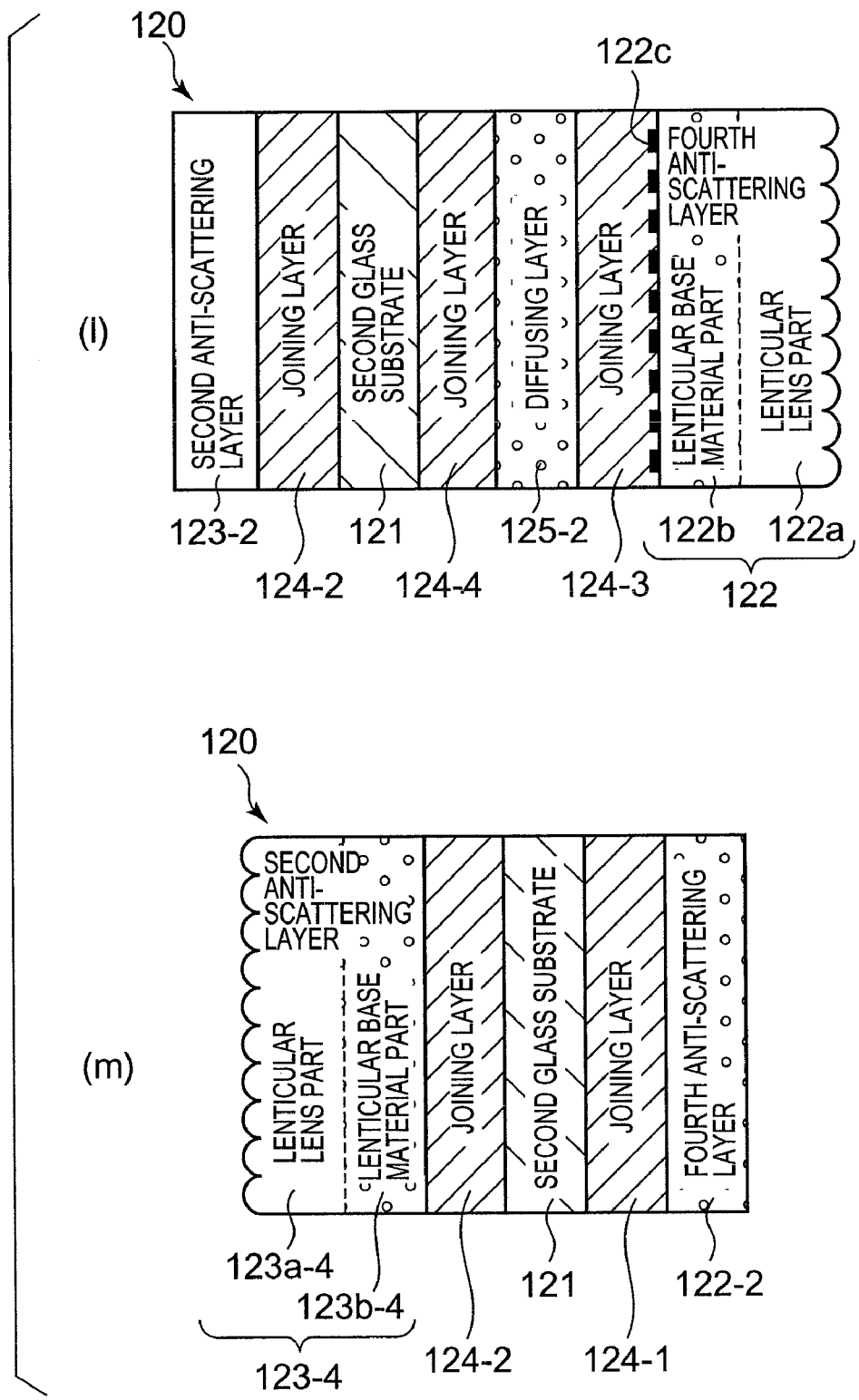
FIG. 10 is a schematic view of a layer structure of a modification of the lenticular lens sheet of the first embodiment of the transmission type screen.

FIGS. 8 and 9 show examples in which a diffusing part is not disposed as an additional layer. In the example shown in FIG. 8(g), instead of mixing a diffusing agent in a second anti-scattering layer 123-3, fine irregular-shaped portions are formed on a surface of the second anti-scattering layer 123-3, so that the second anti-scattering layer 123-3 can have a diffusing part. Alternatively, as shown in FIG. 8(h), instead of mixing a diffusing agent in a second anti-scattering layer 123-2, a diffusing agent may be substantially uniformly mixed in a joining layer 124-2-2 interposed between a second glass substrate 121 and a second anti-scattering layer 123-2, so that the joining layer 124-2-2 can have a diffusing part. Moreover, although not shown, instead of mixing a diffusing agent in a lenticular base material part 122b, fine irregular-shaped portions may be formed on a surface of the lenticular base material part 122b, so that the lenticular base material part 122b can have a diffusing part.

Alternatively, as shown in FIG. 9(i), instead of mixing a diffusing agent in a lenticular base material part 122b-2, a diffusing agent may be mixed in a joining layer 124-1-2, so that the joining layer 124-1-2 can have a diffusing part. Alternatively, as shown in FIG. 9(j), instead of mixing a diffusing agent in a second anti-scattering layer 123-3, fine irregular-shaped portions may be formed on a surface of the second anti-scattering layer 123-3. In the example shown in FIG. 9(j), a joining layer 124-1-2 and the second anti-scattering layer 123-3 respectively have diffusing parts. Alternatively, as shown in FIG. 9(k), instead of mixing a diffusing agent in a lenticular base material part 122b-2 and a second anti-scattering layer 123-2, a diffusing agent may be mixed in a joining layer 124-1-2 which integrally laminates a second glass substrate 121 on a fourth anti-scattering layer 122, and a diffusing agent may be mixed in a joining layer 124-2-2 which integrally laminates the second glass substrate 121 on a second anti-scattering layer 123-2, so that the two joining layers 124-1-2 and 124-2-2 can respectively have diffusing parts.

In addition, two diffusing parts may be disposed on positions closer to the incident side than the second glass substrate 121. In the example shown in FIG. 10(l), instead of mixing a diffusing agent in a second anti-scattering layer 123-2, a diffusing layer 125-2 is interposed between a second glass substrate 121 and a fourth anti-scattering layer 122. In this example, instead of mixing a diffusing agent in a lenticular base material part 122b, fine irregular-shaped portions may be formed on a surface of the lenticular base material part 122b, although not shown, so that the lenticular base material part 122b can have a diffusing part.

As in the above modifications in which a function as a diffusing part having a diffusing effect is imparted to two layers which are not adjacent to each other and are disposed on positions closer to the emergent side than the Fresnel lens part 113a in the transmission type screen 100, a viewing angle can be enlarged, uniformity in diffusion can be enhanced, and scintillation can be reduced. As a result, an image quality can be remarkably improved.

(3) In this embodiment, an example in which the optical diffusing element 122a is formed of a lenticular lens is shown. However, not limited thereto, the optical diffusing element may be formed of a microlens array or the like.

(4) In this embodiment, the fourth anti-scattering layer 122 includes the optical diffusing element, more specifically, the lenticular lens part 122a and the lenticular base material part 122b, which is shown by way of example. Not limited thereto, as show in FIG. 10(m), for example, a second anti-scattering layer 123-4 may include a lenticular lens part 123a-4 and a lenticular base material part 123b-4. In the example shown in FIG. 10(m), although a diffusing agent is substantially uniformly mixed in the lenticular base material part 123b-4 and a fourth anti-scattering layer 122-2, a position of the layer functioning as a diffusing part where light is diffused without directivity and the number thereof are not specifically limited, as described in the above modifications.

Second Embodiment

Figure 11:
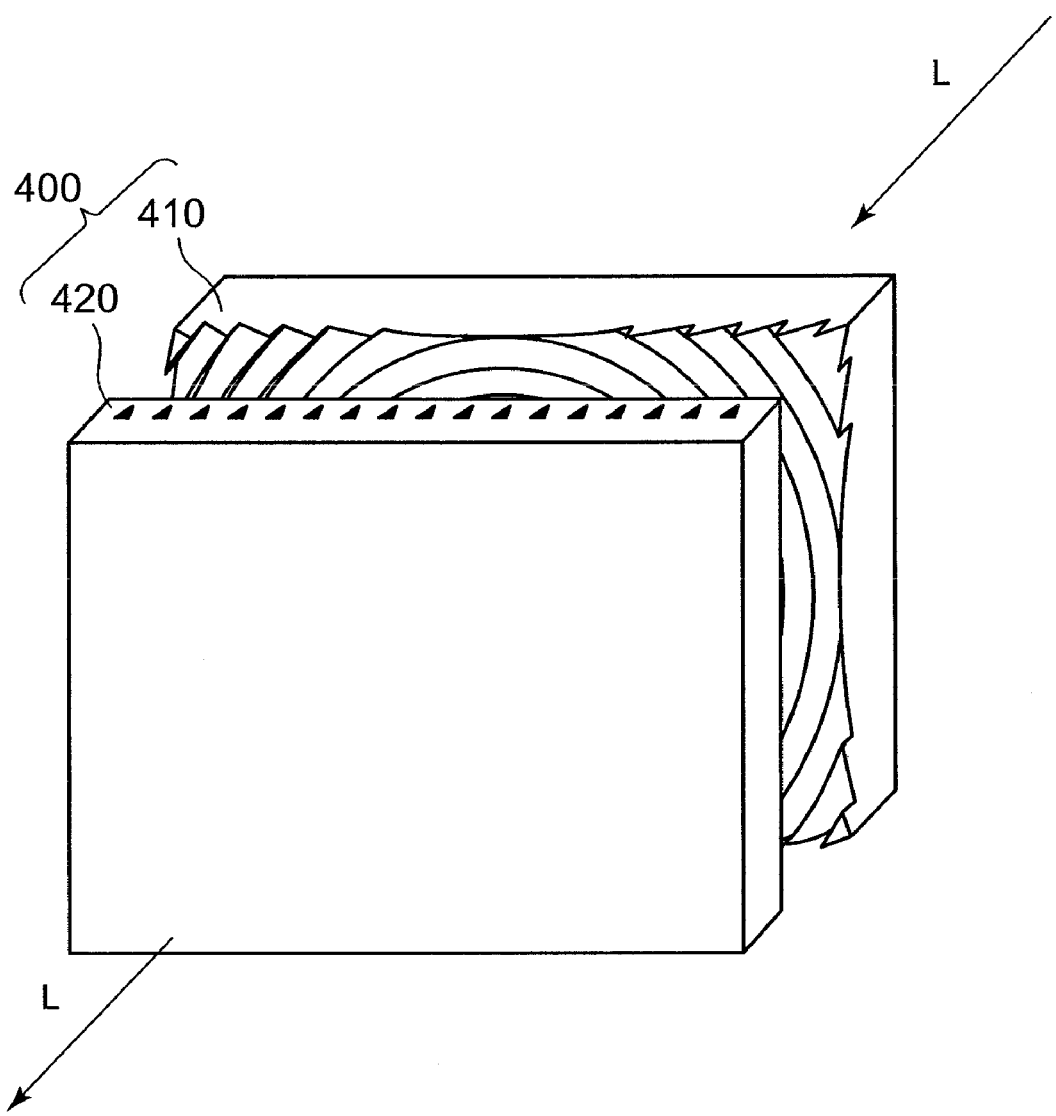
FIG. 11 is a perspective view of a second embodiment of the transmission type screen according to the present invention.

FIG. 11 is a second embodiment of the transmission type screen according to the present invention. As shown in FIG. 11, the transmission type screen 400 in the second embodiment includes an optical deflecting sheet disposed on an incident side of imaging light L, and an optical diffusing sheet 420 disposed on an emergent side of the imaging light L. The transmission type screen 400 in the second embodiment is used in the rear projection television 1 shown in FIG. 2, similar to the transmission type screen 100 described in the first embodiment.

The optical deflecting sheet 410 in this transmission type screen is formed as a Fresnel lens sheet having a Fresnel lens, similar to the first embodiment. Meanwhile, the optical diffusing sheet 420 is formed of a sheet-like member which is different from that of the first embodiment, as described below.

Figure 12:
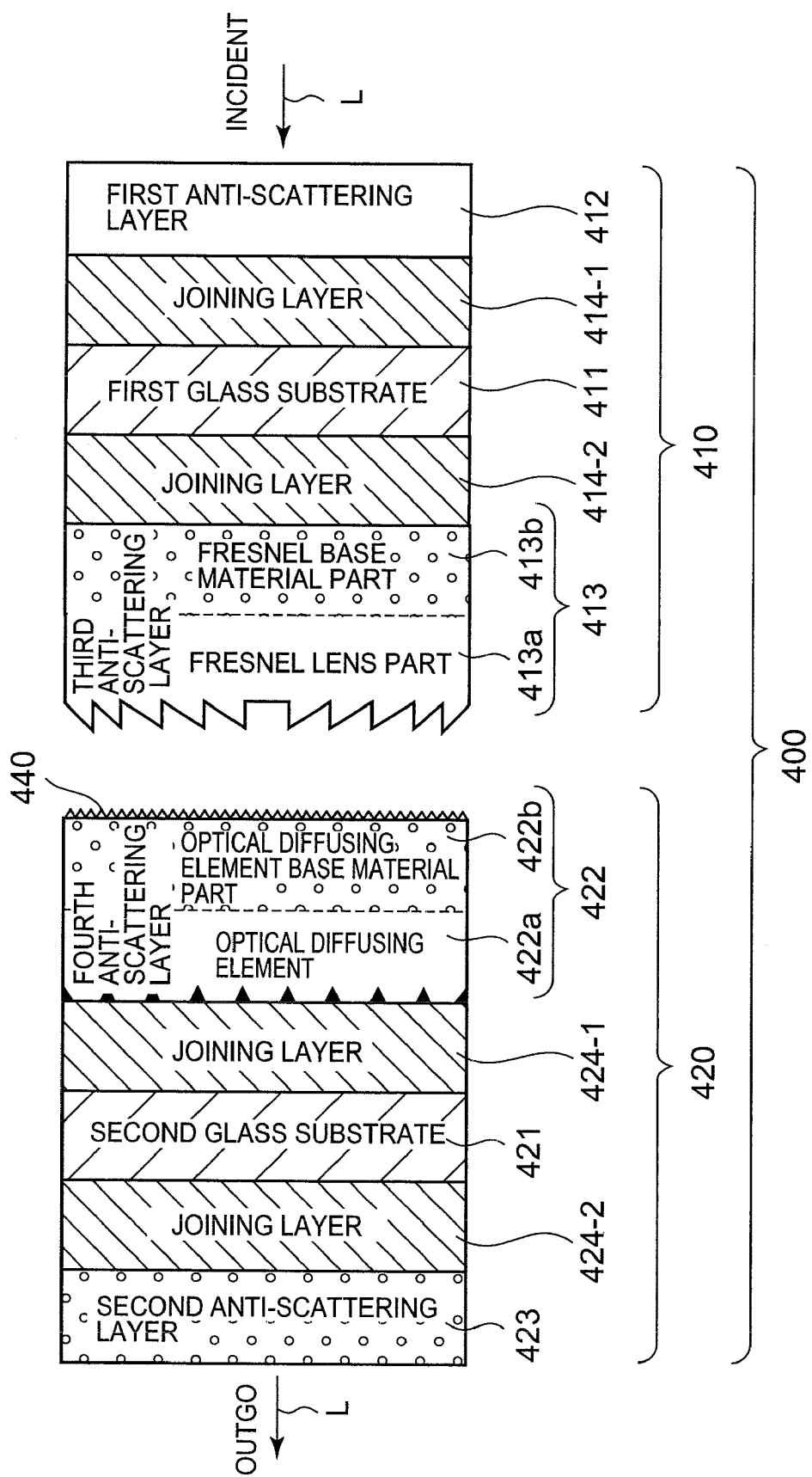
FIG. 12 is a schematic view of a layer structure of the second embodiment of the transmission type screen.

FIG. 12 is a schematic view of a layer structure of the second embodiment of the transmission type screen.

The Fresnel lens sheet (the optical deflective sheet) 410 is identical to the Fresnel lens sheet 110 shown in the first embodiment, and includes a first glass substrate 411, a first anti-scattering layer 412, a third anti-scattering layer 413, and joining layers 414-1 and 414-2. The first glass substrate 411, the first anti-scattering layer 412, the third anti-scattering layer 413, and the joining layers 414-1 and 414-2 in the Fresnel lens sheet 410 in this embodiment respectively correspond to the first glass substrate 111, the first anti-scattering layer 112, the third anti-scattering layer 113, and the joining layers 114-1 and 114-2 in the Fresnel lens sheet 110 in the first embodiment, and thus have the same functions corresponding thereto. Therefore, the overlapping description for the Fresnel lens sheet (the optical deflecting sheet) 410 in the second embodiment is omitted.

(Optical Diffusing Sheet)

The optical diffusing sheet 420 is disposed on the emergent side of the transmission type screen 400, and includes a second glass substrate 421, a second anti-scattering layer 423, a fourth anti-scattering layer 422, and joining layers 424-1 and 424-2. The optical diffusing sheet 420 is an optical sheet that diffuses imaging light incident thereon by totally reflecting at least a part of the imaging light. The second glass substrate 421 is a highly rigid substrate layer that has a high light-transmissibility and a high rigidity. The second glass substrate 421 in this embodiment is a glass plate formed of silicate glass, and has a thickness of 3 mm. In this embodiment, a transmittance of the second glass substrate 421 relative to light whose wavelength band is between 400 nm and 700 nm is equal to or more than 90%.

The joining layer 424-1 is a layer for integrally joining the second glass substrate 421 and the fourth anti-scattering layer 422 which is described below, while the joining layer 424-2 is a layer for joining the second glass substrate 421 and the second anti-scattering layer 423 which is described below. Each of the joining layer 424-1 and 424-2 may be formed of an acryl resin of pressure sensitive adhesion type which manifests an adhesion property when a pressure is applied thereto, and may be 20 µm in thickness. Not limited 20 µm, the thicknesses of the joining layers 424-1 and 424-2 can be suitably changed, but preferably fall within a range of from 20 µm to 30 µm.

The fourth anti-scattering layer 422 is a member that is integrally laminated on the incident side of the second glass substrate 421 through the joining layer 424-1. If the second glass substrate 421 is broken, for example, the fourth anti-scattering layer 422 exhibits a function for preventing scattering of pieces of the broken second glass substrate 421. The fourth anti-scattering layer 422 includes an optical diffusing element base material part 422b, and an optical diffusing element 422a formed on one surface of the optical diffusing element base material part 422b. Similar to the Fresnel lens part 113a shown in the first embodiment, the optical diffusing element 422a may be formed by using an ultraviolet curing resin. The fourth anti-scattering layer as a layered body composed of the optical diffusing element 422a and the optical diffusing element base material part 422b is further laminated on the second glass substrate 421.

The optical diffusing element base material part 422b is a sheet-like member with a thickness of e.g., 200 µm that serves as a base for the fourth anti-scattering layer 422. The optical diffusing element base material part 422b may be formed of an acryl resin, in which diffusing agent such as glass beads is mixed, so as to function as a diffusing part.

Figure 13:
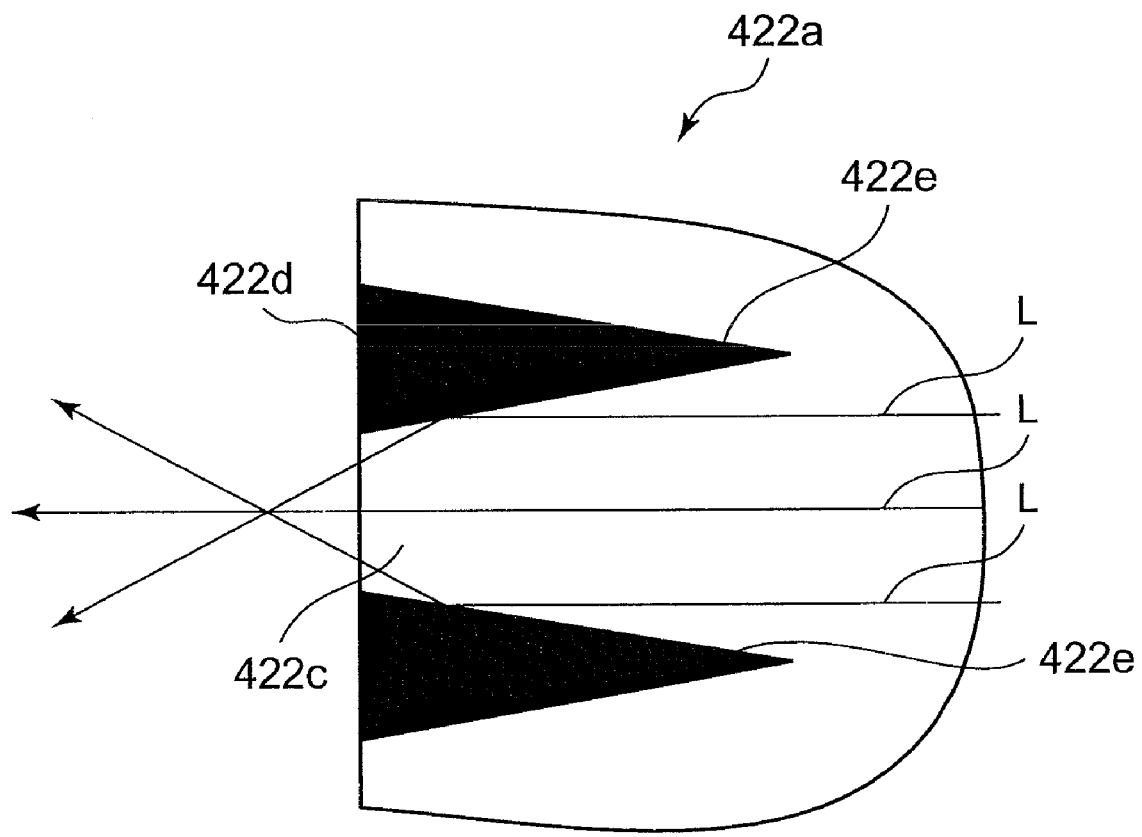
FIG. 13 is a partial sectional view of an optical diffusing element.

FIG. 13 is a partial sectional view of the optical diffusing element. The optical diffusing element 422a has, on the emergent side thereof, a plurality of unit optical shape portions 422c that are arranged so as to protrude toward the side of an observer. Similar to the Fresnel lens part 113a shown in the first embodiment, the unit optical shape portions 422c may be formed by using an ultraviolet curing resin. As shown in FIG. 13, the unit optical shape portion 422c has a substantially trapezoidal-shaped cross-section, and protrudes toward the emergent side. A clearance having a substantially triangular-shaped cross-section is formed between two unit optical shape portions 422c adjacent to each other. A light absorbing part 422d for absorbing light that has a shape corresponding to that of the clearance is disposed in the clearance so as to fill the same. As compared with the unit optical shape portions 422c, the light absorbing parts 422d are formed of a material having a lower refractive index. The optical diffusing element 422a totally reflects at least a part of light incident thereon from lower base of the unit optical shape portions 422c in predetermined directions, by slant portions 422e of the unit optical shape portions 422c. The totally reflected light is diffused and goes out of upper base of the unit optical shape portions 422c. In this manner, the optical diffusing element 422a can exert a diffusing effect.

As shown in FIG. 12, unit prism shape portions 440, that have substantially triangular-shaped cross-sections and protrude toward the incident side, are formed on an incident-side surface of the optical diffusing element base material part 422b in the optical diffusing sheet 420 in this embodiment. The unit prism shape portions 440 have the substantially triangular-shaped cross-sections which are smaller than those of the light absorbing parts 422d, and are arranged at smaller pitches than those of the light absorbing parts 422d. Similar to the light absorbing parts 422d, the unit prism shape portions 440 are extended along the light absorbing part 422d in an elongated arrangement. With a provision of these prism shape portions or irregular-shaped portions, outside light incident from the observation surface side (emergent side) of the transmission type screen 400 can be reflected in the vertical or horizontal direction. Thus, outside light can be efficiently absorbed in the light absorbing parts 422d, so that the deterioration in image quality such as deterioration in contrast, which might be caused by outside light, can be decreased. Instead of the unit prism portions 440 each having a substantially triangular-shaped cross-section, irregular-shaped portions, which are disposed on the incident-side surface of the optical diffusing element base material part 422b, can provide an effect substantially the same as that of the unit prism shape portions 440.

As shown in FIG. 12, the second anti-scattering layer 423 is integrally laminated on the emergent side of the second glass substrate 421 through the joining layer 424-2. If the second glass substrate 421 is, for example, broken and damaged, the second anti-scattering layer 423 exhibits a function for preventing scattering of pieces of the damaged second glass substrate 421. The second anti-scattering layer 423 may be formed by substantially uniformly mixing glass beads as a diffusing agent in a polyethylene terephthalate resin or the like so as to function as a diffusing part. A thickness of the second anti-scattering layer 423 may be, e.g., 188 µm.

According to the transmission type screen 400 in the second embodiment including the optical diffusing sheet 420 and the Fresnel lens sheet (the optical deflecting sheet) 410, effects substantially the same as those of the transmission type screen 100 shown in the first embodiment can be obtained. That is to say, according to the transmission type screen 400 in the second embodiment, it is possible to restrain the generation of a warp and a float of the optical diffusing sheet 420 or the Fresnel lens sheet 410, which might be caused by changes in the environment such as temperature and humidity. It is also possible to restrain the generation of a flexure of the optical diffusing sheet 420 or the Fresnel lens sheet 410, which might be caused by their own weights. Thus, the transmission type screen can have a high degree of flatness, so that an image of high quality can be provided. Similar to the transmission type screen 100 shown in the first embodiment, according to the transmission type screen 400 in the second embodiment, if the first and second glass substrates 411 and 421 are, for example, broken and damaged, scattering of pieces of the damaged substrates can be prevented.

The transmission type screen 400 in the second embodiment can further provide the following effects. The optical diffusing element 422a used in the optical diffusing sheet 420 can be easily manufactured at a high precision. Thus, the optical diffusing sheet, the optical deflecting sheet, and the transmission type screen that provide an image of high quality can be obtained at lower costs.

The optical diffusing sheet 420 in the second embodiment enables a fine pitch. Thus, as compared with the transmission type screen 100 using the lenticular lens sheet 120 shown in the first embodiment, the transmission type screen 400 can provide a finer and superior image.

(Modifications of Second Embodiment)

(1) The Fresnel lens sheet 410 in this embodiment is a member identical to the Fresnel lens sheet 110 shown in the first embodiment. Thus, the modifications of the Fresnel lens sheet 110 described in the first embodiment can be applied to the Fresnel lens sheet 410 in this embodiment.

(2) In the optical diffusing sheet 420 in this embodiment, glass beads as a diffusing agent are substantially uniformly mixed in the second anti-scattering layer 423 and the optical diffusing element base material part 422b, so that they can have diffusing parts, respectively. However, a position of the layer functioning as a diffusing part (where light is diffused without directivity) and the number thereof are not specifically limited to this example, and can be suitably changed, similar to the diffusing parts in the lenticular lens sheet 120 in the first embodiment. Although modifications of a diffusing part are shown below, a constitution of the diffusing part is not limited to the following modifications.

For example, instead of mixing a diffusing agent in the second anti-scattering layer 423 in the optical diffusing sheet 420, a diffusing agent may be mixed in the joining layer 424-1 or the joining layer 424-2. In this case, the optical diffusing element base material part 422b, and the joining layer 424-1 or the joining layer 424-2, in which a diffusing agent is mixed, have respectively diffusing parts. Alternatively, instead of mixing a diffusing agent in the optical diffusing element base material part 422b in the optical diffusing sheet 420, a diffusing agent may be mixed in the joining layer 424-1 or the joining layer 424-2. In this case, the second anti-scattering layer 423, and the joining layer 424-1 or the joining layer 424-2, in which a diffusing agent is mixed, have respectively diffusing parts.

Alternatively, an additional diffusing layer formed by substantially uniformly mixing a diffusing agent in a polyethylene terephthalate resin may be laminated on the optical diffusing sheet 420, for example. Instead of mixing a diffusing agent in the second anti-scattering layer 423 in the optical diffusing sheet 420, an additional diffusing layer may be laminated, for example, between the second glass substrate 421 and the second anti-scattering layer 423, or between the second glass substrate 421 and the fourth anti-scattering layer 422. In this example, an all-purpose anti-reflection sheet or the like may be laminated on the second anti-scattering layer 423. Alternatively, the second anti-scattering layer 423 itself may be formed of an anti-glaring sheet or the like.

Figure 14:
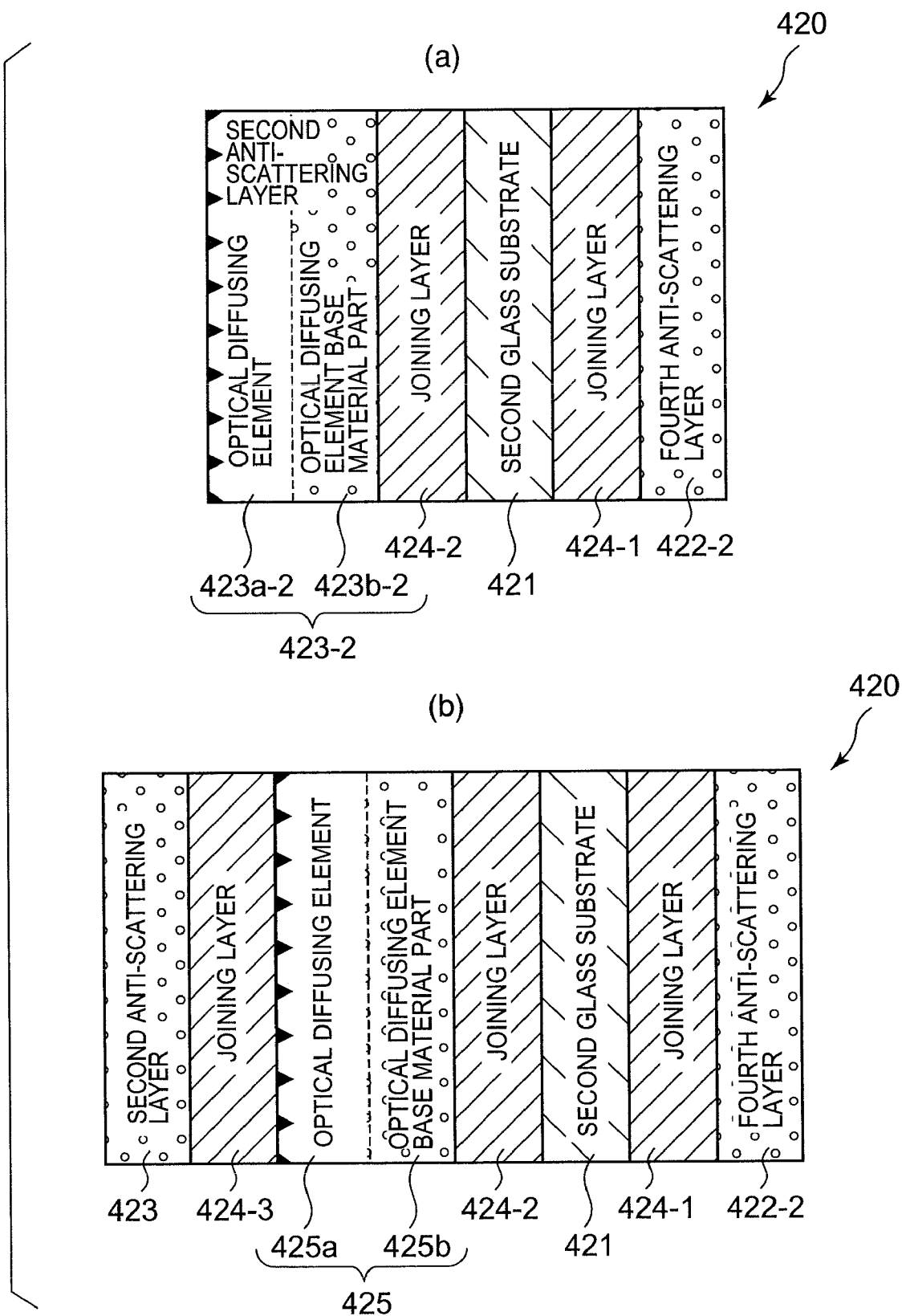
FIG. 14 is a schematic view of a layer structure of a modification of an optical diffusing sheet of the second embodiment of the transmission type screen.

(3) FIG. 14 is a schematic view of a layer structure of a modification of the optical diffusing sheet of the second embodiment of the transmission type screen.

In the optical diffusing sheet 420 in the second embodiment, an example is provided to illustrate that the fourth anti-scattering layer 422, that includes the optical diffusing element 422a and the optical diffusing element base material part 422b. However, the present invention is not limited thereto. For example, as shown in FIGS. 14(a) and 14(b), a layer other than the fourth anti-scattering layer 422 in the transmission type screen 400 may have the optical diffusing element and the optical diffusing element base material part.

In the example shown in FIG. 14(a), a second anti-scattering layer 423-2 has an optical diffusing element 423a-2 and an optical diffusing element base material part 423b-2. According to the optical diffusing sheet 420, light absorbing parts of the optical diffusing element 423a-2 are disposed on a position closest to the emergent side of the transmission type screen 400. Thus, outside light can be effectively absorbed so as to thereby improve a contrast of an image. In the optical diffusing sheet 420 shown in FIG. 14(a), a diffusing agent is mixed in the optical diffusing element base material part 423b-2 in a second anti-scattering layer 423-2, and a fourth anti-scattering layer 422-2, so that they respectively have diffusing parts. However, as described above, a position of the layer functioning as a diffusing part where light is diffused without directivity and the number thereof are not specifically limited.

On the other hand, an optical diffusing sheet 420 shown in FIG. 14(b) includes: a second anti-scattering layer 423 containing a diffusing agent mixed therein, that is disposed on a position closest to the emergent side; a fourth anti-scattering layer 422-2 containing a diffusing agent mixed therein, that is disposed on a position closest to the incident side; a second glass substrate 421 laminated between the second anti-scattering layer 423 and the fourth anti-scattering layer 422-2; and an optical diffusing element 425a and an optical diffusing element base material part 425b that are laminated between the second anti-scattering layer 423 and the second glass substrate 421. Disposition of the layer 423 having a diffusing part on the position closest to the emergent side can effectively decrease scintillation. Instead of mixing a diffusing agent in the second anti-scattering layer 423, an all-purpose diffusing sheet or the like may be laminated on the second anti-scattering layer 423.

Third Embodiment

Figure 15:
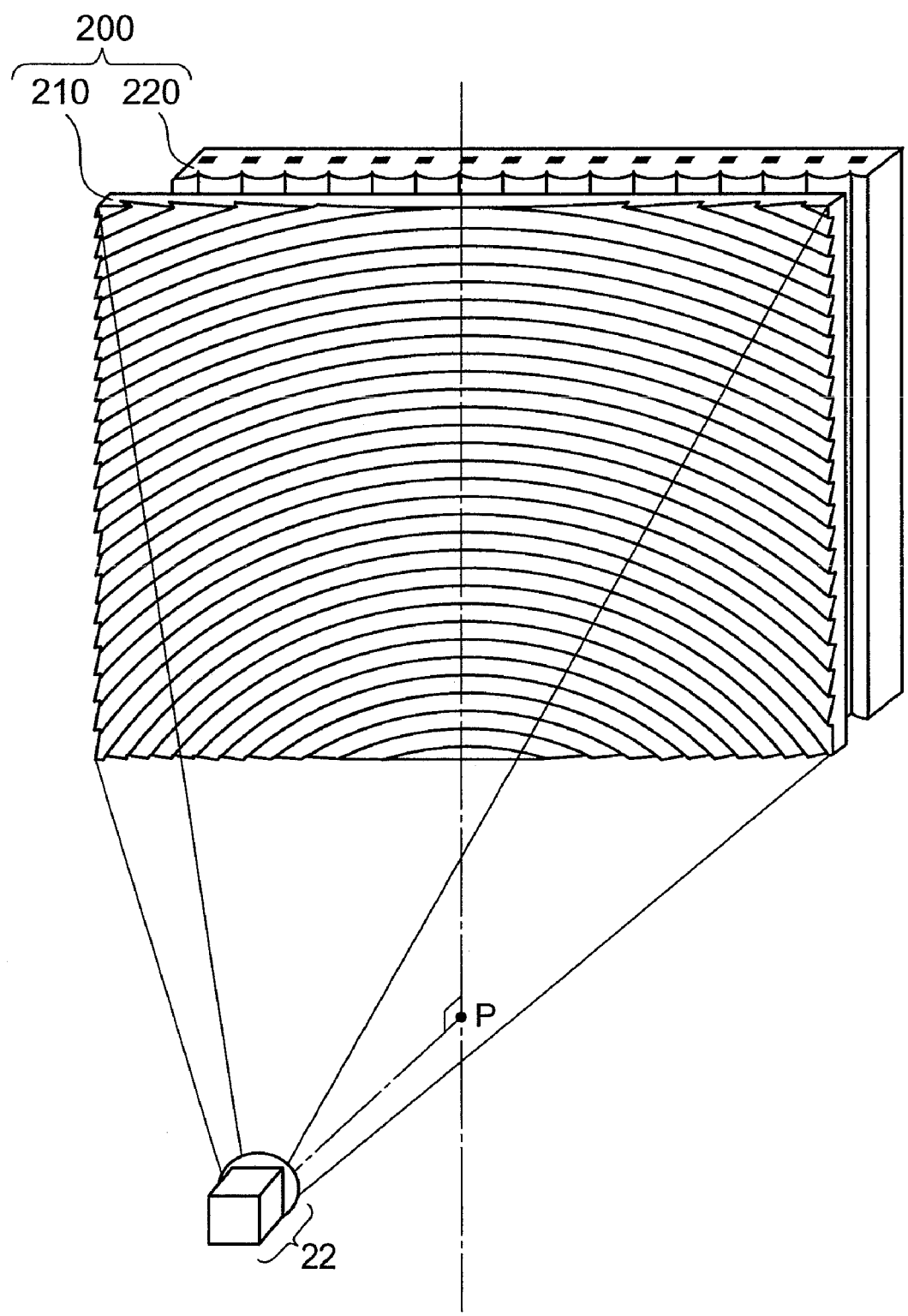
FIG. 15 is a perspective view of a third embodiment of the transmission type screen according to the present invention.
Figure 16:
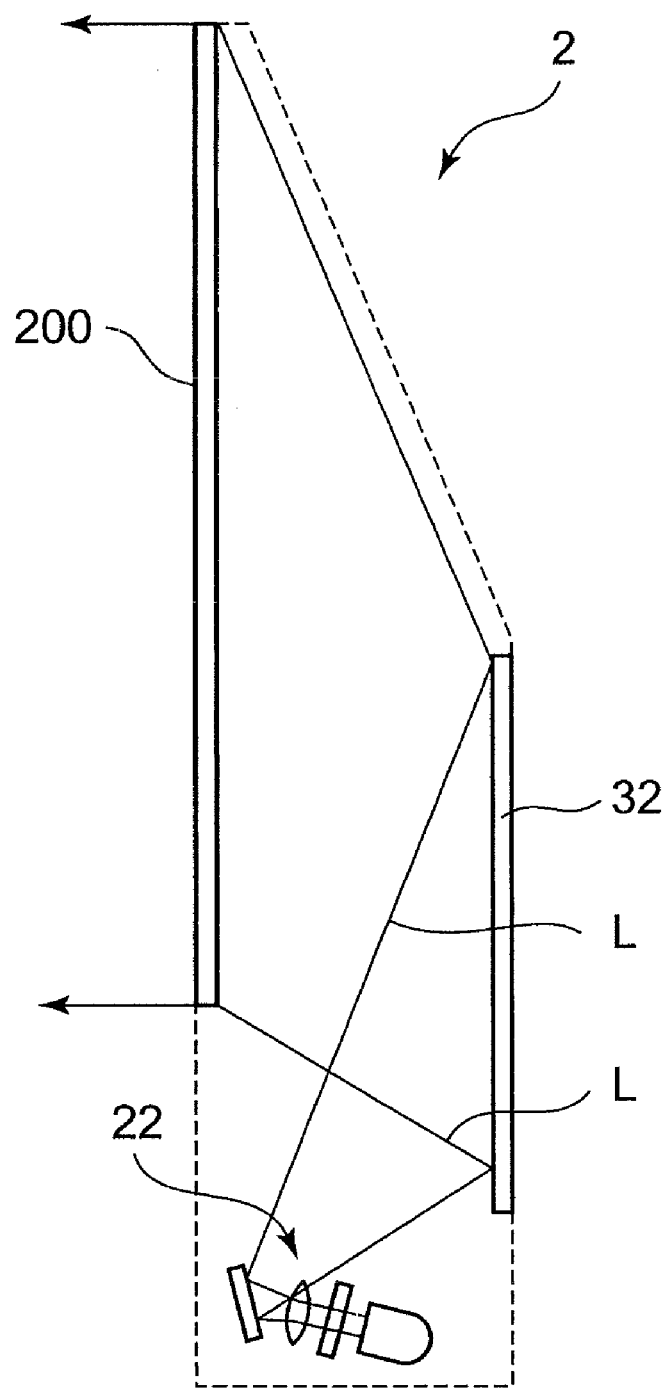
FIG. 16 is a sectional view of a rear projection television using the third embodiment of the transmission type screen.

FIG. 15 is a view of a third embodiment of the transmission type screen according to the present invention. FIG. 16 is a sectional view of a rear projection television using the third embodiment of the transmission type screen.

As shown in FIG. 15, the transmission type screen 200 in the third embodiment includes an optical deflecting sheet 210 disposed on an incident side (light source side) of imaging light L, and an optical diffusing sheet 220 disposed on an emergent side (observation surface side) of the imaging light L. A combination of the optical deflecting sheet and the optical diffusing sheet is used, as the transmission type screen, in a rear projection television 2 shown in FIG. 16.

In this transmission type screen, the optical diffusing sheet 220 is formed as the lenticular lens sheet having the lenticular lens used in the first embodiment. Meanwhile, the optical deflecting sheet 210 is formed as a prism sheet having a prism part (optical deflecting element) formed by arranging a plurality of unit prism portions for deflecting light.

As shown in FIG. 16, the rear projection television 2 is an image display device of rear-projection type that includes: the transmission type screen 200; a light source part 22 disposed on the incident side of the transmission type screen 200, and a mirror part 32 for reflecting imaging light L projected from the light source part 22. The light source part 22 is a light source of a single tube type using a DMD, and projects the imaging light L from below the transmission type screen 200. Thus, an incident angle at which the imaging light L is incident on the transmission type screen 200 is larger than that in the rear projection television 1.

Figure 17:
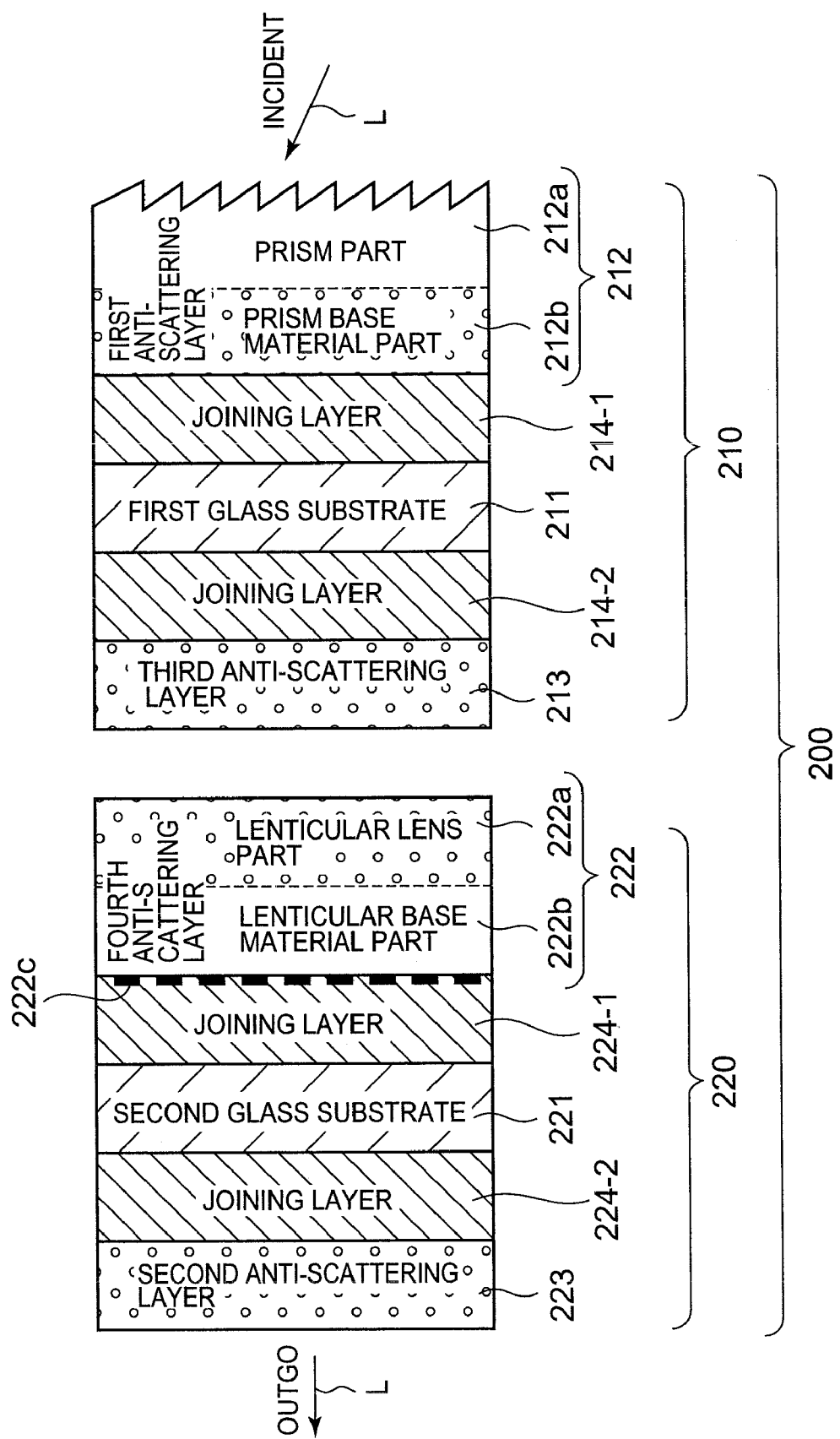
FIG. 17 is a schematic view of a layer structure of the third embodiment of the transmission type screen.

FIG. 17 is a schematic view of a layer structure of the transmission type screen 200 in the third embodiment. A lenticular lens sheet 220 is an optical diffusing sheet that is disposed on the emergent side of the transmission type screen 200, and includes a second glass substrate 221, a fourth anti-scattering layer 222, a second anti-scattering layer 223, and joining layers 224-1 and 224-2. The lenticular lens sheet 220 is a member identical to the lenticular lens sheet 120 in the first embodiment. The respective layers correspond to the first glass substrate 121, the fourth anti-scattering layer 122, the second anti-scattering layer 123, and the joining layers 124-1 and 124-2 in the first embodiment, and thus have the same functions corresponding thereto. Therefore, the overlapping description for the lenticular lens sheet 220 in the third embodiment is omitted.

(Prism Sheet (Optical Deflecting Sheet))

As shown in FIG. 17, a prism sheet 210 includes a first glass substrate 211, a first anti-scattering layer 212, a third anti-scattering layer 213, and joining layers 214-1 and 214-2, and is disposed on the incident side of the transmission type screen 200. The first glass substrate 211 is a highly rigid substrate having a high light-transmissivity and a high rigidity. The first glass substrate 211 in this embodiment is a glass plate with a thickness of 3 mm formed of silicate glass. In this embodiment, a transmittance of the first glass substrate 211 relative to light whose wavelength band is between 400 nm and 700 nm is equal to or more than 90%. The joining layer 214-1 is a layer for integrally joining the first glass substrate 211 and the first anti-scattering layer 212 which is described below, while the joining layer 214-2 is a layer for integrally joining the first glass substrate 211 and the third anti-scattering layer 213 which is described below. Each of the joining layer 214-1 and 214-2 may be formed of an acryl resin of pressure sensitive adhesion type which manifests an adhesion property when a pressure is applied thereto, and may be 20 μm in thickness.

The first anti-scattering layer 212 is integrally laminated on the incident side of the first glass substrate 211 through the joining layer 214-1. If the first glass substrate 211 is, for example, broken and damaged, the first anti-scattering layer 212 exhibits a function for preventing scattering of pieces of the damaged first glass substrate 211. The first anti-scattering layer 212 includes an optical deflecting element base material part (prism base material part) 212b, and an optical deflecting element (prism part) 212a formed on one surface of the prism base material part 212b. The prism base material part 212b is a sheet-like member with a thickness of, e.g., 200 μm that serves as a base for the first anti-scattering layer 212. The prism base material part 212b may be formed of an acryl resin, in which glass beads as a diffusing agent are mixed, so as to function as a diffusing part. The first anti-scattering layer 212 as a layered body composed of the prism part 212a and the prism base material part 212b is further laminated on the first glass substrate 211.

Figure 18:
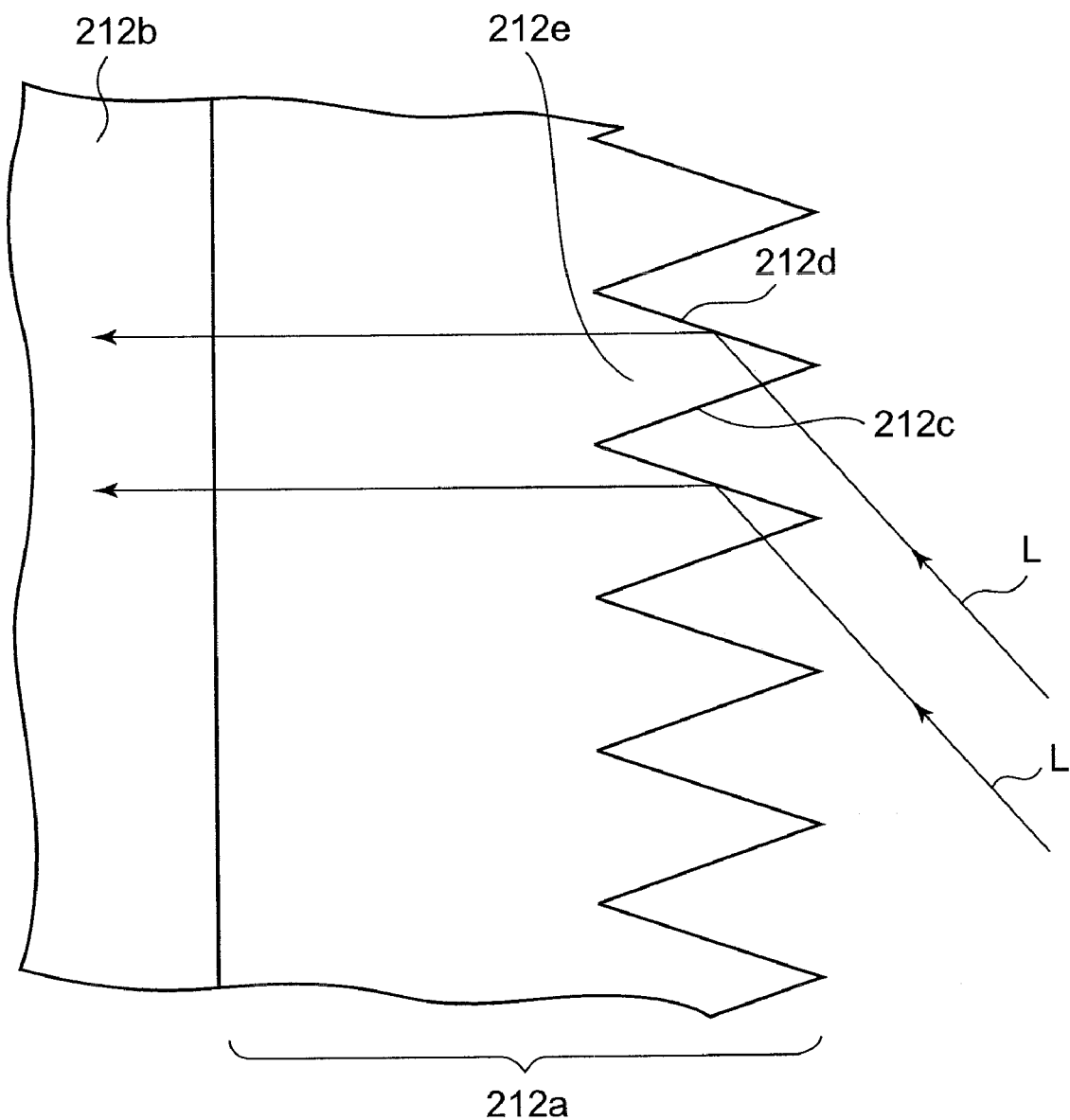
FIG. 18 is a partial sectional view of a prism part.

FIG. 18 is a sectional view of the prism part 212a. As shown in FIG. 18, the prism part 212a includes a plurality of unit prisms 212e, each having an incident surface 212c on which the imaging light L is incident, and a total reflection surface 212d for totally reflecting at least a part of the light incident from the incident surface 212c. As shown in FIG. 15, the unit prisms 212e are extended along circular arcs of different radii around a point (center point) P at which a normal line from the light source part 22 relative to the prism sheet 210 (transmission type screen 200) crosses the prism sheet 210. The plurality of unit prisms 212e, which are arranged on the concentric arcs, form the prism part 212a. Similar to the optical deflecting element (Fresnel lens part) 113a in the first embodiment, the prism part (optical deflecting element) 212a may be formed by using an ultraviolet curing resin.

As shown in FIG. 17, the third anti-scattering layer 213 is integrally laminated on the emergent side of the first glass substrate 211 through the joining layer 214-2. If the first glass substrate 211 is, for example, broken and damaged, the third anti-scattering layer 213 exhibits a function for preventing scattering of pieces of the damaged first glass substrate 211. The third anti-scattering layer 213 may be formed by substantially uniformly mixing glass beads as a diffusing agent in a polyethylene terephthalate resin or the like so as to function as a diffusing part. A thickness of the third anti-scattering layer 213 may be, e.g., 188 μm.

According to the transmission type screen 200 in the third embodiment including the lenticular lens sheet (the optical diffusing sheet) 220 and the prism sheet 210 of the present invention, effects substantially the same as those of the transmission type screen shown in the first embodiment can be obtained. That is to say, according to the transmission type screen 200 in the third embodiment, it is possible to restrain the generation of a warp and a float of the optical diffusing sheet 220 or the prism sheet 210, which might be caused by changes in the environment such as temperature and humidity. It is also possible to restrain the generation of a flexure of the optical diffusing sheet 220 or the prism sheet 210, which might be caused by their own weights. Thus, the transmission type screen 200 can have a high degree of flatness, so that an image of high quality can be provided. Similar to the transmission type screen 100 shown in the first embodiment, according to the transmission type screen 200 in the third embodiment, if the first and second glass substrates 211 and 221 are, for example, broken and damaged, scattering of pieces of the damaged substrates can be prevented.

The transmission type screen 200 in the third embodiment can further provide the following effects. The optical deflecting sheet 210 in the third embodiment has, on the incident side of the transmission type screen 200, the optical deflecting element (prism part) 212a for deflecting imaging light incident thereon by totally reflecting the same. Thus, imaging light projected from the light source part 22 can be deflected at a large angle so as to emerge as substantially parallel light rays to the observation surface side (emergent side). Thus, as shown in FIG. 16, it is possible to position the light source part 22 below the transmission type screen 200, whereby the rear projection television 2 having a reduced thickness can be attained.

As in the rear projection television 2 in this embodiment, when an incident angle of the imaging light L is large, even a slight warp and float of the transmission type screen 200 significantly deteriorates an image quality. In particular, when a float or the like of the transmission type screen causes a deterioration in image quality, the further a point bearing away from the light source part 22 such as an upper side edge of the transmission type screen, the greater the image quality is affected. However, according to the transmission type screen 200 in this embodiment, the prism sheet 210 is formed by integrally laminating, on the highly rigid first glass substrate 211, all the rest layers constituting the prism sheet 210, and the lenticular lens sheet 220 is formed by integrally laminating, on the highly rigid second glass substrate 221, all the rest layers constituting the lenticular lens sheet 220. Thus, both the prism sheet 210 and the lenticular lens sheet 220 are not easily warped or floated, which might be caused by changes in the environment such as temperature and humidity, and are not easily inflected because of their own weights. Therefore, it is possible to significantly restrain a deterioration in an image of high quality, in the rear projection television 2 which is vulnerable to a warp, float, and flexure.

(Modifications of Third Embodiment)

(1) The lenticular lens sheet (the optical diffusing sheet) 220 in this embodiment is a member identical to the lenticular lens sheet 120 shown in the first embodiment. Thus, the modifications of the lenticular lens sheet 120 described in the first embodiment can be applied to the lenticular lens sheet 220 in this embodiment.

Figure 19:
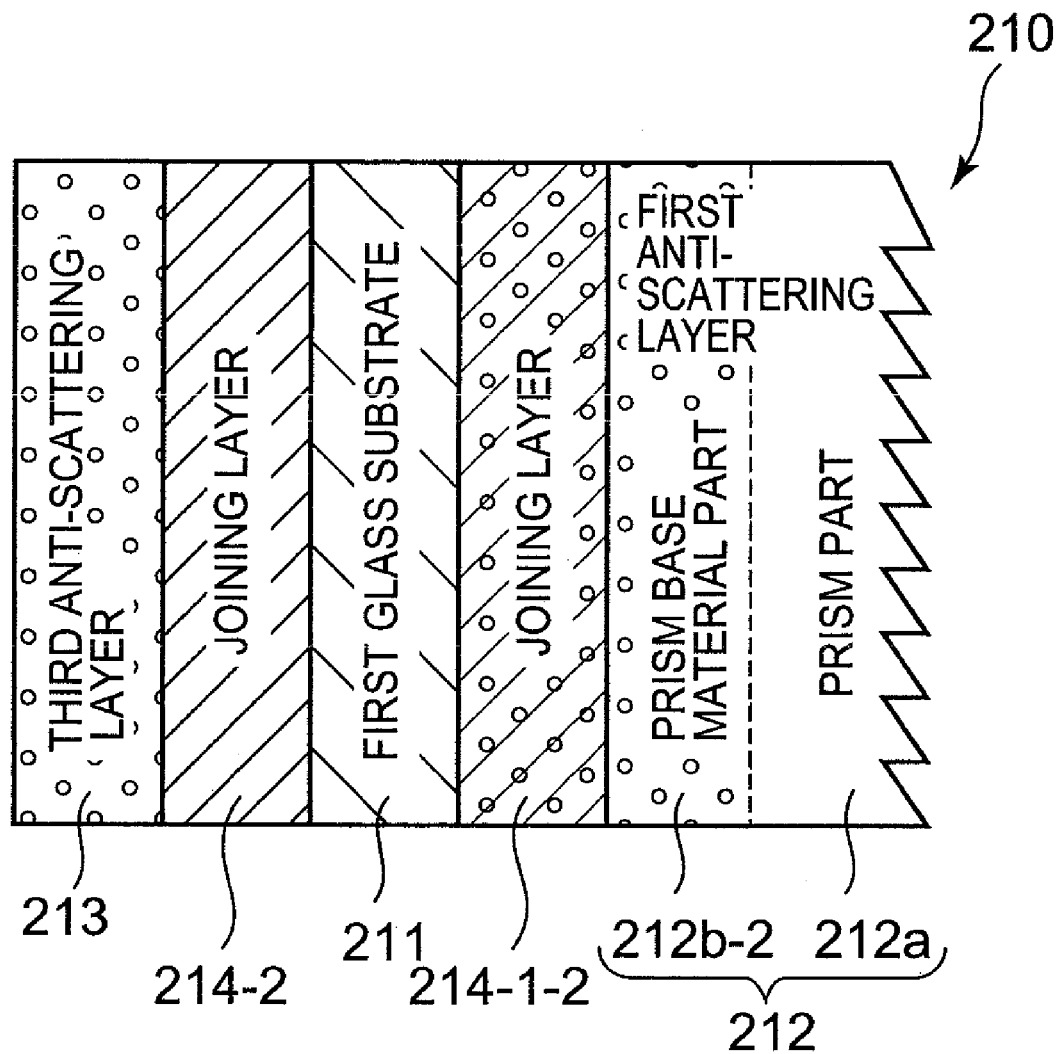
FIG. 19 is a schematic view of a layer structure of a modification of a prism sheet of the third embodiment of the transmission type screen.

(2) FIG. 19 is a schematic view of a layer structure of a modification of the prism sheet in the third embodiment of the transmission type screen.

In the prism sheet 210 in the third embodiment, a diffusing agent such as glass beads is substantially uniformly mixed in the prism base material part 212*b* of the first anti-scattering layer 212 and the third anti-scattering layer 213, so that they can have diffusing parts, respectively. However, a position of the layer functioning as a diffusing part where light is diffused without directivity and the number thereof are not specifically limited to this example, and can be suitably changed.

For example, as shown in FIG. 19, instead of mixing a diffusing agent in a prism base material part 212*b*-2 in a prism sheet 210, a diffusing agent may be substantially uniformly mixed in a joining layer 214-1-2, so that the joining layer 214-1-2 can have a diffusing part. Alternatively, although not shown, a diffusing agent may be mixed in a joining layer 214-2, so that the joining layer 214-2 can have a diffusing agent.

Alternatively, although not shown, instead of mixing a diffusing agent in the prism base material part 212*b* and the third anti-scattering layer 213 in the prism sheet 210, an additional layer may be laminated, or fine irregular-shaped portions may be formed on a surface of any of the layers. In addition, an all-purpose diffusing sheet or the like may be used as the third anti-scattering layer 213. Alternatively, an optical sheet, in which a lenticular lens having a weak diffusing effect is formed so as to diffuse light in the vertical or horizontal direction of the transmission type screen 200, may be used as the third anti-scattering layer 213.

Fourth Embodiment

Figure 20:
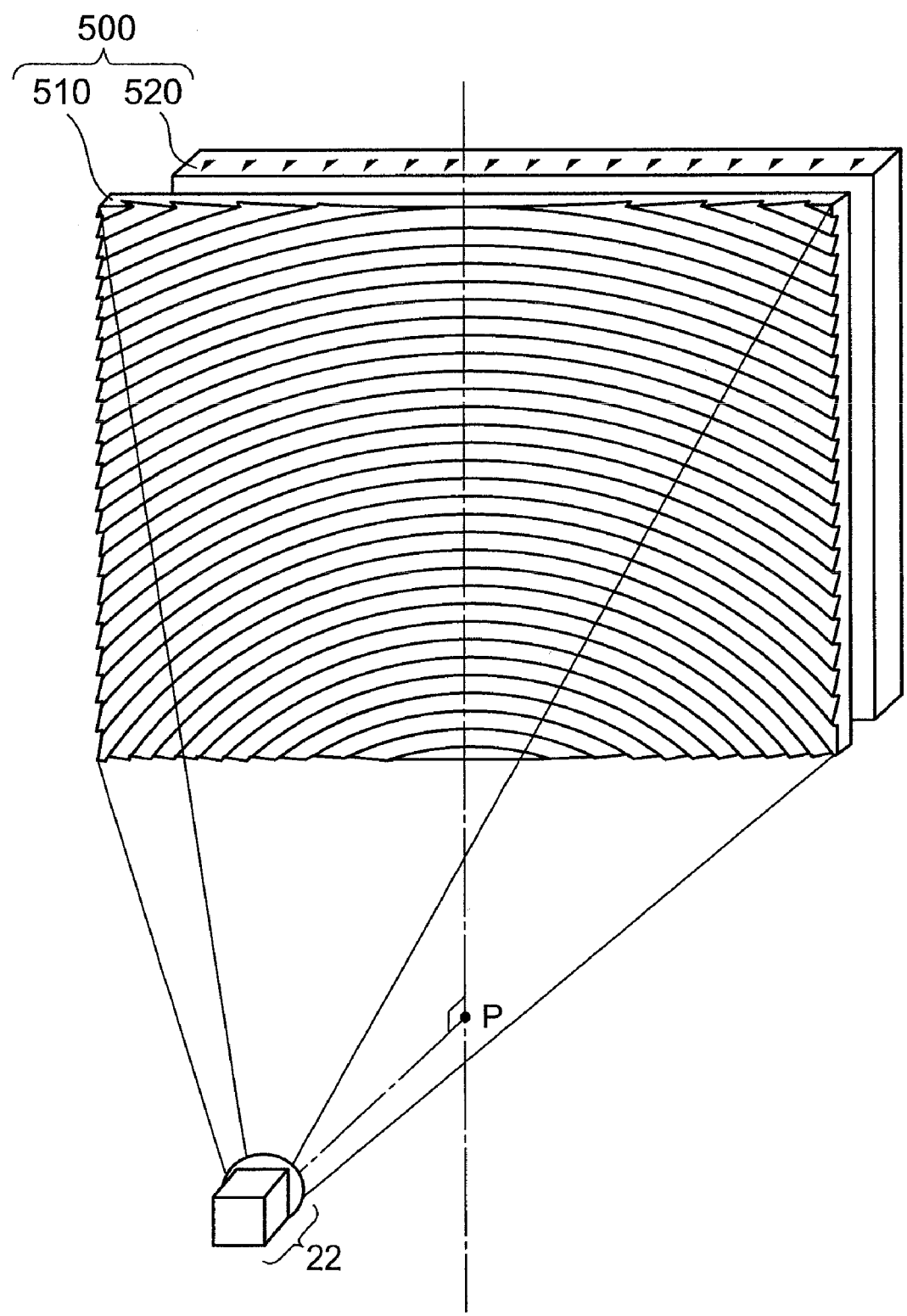
FIG. 20 is a perspective view of a fourth embodiment of the transmission type screen according to the present invention.

FIG. 20 is a view of a fourth embodiment of the transmission type screen according to the present invention. As shown in FIG. 20, the transmission type screen 500 includes an optical deflecting sheet 510 disposed on an incident side of imaging light L, and an optical diffusing sheet 520 disposed on an emergent side of the imaging light L. Similar to the transmission type screen 200 described in the third embodiment, the transmission type screen 500 in the fourth embodiment is used in the rear projection television 2 shown in FIG. 16.

In this transmission type screen, the optical deflecting sheet 510 is formed as a prism sheet having a prism part (an optical deflecting element), similar to the third embodiment. On the other hand, the optical diffusing sheet 520 includes an optical diffusing element formed by arranging a plurality of unit optical shape portions each having a total reflection surface, similar to the second embodiment.

Figure 21:
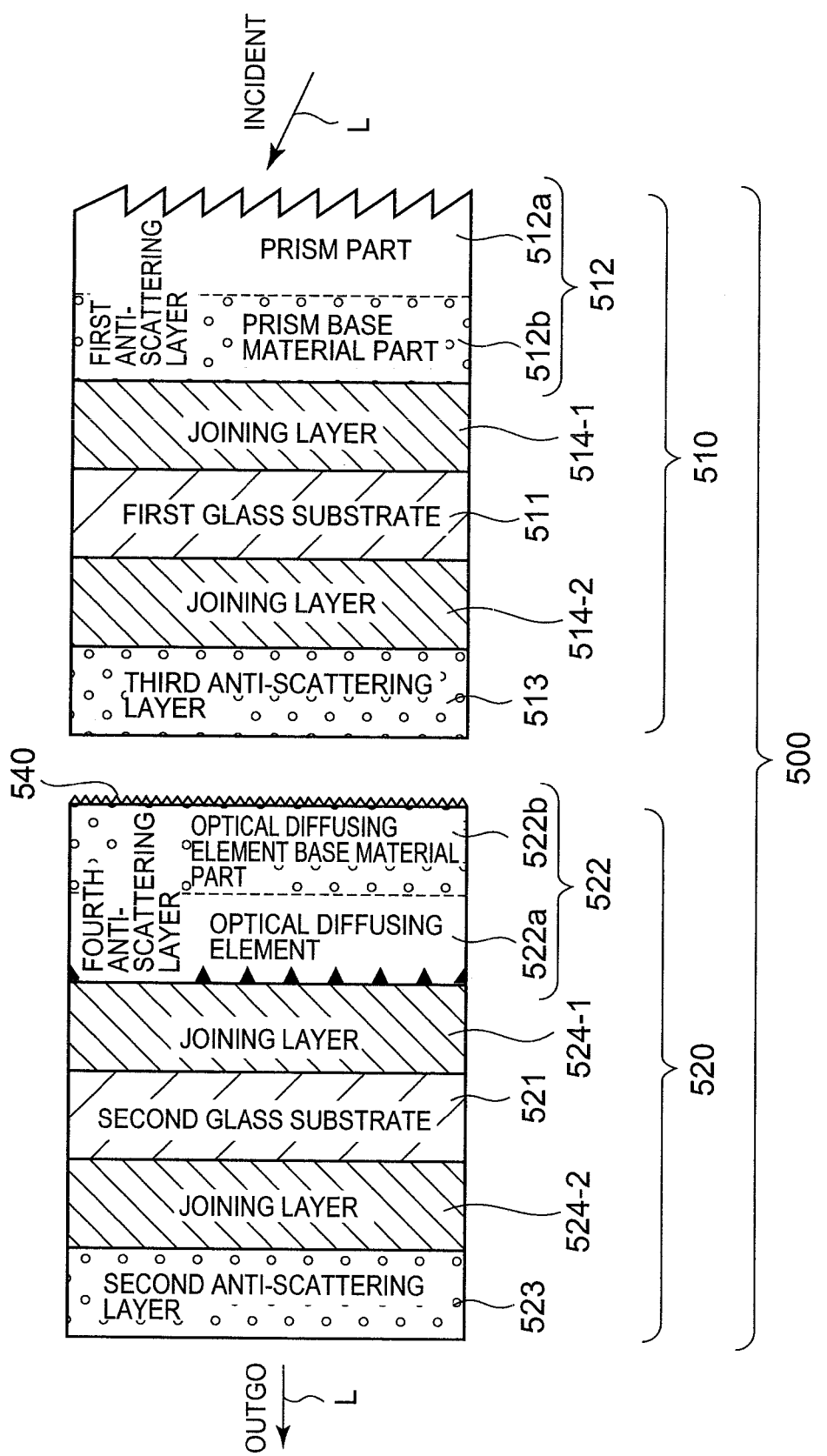
FIG. 21 is a schematic view of a layer structure of the fourth embodiment of the transmission type screen.

FIG. 21 is a schematic view of a layer structure of the transmission type screen in the fourth embodiment. The prism sheet 510 is a member identical to the prism sheet 210 described in the third embodiment. A first glass substrate 511, a first anti-scattering layer 512, a third anti-scattering layer 513, and joining layers 514-1 and 514-2, that are included in the prism sheet 510 in this embodiment, respectively correspond to the first glass substrate 211, the first anti-scattering layer 212, the third anti-scattering layer 213, and the joining layers 214-1 and 214-2, that are included in the prism sheet in the third embodiment, and thus have the same functions corresponding thereto. Therefore, the overlapping description for the prism sheet 510 in the fourth embodiment is omitted.

The optical diffusing sheet 520 is a member identical to the optical diffusing sheet 420 shown in the second embodiment. A second glass substrate 521, a second anti-scattering layer 523, a fourth anti-scattering layer 522 (including unit prism shape portions 440), and joining layers 524-1 and 524-2, that are included in the optical diffusing sheet 520, respectively correspond to the second glass substrate 421, the second anti-scattering layer 423, the fourth anti-scattering layer 422, and the joining layers 424-1 and 424-2, that are included in the optical diffusing sheet 420 in the second embodiment, and thus have the same functions corresponding thereto. Therefore, the overlapping description for the optical diffusing sheet 520 in the fourth embodiment is omitted.

According to the transmission type screen 500 in the fourth embodiment including the optical diffusing sheet 520 and the prism sheet (the optical deflecting sheet) 510 of the present invention, effects substantially the same as those of the transmission type screens described in the first to the third embodiments can be obtained.

For example, according to the transmission type screen 500 in the fourth embodiment, it is possible to restrain the generation of a warp and a float of the optical diffusing sheet 520 or the prism sheet 510, which might be caused by changes in the environment such as temperature and humidity. It is also possible to restrain the generation of a flexure of the optical diffusing sheet 520 or the prism sheet 510, which might be caused by their own weights. Thus, the transmission type screen 500 can have a high degree of flatness, so that an image of high quality can be provided. Similar to the transmission type screen 100 shown in the first embodiment, according to the transmission type screen 500 in the fourth embodiment, if the first and second glass substrates 511 and 521 are, for example, broken and damaged, scattering of pieces of the damaged substrates can be prevented.

The optical diffusing element 522*a* used in the optical diffusing sheet 520 can be easily manufactured at a high precision. Thus, the optical diffusing sheet, the optical deflecting sheet, and the transmission type screen that provide a image of high quality can be obtained at lower costs. In addition, the optical diffusing sheet 520 in the fourth embodiment enables a fine pitch, whereby an image having excellent fineness and quality can be achieved.

The optical deflecting sheet 510 in the fourth embodiment has, on the incident side of the transmission type screen 500, the optical deflecting element (prism part) 512*a* for deflecting imaging light incident thereon by totally reflecting the same. Thus, imaging light projected from the light source part 22 can be deflected at a large angle so as to emerge as substantially parallel light rays to the observation surface side (emergent side). Thus, as shown in FIG. 16, it is possible to position the light source part 22 below the transmission type screen 500, whereby the rear projection television 2 having a reduced thickness can be attained.

The transmission type screen 500 in the fourth embodiment can further provide the following effects. As in the rear projection television 2 shown in FIG. 16, when an incident angle of the imaging light L incident on the transmission type screen 500 is large, chromatic dispersion of colors due to dispersion of refractive index tends to occur at an outer periphery of the transmission type screen so as to generate chromatic non-uniformity. However, since the prism sheet 510 and the optical diffusing sheet 520 reflect light and emit the same, no chromatic dispersion occurs whereby chromatic non-uniformity can be reduced.

(Modification of Fourth Embodiment)

The prism sheet (the optical deflective sheet) 510 used in the transmission type screen 500 in this embodiment is a member identical to the prism sheet 210 shown in the third embodiment. Thus, the modifications of the prism sheet 210 described in the third embodiment can be applied to the prism sheet 510 in this embodiment.

The optical diffusing sheet 520 used in the transmission type screen 500 in this embodiment is a member identical to the optical diffusing sheet 420 shown in the second embodiment. Thus, the modifications of the optical diffusing sheet 420 described in the second embodiment can be applied to the optical diffusing sheet 520 in this embodiment.

Fifth Embodiment

Figure 22:
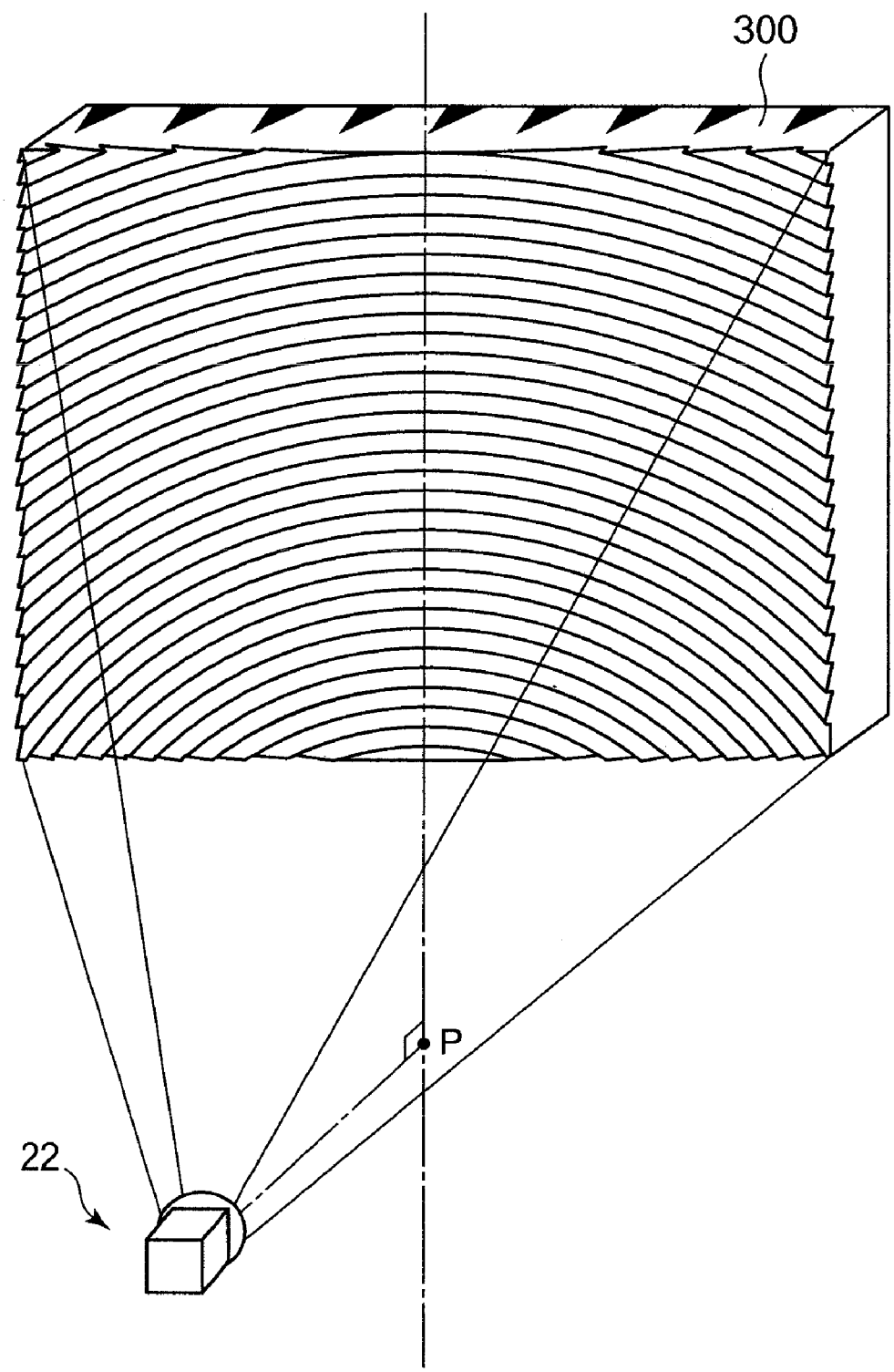
FIG. 22 is a perspective view of a fifth embodiment of the transmission type screen according to the present invention.
Figure 23:
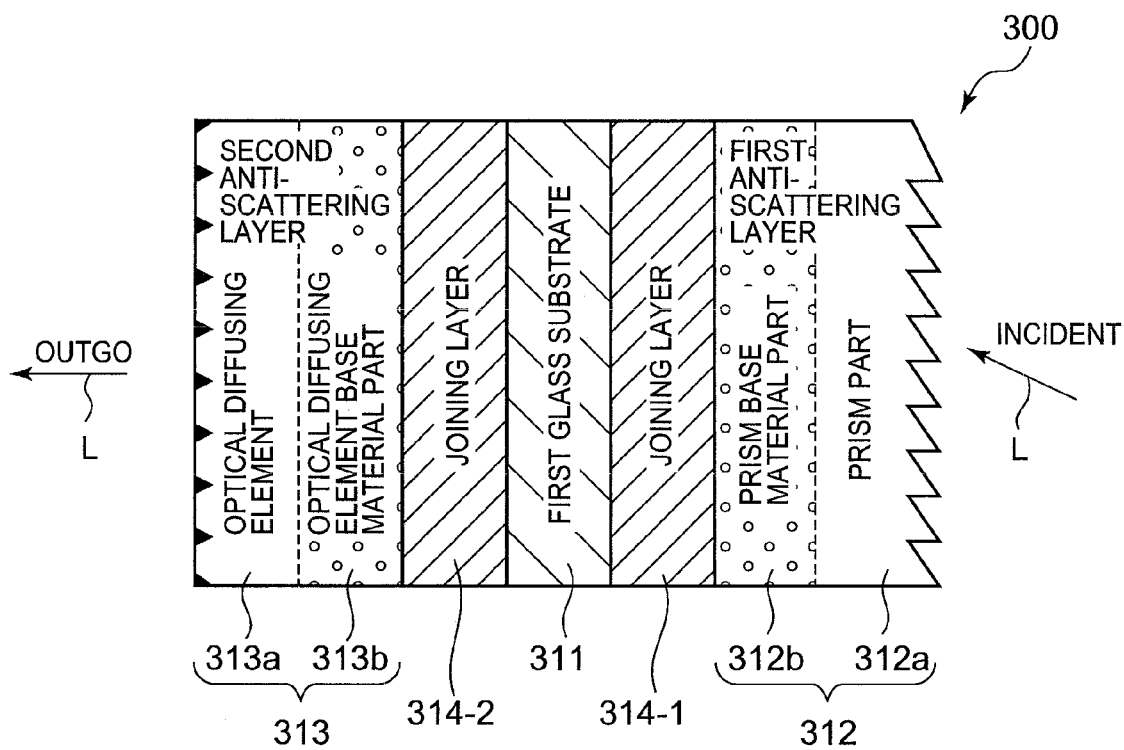
FIG. 23 is a schematic view of a layer structure of the fifth embodiment of the transmission type screen.

FIG. 22 is a view showing a fifth embodiment of the transmission type screen according to the present invention. FIG. 23 is a schematic view of a layer structure of the fifth embodiment of the transmission type screen.

The transmission type screen 300 in the fifth embodiment includes a prism sheet (optical deflecting sheet) including a first anti-scattering layer 312 having an optical deflecting element (prism part) 312a which is similar to the optical deflecting element (prism part) 212a described in the third embodiment. The transmission type screen 300 in this embodiment is used in the rear projection television 2 shown in FIG. 16, similar to the transmission type screen 200 shown in the third embodiment.

However, the transmission type screen 300 in the fifth embodiment does not include a diffusing sheet which is separate from the prism sheet. In this embodiment, the prism sheet (optical deflecting sheet) includes, on a position closest to the emergent side, a second anti-scattering layer 313 having the optical diffusing element 422a described in the second embodiment. The transmission type screen 300 in this embodiment is integrally constituted only by an optical deflecting sheet (prism sheet) including a first anti-scattering layer 312 having an optical deflecting element (prism part) 312a, and the second anti-scattering layer 313 having the optical diffusing element 422a.

As shown in FIG. 23, the transmission type screen 300 in the fifth embodiment is a prism sheet including a glass substrate 311, the first anti-scattering layer 312, the second anti-scattering layer 313, and joining layers 314-1 and 314-2. The glass substrate 311 is a highly rigid substrate layer with a high light-transmissibility and a high rigidity. The glass substrate 311 in this embodiment is a glass plate formed of silicate glass, with a thickness of 3 mm. In this embodiment, a transmittance of the glass substrate 311 relative to light whose wavelength band is between 400 nm and 700 nm is equal to or more than 90%. The joining layer 314-1 is a layer for integrally joining the glass substrate 311 and the first anti-scattering layer 312, while the joining layer 314-2 is a layer for integrally joining the glass substrate 311 and the second anti-scattering layer 313. Each of the joining layer 314-1 and 314-2 may be formed of an acryl resin of pressure sensitive adhesion type, and may be 20 μm in thickness.

The first anti-scattering layer 312 is integrally laminated on the incident side of the glass substrate 311 through the joining layer 314-1. If the glass substrate 311 is, for example, broken and damaged, the first anti-scattering layer 312 exhibits a function for preventing scattering of pieces of the damaged glass substrate 311. The first anti-scattering layer 312 includes an optical deflecting element base material part (prism base material part) 312b, and an optical deflecting element (prism part) 312a formed on one surface of the prism base material part 312b. Similar to the Fresnel lens part 113a described in the first embodiment, the prism part 312a may be formed by using an ultraviolet curing resin. The first anti-scattering layer 312 as a layered body composed of the prism base material part 312b and the prism part 312a is further laminated on the glass substrate 311.

The prism base material part 312b is a sheet-like member with a thickness of, e.g., 200 μm, that serves as a base for the first anti-scattering layer 312. The prism base material part 312b may be formed of an acryl resin in which glass beads as a diffusing agent are substantially uniformly mixed, so as to function as a diffusing part. The prism part 312a is formed in the same manner as that of the prism part 212b described in the third embodiment, and is formed by arranging concentrically a plurality of unit prisms. Each of the unit prisms has an incident surface on which light is incident, and a total reflection surface that totally reflects at least a part of the light incident from the incident surface so as to emit the same to the emergent side.

The second anti-scattering layer 313 is laminated on the emergent side of the glass substrate 311 through the joining layer 314-2. If the glass substrate 311 is, for example, broken and damaged, the second anti-scattering layer 313 exhibits a function for preventing scattering of pieces of the damaged glass substrate 311.

The second anti-scattering layer 313 includes an optical diffusing element base material part 313b, and an optical diffusing element 313a formed on one surface of the optical diffusing element base material part 313b. Similar to the Fresnel lens part 113a shown in the first embodiment, the optical diffusing element 313a may be formed by using an ultraviolet curing resin. The second anti-scattering layer 313 as a layered body composed of the optical diffusing element base material part 313b and the optical diffusing element 313a is further laminated on the glass substrate 311.

The optical diffusing element base material part 313b is a sheet-like member with a thickness of, e.g., 200 μm, that serves as a base for the second anti-scattering layer 313. The optical diffusing element base material part 313b may be formed of an acryl resin, in which glass beads are mixed as a diffusing agent, to function as a diffusing part.

The optical diffusing element 313a is formed on an emergent-side surface of the optical diffusing element base material part 313b. The optical diffusing element 313a is formed in the same manner as that of the optical diffusing element 422a described in the second embodiment, and is formed by arranging a plurality of unit optical shape portions. Each of the unit optical shape portions has a substantially trapezoidal-shaped cross section, and protrudes toward the emergent side.

In addition to the effects shown in the first embodiment, i.e., the improvement in flatness, and the anti-scattering effect of preventing scattering of pieces when the glass substrate 311 is broken, the transmission type screen 300 having such a layer structure in the fifth embodiment can provide the following effects. That is to say, the transmission type screen 300 in the fifth embodiment can be used as a one-piece transmission type screen, without combining a prism sheet and an optical diffusing sheet which are separate from each other. Thus, a thickness and a weight of the transmission type screen can be reduced, and a manufacturing cost thereof can be decreased.

In a transmission type screen including, in combination, a prism sheet and an optical diffusing sheet which are separate from each other, even when only one of the sheets is warped, a float (clearance) is undesirably generated between the sheets. Thus, there is a problem in that an image deterioration such as blurring of image is likely to occur. However, in the integrally-formed transmission type screen 300 in this embodiment, a unitary sheet-like member constitutes the transmission type screen, and the transmission type screen has a high degree of flatness. Thus, deterioration in image quality, which might be caused by a float or the like, can be prevented.

In addition, on the incident side of the transmission type screen 300 in the fifth embodiment, there is disposed the optical deflecting element (prism part) 312a that totally reflects and deflects imaging light incident thereon. Thus, imaging light projected from the light source part 22 can be deflected at a large angle so as to emerge as substantially parallel light rays to the observation surface side (emergent side). Thus, as shown in FIG. 16, it is possible to position the light source part 22 below the transmission type screen 200, whereby the rear projection television 2 having a reduced thickness can be attained.

(Modifications of Fifth Embodiment)

(1) In this embodiment, an example is provided to illustrate that the second anti-scattering layer 313 includes the optical diffusing element 313a formed by arranging a plurality of unit optical shape portions each having a substantially trapezoidal-shaped cross-section. However, not limited thereto, instead of the optical diffusing element 313a, a lenticular lens may be disposed that is formed by arranging a plurality of unit lenses each having a substantially semielliptic-shaped cross-section. Alternatively, the second anti-scattering layer 313 may have a highly omnidirectional diffusing effect, or an all-purpose diffusing sheet may be used as the second anti-scattering layer 313.

Figure 24:
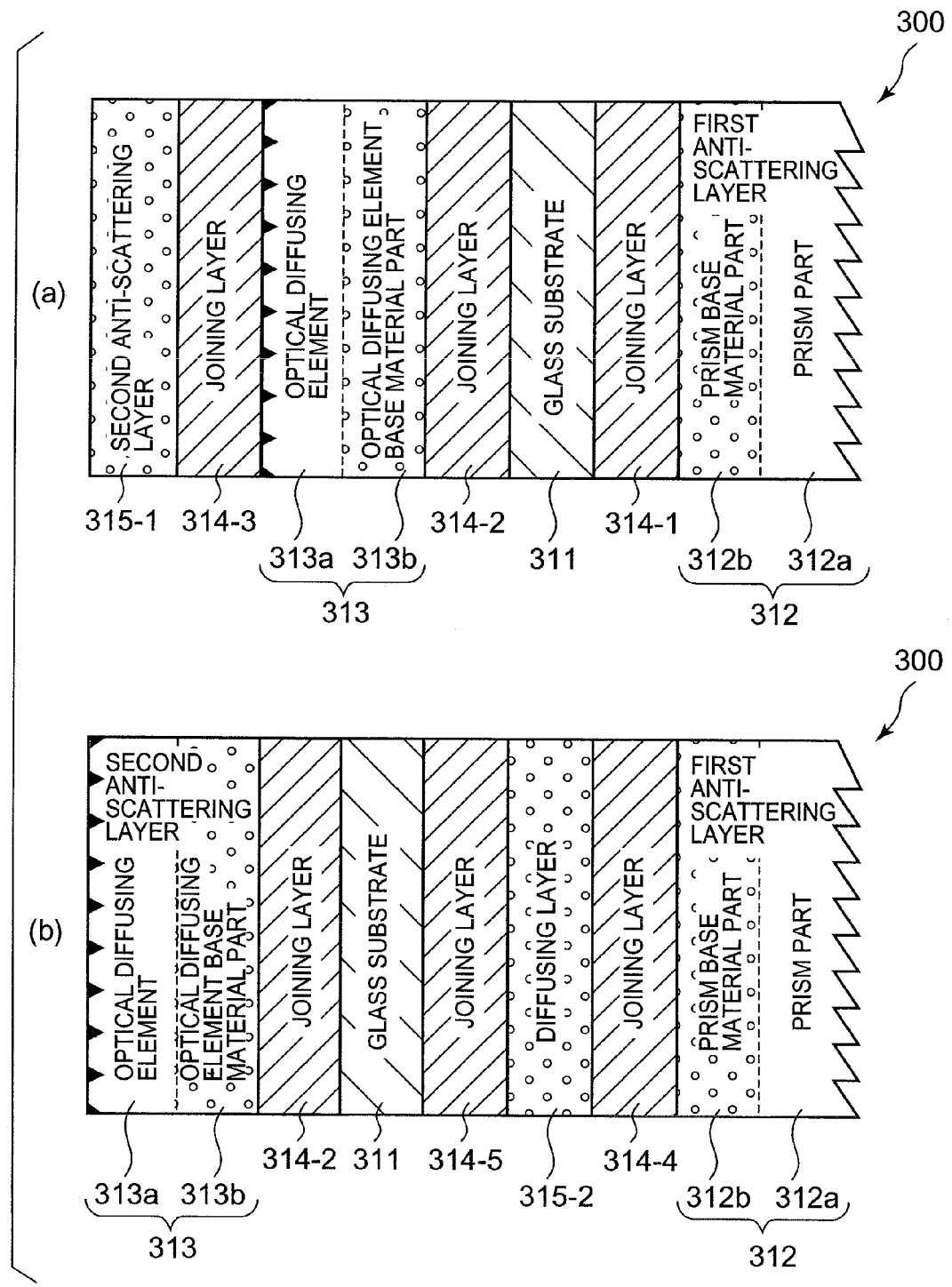
FIG. 24 is a schematic view of a layer structure of a modification of the first embodiment of the transmission type screen.
Figure 25:
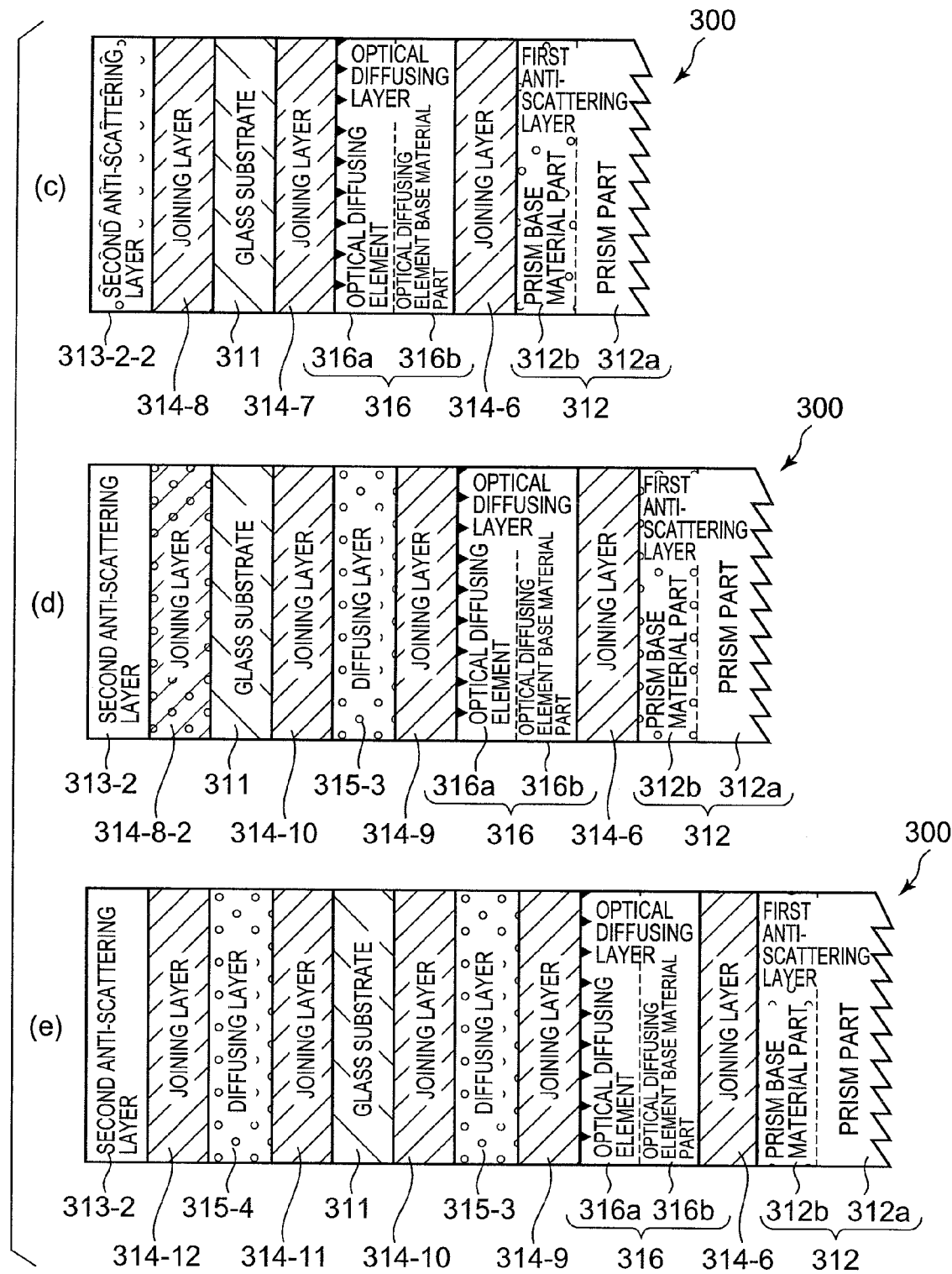
FIG. 25 is a schematic view of a layer structure of a modification of the fifth embodiment of the transmission type screen.

(2) FIGS. 24 and 25 are schematic views respectively showing layer structures of modifications of the fifth embodiment of the transmission type screen.

In the above-described transmission type screen 300 in the fifth embodiment, glass beads as a diffusing agent are mixed in the prism base material part 312b and the optical diffusing element base material part 313b, so that the prism base material part 312b and the optical diffusing element base material part 313b can function as diffusing parts. However, not limited to this example, a position of the layer functioning as a diffusing part and the number thereof in the sheet-like member are not specifically limited, which is similar to the above-described first to fourth embodiments. Although modifications of the diffusing part are shown below, a constitution of the diffusing part is not limited to the following modifications.

In the example shown in FIG. 24(a), an additional diffusing layer 315-1 serving as a second anti-scattering layer is laminated on a position closest to the emergent side of the transmission type screen 300 (prism sheet) through a joining layer 314-3. The diffusing layer 315-1 may be formed by mixing a diffusing agent such as glass beads in a polyethylene terephthalate resin or the like. A thickness of the diffusing layer 315-1 may be, for example, 188 μm. Alternatively, an all-purpose diffusing sheet may be used as the diffusing layer 315-1. The provision of the additional diffusing layer can improve a diffusion uniformity. In particular, imaging light diffused by an optical diffusing element 313a has a tendency of forming three peaks, that is to say, imaging light that is totally reflected by the optical diffusing element 313a in one direction, imaging light that is totally reflected by the optical diffusing element 313a in the other direction, and imaging light that is not totally reflected by the optical diffusing element 313a so as to pass through the optical diffusing element 313a. However, in the transmission type screen in this modification having the diffusing layer disposed on the emergent side from the optical diffusing element 313a, the imaging light is randomly diffused, whereby the transmission type screen 300 (prism sheet) can have a moderate luminance distribution. However, a lamination position of the additional diffusing layer is not specifically limited. For example, as shown in FIG. 24(b), the diffusing layer may be laminated between the glass substrate 311 and the first anti-scattering layer 312 through joining layers 313-4 and 314-5.

In the examples shown in FIG. 25(a) to 25(c), an optical diffusing layer 316 including an optical diffusing element 316a and an optical diffusing element base material part 316b, which respectively have the same constitutions as those of the optical diffusing element 313a and the optical diffusing element base material part 313b in the above-described fifth embodiment, is integrally joined between the first anti-scattering layer 313 and the glass substrate 311. That is to say, in the example shown in FIGS. 25(a) to 25(c), both the optical diffusing element 316a and the optical deflecting element (prism part) 312a are disposed on positions closer to the incident side than the glass substrate 311.

Specifically, in the transmission type screen shown in FIG. 25(a), an optical diffusing layer 316 for diffusing light is laminated between the first anti-scattering layer 312 and the glass substrate 311 through joining layers 314-6 and 314-7. In this example, a second anti-scattering layer 313-2 may be made to be a diffusing part (second anti-scattering layer 313-2-2) by mixing therein a diffusing agent. In this transmission type screen 300, an anti-reflection sheet having a function of preventing reflection, and an anti-glaring sheet having a function of preventing glaring may be laminated on the second anti-scattering layer 313-2 that is integrally laminated on the emergent side of the glass substrate 311 through a joining layer 314-8. Alternatively, in this transmission type screen 300, instead of mixing a diffusing agent in the second anti-scattering layer 312-2, a diffusing agent may be substantially uniformly mixed in the joining layer 314-8, for example, so that the joining layer 314-8 can have a diffusing part.

As shown in FIG. 25(d), an additional diffusing layer 315-3 may be further laminated on the transmission type screen 300 in FIG. 25(c). In the example shown in FIG. 25(d), the diffusing layer 315-3 is laminated between an optical diffusing layer 316 and a glass substrate 311 through joining layers 314-9 and 314-10. Alternatively, as illustrated, instead of mixing a diffusing agent in the second anti-scattering layer, a diffusing agent may be mixed in the joining layer 314-8-2 between the glass substrate 311 and the second anti-scattering layer 313-2, so that the joining layer 314-8-2 can have a diffusing part. In this example, an anti-reflection sheet having a function of preventing reflection, and an anti-glaring sheet having a function of preventing glaring may be laminated on the second anti-scattering layer 313-2.

Alternatively, as shown in FIG. 25(e), two or more additional diffusing layers 315-3 and 315-4 may be further laminated on the transmission type screen 300 in FIG. 25(c). The constitution of the transmission type screen shown in FIG. 25(e) on the incident side from a glass substrate is identical to that of the transmission type screen shown in FIG. 25(d). On the other hand, in the example shown in FIG. 25(e), a further additional diffusing layer 315-4 is laminated between the glass substrate 311 and a second anti-scattering layer 313-2 through joining layers 314-11 and 314-12. In the example shown in FIG. 25(e), an all-purpose anti-reflection sheet and an anti-glaring sheet may be laminated on the second anti-scattering layer 313-2.

(Modifications Common to the First to Fifth Embodiments)

Not limited to the above-described embodiments, various changes and alterations are possible.

(1) In the above-described first to fifth embodiments, an example is provided to illustrate that the transmission type screen includes only one layer having an optical diffusing element, which layer is also referred to as "optical diffusing layer". However, not limited thereto, the transmission type screen may have two or more optical diffusing layers. Such examples are described with reference to the drawings.

Figure 26:
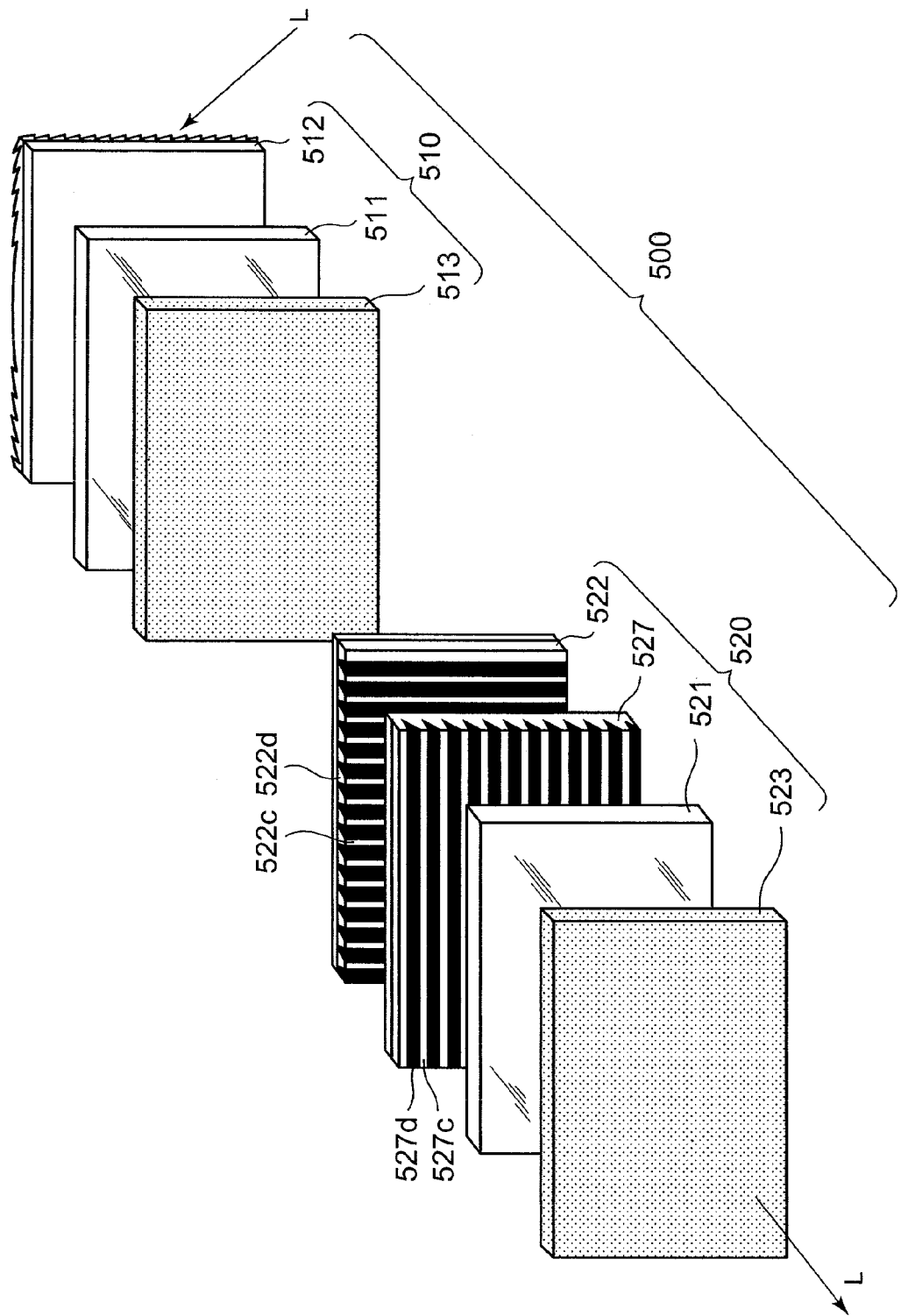
FIG. 26 is a perspective view of assistance in explaining a layer structure of a modification of the transmission type screen according to the present invention.
Figure 27:
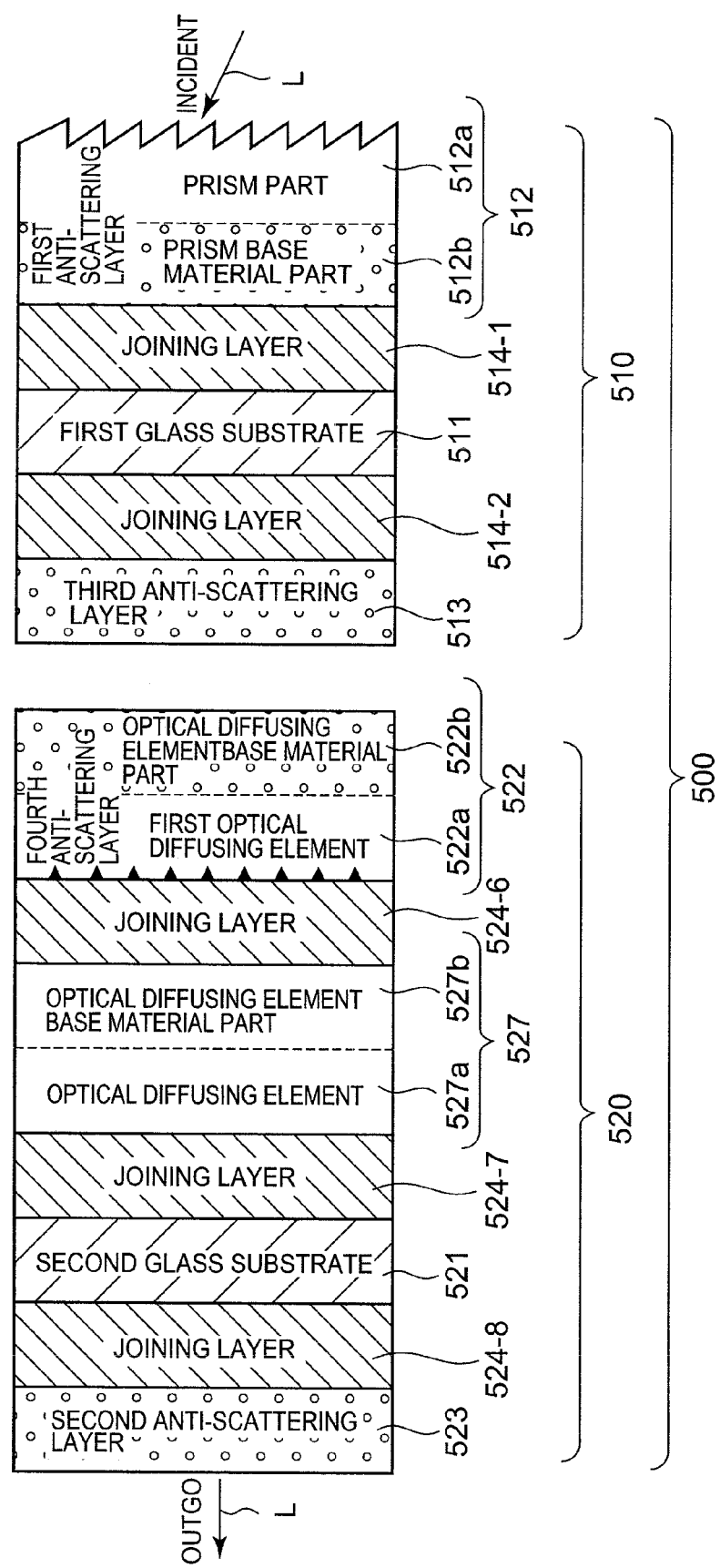
FIG. 27 is a schematic view of a layer structure of a modification of the transmission type screen according to the present invention.

FIG. 26 is a perspective view of assistance in explaining a layer structure of the transmission type screen including two or more optical diffusing elements. FIG. 27 is a schematic view of a layer structure of the transmission type screen shown in FIG. 26.

The transmission type screen 500 shown in FIGS. 26 and 27 is a modification of the transmission type screen 500 described referring to FIG. 21. In addition to the structure shown in FIG. 21, the transmission type screen 500 shown in FIGS. 26 and 27 further includes a second optical diffusing layer 527 having a second optical diffusing element 527a. The optical diffusing layer 527 is integrally joined between a second glass substrate 521 and a fourth anti-scattering layer 522 through joining layers 524-6 and 524-7.

As shown in FIG. 26, a first optical diffusing element 522a included in the fourth anti-scattering layer 522 is formed by arranging, in a horizontal direction, for example, a plurality of unit optical shape portions 522c each having a substantially trapezoidal-shaped cross-section. Thus, imaging light passing through the fourth anti-scattering layer (first optical diffusing layer) 522 is diffused in the horizontal direction. In the first optical diffusing element 522a, light absorbing parts 522d are buried between the respective unit optical shape portions 522c. Thus, as shown in FIG. 26, the light absorbing parts 522d are arranged in the horizontal direction corresponding to the unit optical shape portions 522c.

On the other hand, as shown in FIG. 26, the second optical element 527a included in the second optical diffusing element 527 is formed by arranging, in a vertical direction, for example, a plurality of unit optical shape portions 527c each having a substantially trapezoidal-shaped cross-section. Thus, imaging light passing through the second optical diffusing layer 527 is diffused in the vertical direction. In the second optical diffusing element 527a, light absorbing parts 527d are buried between the respective unit optical shape portions 527c. Thus, as shown in FIG. 26, the light absorbing parts 527d are arranged in the vertical direction corresponding to the unit optical shape portions 527c.

According to the transmission type screen 500, imaging light can be diffused by the two optical diffusing elements in two directions, preferably, in two directions perpendicular to each other, and more preferably in the vertical and horizontal directions. Then, patterns projected on the transmission type screen 500 can be observed from a wide viewing angle. The light absorbing parts arranged in two directions, preferably, two directions perpendicular to each other, can effectively absorb light other than imaging light, such as outside light or stray light, whereby a contrast can be significantly improved.

Figure 28:
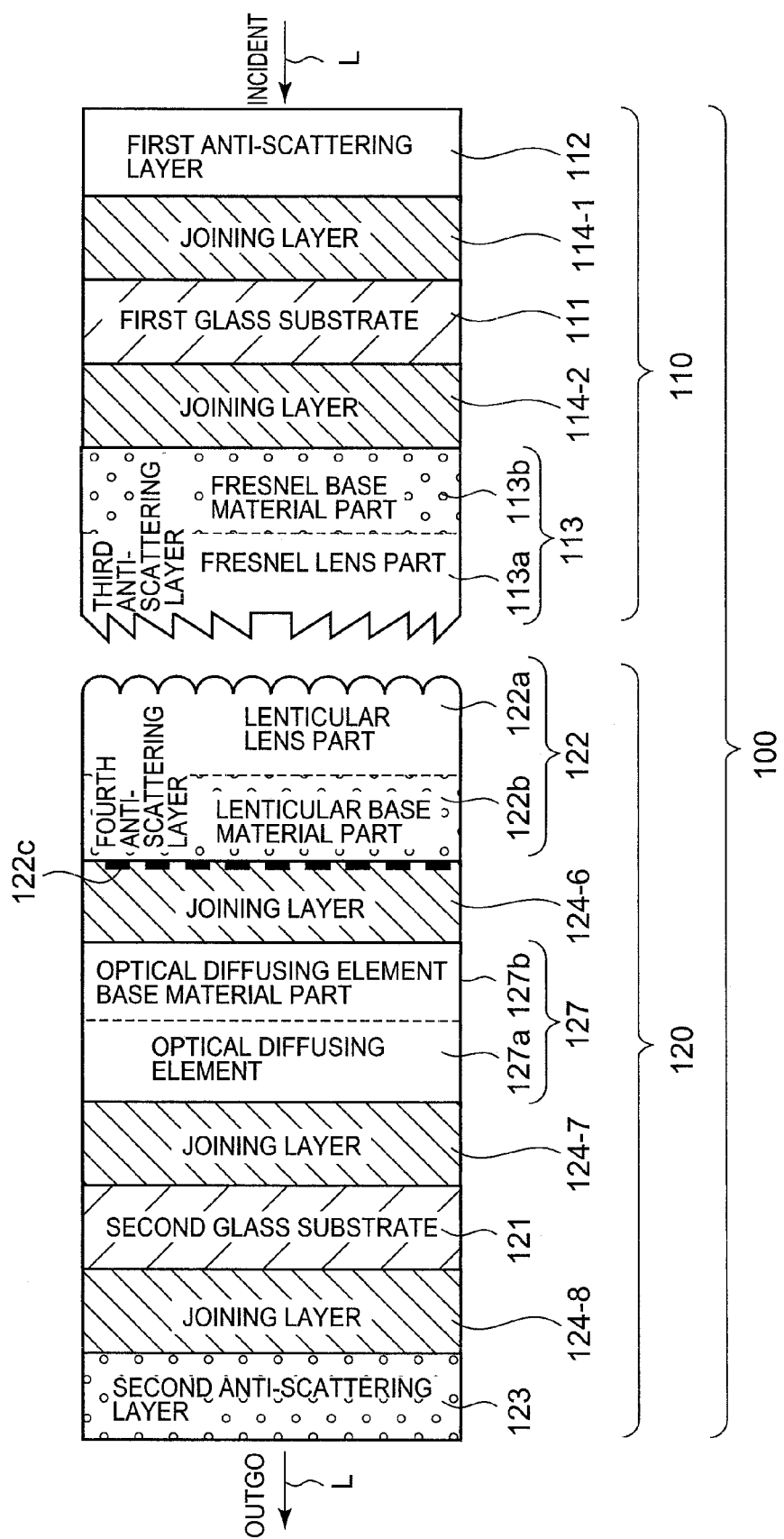
FIG. 28 is a schematic view of a layer structure of a modification of the transmission type screen according to the present invention.
Figure 29:
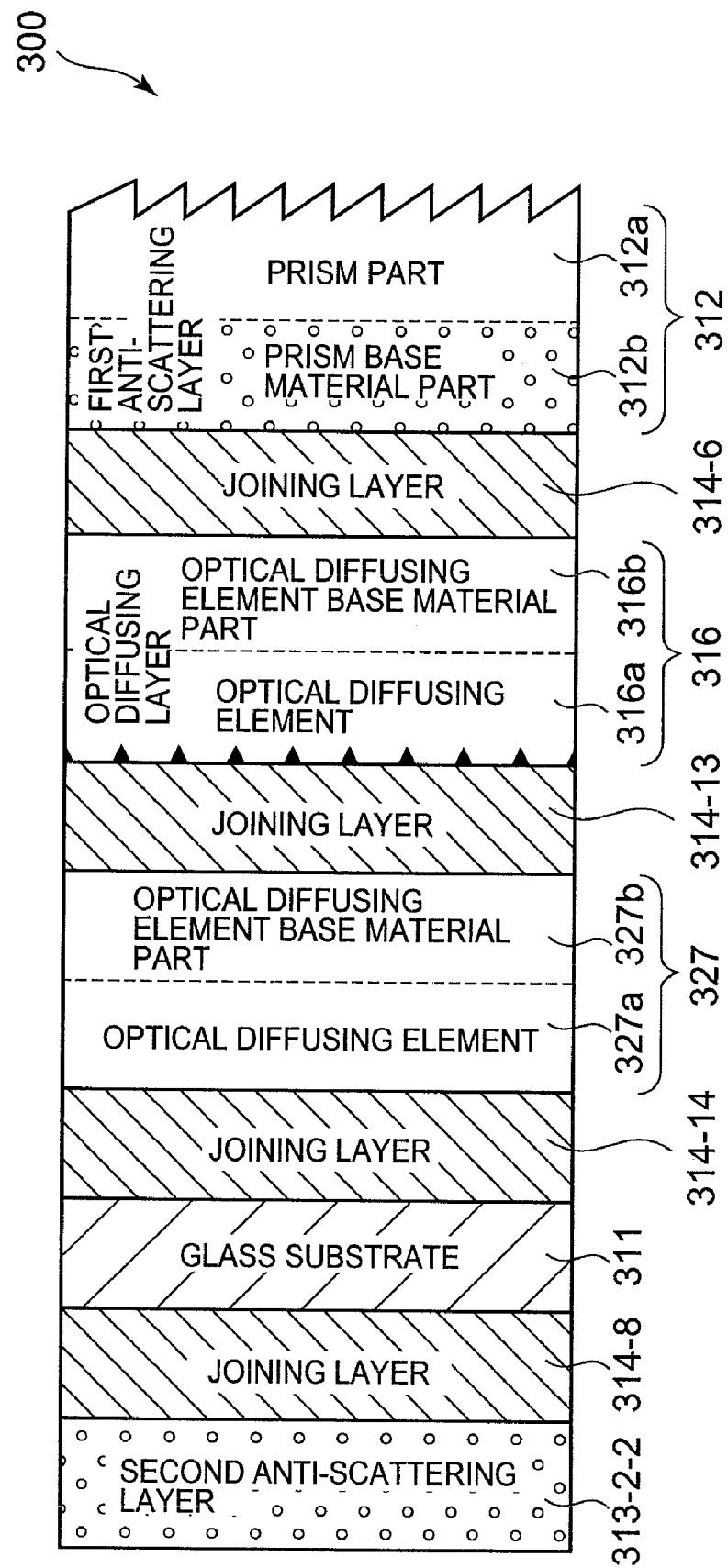
FIG. 29 is a schematic view of a layer structure of a modification of the transmission type screen according to the present invention.

The transmission type screen other than the fourth embodiment can be modified so as to include a plurality of optical diffusing layers. For example, the example shown in FIG. 28 is a modification of the transmission type screen in the first embodiment shown in FIG. 3. Besides, for example, the example shown in FIG. 29 is a modification of the transmission type screen in the fifth embodiment shown in FIG. 25(c). Both of the transmission type screens can enlarge a viewing angle and significantly enhance a contrast.

In these modifications, not limited to the illustrated ones, positions of the first diffusing layer and the second diffusing layer can be suitably changed. In addition to the optical diffusing element formed by arranging a plurality of unit optical shape portions each having a substantially trapezoidal-shaped cross-section described by using FIG. 13, the optical diffusing element to be used may be an optical diffusing element formed of a lenticular lens.

Figure 30:
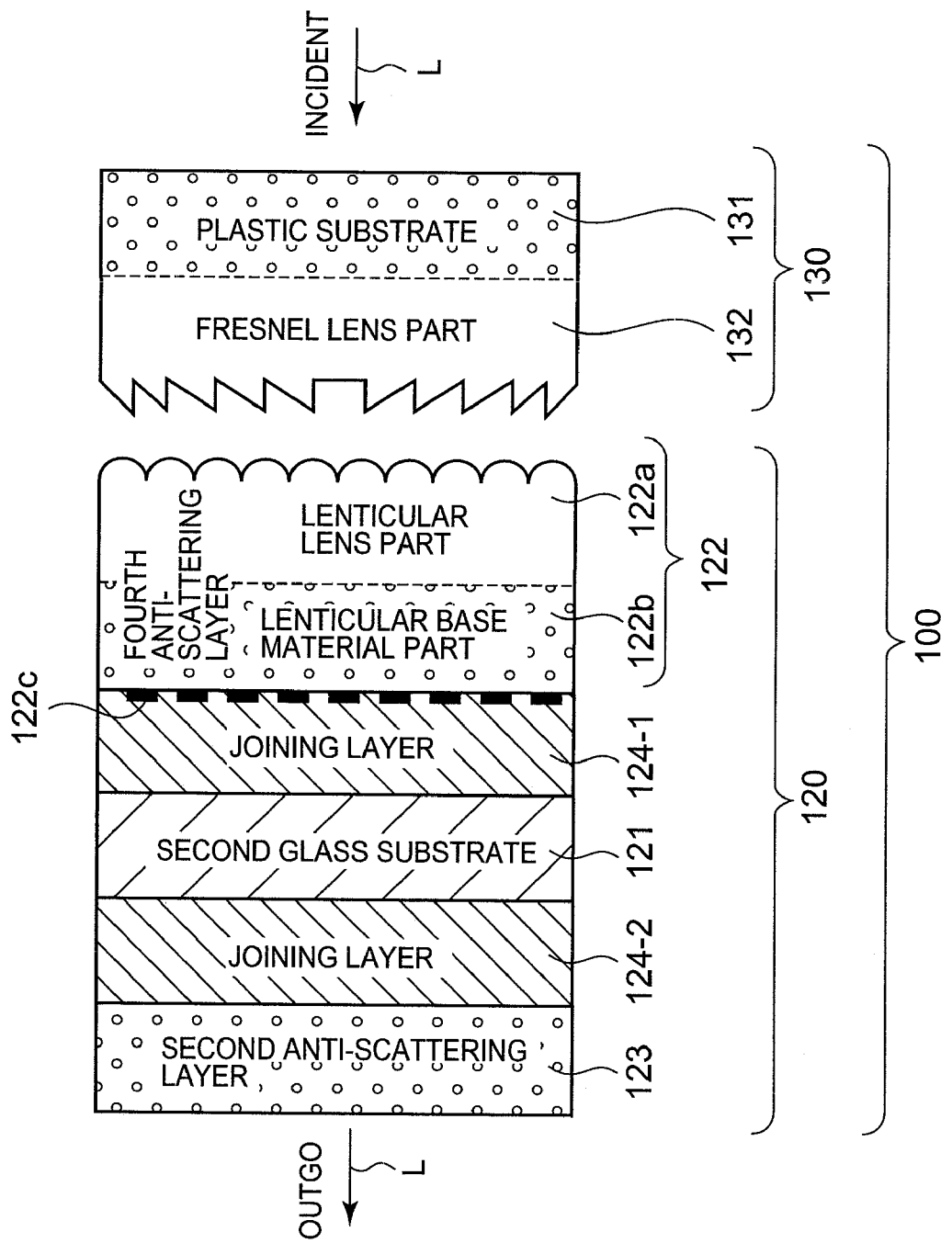
FIG. 30 is a schematic view of a layer structure of a modification of the transmission type screen according to the present invention.
Figure 31:
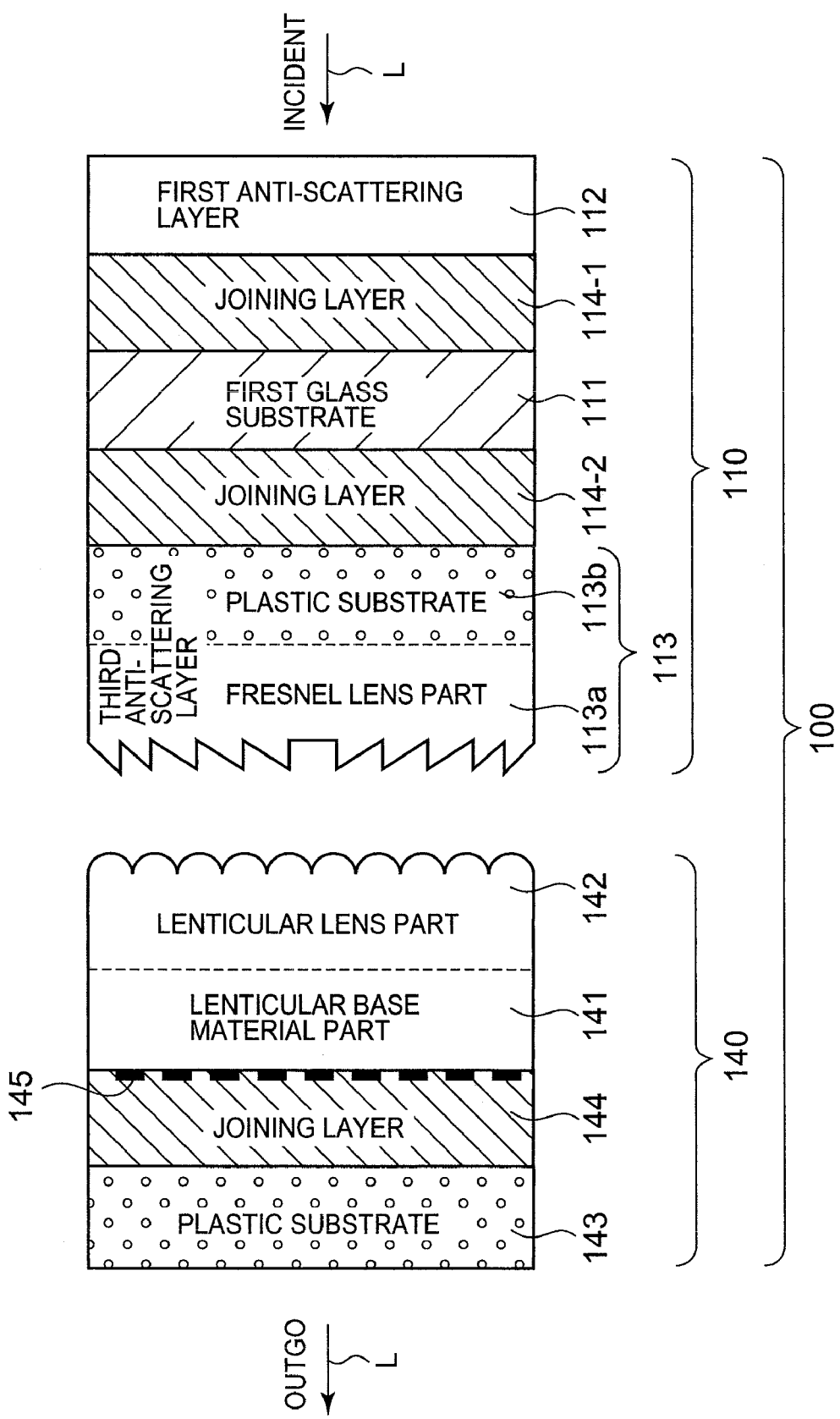
FIG. 31 is a schematic view of a layer structure of a modification of the transmission type screen according to the present invention.
Figure 32:
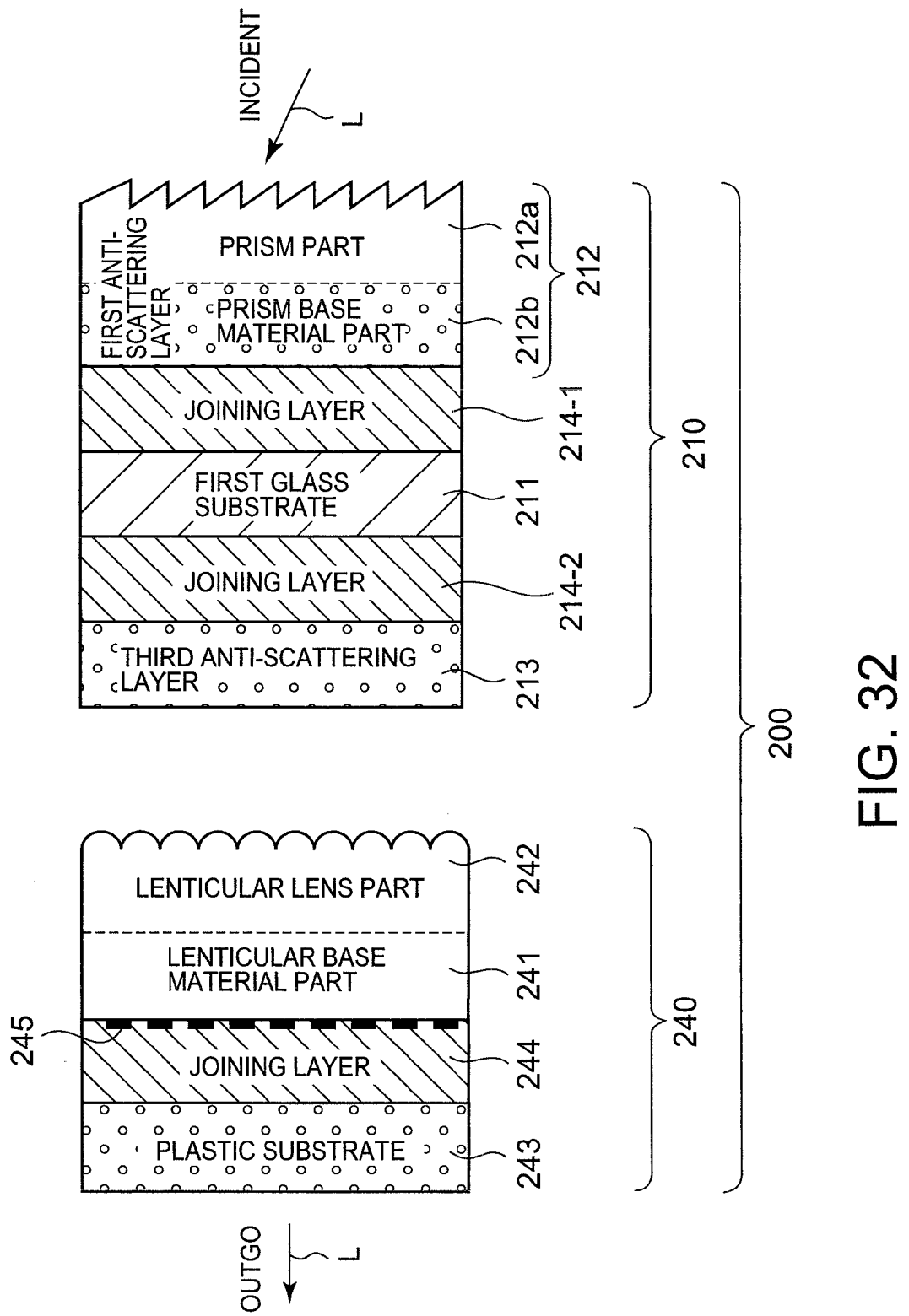
FIG. 32 is a schematic view of a layer structure of a modification of the transmission type screen according to the present invention.

(2) FIGS. 30 to 32 are schematic views of layer structures of modifications of the transmission type screen according to the present invention.

In the above-described first to fourth embodiments, although an example is provided to illustrate that each of the optical defecting sheet and the optical diffusing sheet used in the transmission type screen has the highly rigid substrate, the present invention is not limited thereto.

For example, as shown in FIG. 30, a Fresnel lens sheet 130 including a plastic substrate 131 formed of a plastic resin on which surface a Fresnel lens part 132 of substantially the same shape as that of the Fresnel lens part 113a that is formed by an ultraviolet curing resin may be used in combination with an optical diffusing sheet including a highly rigid substrate layer. The example shown in FIG. 30 is a modification of the transmission type screen in the first embodiment shown in FIG. 3. The plastic substrate 131 may be formed of an acryl resin, polystyrene resin, methyl methacrylate styrene copolymer resin (MS resin), methyl methacrylate butadiene styrene copolymer resin (MBS resin), and so on, and may be a plate-like member with a thickness of, e.g., 2 mm. As shown in FIG. 30, the plastic substrate 131 may function as a diffusing part by mixing therein a diffusing agent such as glass beads. Since it is technically easy to mix a diffusing agent in the plastic substrate 131, a manufacturing cost for such a transmission type screen can be decreased.

Since the Fresnel lens sheet 130 uses the plastic substrate 131, a weight of the transmission type screen can be reduced. However, a warp and a float of the Fresnel lens sheet 130 are likely to occur by changes in the environment. Thus, in order to restrain a warp and a float caused by changes in the environment, the transmission type screen is preferably constituted by the Fresnel lens sheet 130 with a curvature, such that the Fresnel lens sheet 130 is convex toward the lenticular lens sheet 120. By this constitution, a flatness of the Fresnel lens sheet 130 can be maintained.

Similarly, instead of a highly rigid substrate made of glass, the Fresnel lens sheet 410 shown in the second embodiment, the prism sheet 210 shown in the third embodiment, and the prism sheet 510 shown in the fourth embodiment may also use a substrate made of plastics.

In the first to fourth embodiments, the transmission type screen may use a substrate made of plastics in the optical diffusing sheet, instead of the highly rigid substrate made of glass. The example shown in FIG. 31 is such a modification of the transmission type screen in the first embodiment shown in FIG. 3. The example shown in FIG. 32 is such a modification of the transmission type screen in the third embodiment shown in FIG. 17. In the examples shown in FIGS. 31 and 32, lenticular lens parts 142 and 242 are respectively formed on incident-side surfaces of lenticular lens base material parts 141 and 241. Plastic substrates 143 and 243 are respectively formed on emergent-side surfaces of the lenticular lens base material parts 141 and 241 through joining layers 144 and 244.

In the examples shown in FIGS. 31 and 32, the lenticular lens base material parts 141 and 241 may be constituted in the same manner as that of the above-described plastic substrate 131 shown in FIG. 30. The joining layers 144 and 244 may be formed of an acryl resin of ultraviolet curing type, and may be 100 μm in thickness. The plastic substrates 143 and 243 may be formed by mixing a diffusing agent such as glass beads in a polystyrene resin, methyl methacrylate styrene copolymer resin (MS resin), methyl methacrylate butadiene styrene copolymer resin (MBS resin), and so on. Although it is preferable that the plastic substrates 143 and 243 have a thickness of 2 mm to 3 mm, the thickness is not specifically limited. In FIGS. 31 and 32, the plastic substrates 143 and 243 are illustrated to have a single layer structure. However, not limited thereto, the plastic substrates 143 and 243 may be of a two-layered structure including a diffusing layer containing therein a diffusing agent such as glass beads, and a layer without diffusing agent, or may be a multi-layered structure including an anti-reflection sheet having a function of preventing reflection.

(3) In the respective embodiments, in order to impart a diffusing function for diffusing light without directivity, glass beads as a diffusing agent is substantially uniformly mixed in the Fresnel base material parts 113b and 413b; the prism base material parts 212b, 312b, and 512b; the lenticular base material parts 122b and 222b, the optical diffusing element base material parts 313b, 422b, and 522b, the second anti-scattering layers 123, 223, 423, and 523; and the third anti-scattering layers 213 and 513. However, as has been described above, a method of imparting a diffusing function is not limited to these example. For example, a diffusing agent may be substantially uniformly mixed in the joining layers 114-1, 114-2, 124-1, 124-2, 214-1, 214-2, 224-1, 224-2, 314-1, 314-2, 414-1, 414-2, 424-1, 424-2, 514-1, 514-2, 524-1, and 524-2, so that a diffusing function is imparted to these joining layers.

Alternatively, it is possible to impart a diffusing function by forming fine irregular-shaped portions on a surface of any of the layers. In this case, a difference between refractive indexes of the adjacent two layers, between which a surface having the fine irregular-shaped portions is placed, is preferably large, which produces an excellent diffusing effect.

A diffusing agent is not specifically limited, and may be particles formed of an organic compound such as plastics. However, it is preferable that the diffusing agent have dimensions that are not dependent on a wavelength of light.

(4) In the transmission type screens 100, 200, 300, 400, and 500 of the respective embodiments, it is preferable that two or more layers which are not adjacent to each other have diffusing parts having a diffusing effect. In this case, it is possible not only to enlarge a viewing angle, but also to effectively reduce scintillation (glaring on the screen). When the number of layers having a diffusing part is two or more, a total amount of a diffusing agent to be mixed can be decreased.

As has been described above, a position of the layer functioning as a diffusing part is not specifically limited. However, it is not preferred that a diffusing agent is mixed in the first and second glass substrates 111, 121, 211, 221, 311, 411, 421, 511, and 521, since mixing of the diffusing agent therein makes the substrates fragile and easily to be broken.

(5) In the respective embodiments, the light source parts 21 and 22 are light sources of a single tube type using a DMD. However, not limited thereto, the light source parts 21 and 22 may be light sources of a single tube type using an LCD, for example. Alternatively, the light source part 21 in the first embodiment may be a light source of a triple tube type using a CRT.

(6) In the respective embodiments, the Fresnel base material parts 113b and 413b; the prism parts 212b, 312b, and 512b; the lenticular base material parts 122b and 222b; the optical diffusing element base material parts 313b, 422b, and 522b are formed of an acryl resin. However, not limited thereto, a material thereof is not specifically limited, and may be a polyester resin, polyethylene resin, polycarbonate resin, and so on, for example.

When the light source parts 21 and 22 are light sources having a polarization dependency, such as an LCD, it is possible to use, as these base material parts, a sheet-like member formed of cellulose based resins such as triacetyl cellulose, or a member with a low double refraction such as a non-stretched polycarbonate plate or the like, so as to reduce stray light and improve an image quality.

(7) In the respective embodiments, the Fresnel lens parts 113a and 413a formed of an ultraviolet curing resin are integrally formed on the Fresnel base material parts 113b and 413b, respectively. The optical diffusing elements 313a, 422a, and 522a formed of an ultraviolet curing resin are integrally formed on the optical diffusing element base material parts 313b, 422b, and 522b, respectively. The prism parts 212a, 312a, and 512a formed of an ultraviolet curing resin are integrally formed on the prism base material parts 212b, 312b, and 512b, respectively. The lenticular lens parts 122a and 222a formed of a thermoplastic resin are integrally formed on the lenticular base material parts 122b and 222b, respectively. However, materials forming the Fresnel lens parts, optical diffusing elements, prism parts, and lenticular lens parts are not limited to an ultraviolet curing resin and a thermoplastic resin, and can be suitably changed. For example, a heat curing resin may be used. A forming method of these parts is not specifically limited, and various methods such as extrusion molding or the like may be used.

(8) In the first to fourth embodiments, glass beads as a diffusing agent are mixed in the second anti-scattering layers 123, 223, 423, and 523, so that these layers can function as diffusing parts. However, not limited thereto, these layers may have at least one of the following functions: anti-reflection function, anti-glaring function, coloring function, dimmer function (light fading function), ultraviolet absorption function, antistatic function, soil-resistant function, sensing function, or hard-coating function. In this case, the following effects can be expected.

The second anti-scattering layers 123 and 223 are laminated on a position closest to the emergent side (closest to the observation surface side). Thus, when the second anti-scattering layers have an anti-reflection function, spoil by outside light can be effectively prevented. When the second anti-scattering layers have an ultraviolet absorption function, it is possible to prevent the lenticular base material parts 123b and 222b from turning yellow, which might be caused by ultraviolet light contained in outside light. When the second anti-scattering layers have an anti-glaring function, glaring on the screen can be restrained. When the second anti-scattering layers have a hard-coating function, a hardness of an exposed surface of the screen can be elevated, whereby the screen can be restrained from being scratched. When the second anti-scattering layers have an antistatic function, a static electricity generated on the transmission type screen can be removed, so that an attachment of dirt or the like on the screen can be prevented. When the second anti-scattering layers have a soil-resistant function, a surface of the screen can be prevented from being soiled. When the second anti-scattering layers have a coloring function and an dimmer function, a contrast can be enhanced to improve an image quality. When the second anti-scattering layers have a sensing function, the screen can be used in a touch sensor or the like.

Alternatively, an all-purpose sheet having at lest one of the following functions: diffusing function, anti-reflection function, anti-glaring function, coloring function (Tint), dimmer function (ND), ultraviolet absorption function, antistatic function, soil-resistant function, sensing function, or hard-coating function, may be used as the second anti-scattering layers 123, 223, 423, and 523. Alternatively, a sheet-like member formed of an acryl resin or the like may be subjected to a treatment so as to have at least one of these functions. Methods of imparting these functions are not specifically limited. For example, a plurality of sheets having the respective functions may be laminated, or a sheet may be subjected to a treatment so as to have a plurality of functions. Not limited to the second anti-scattering layers 123, 223, 423, and 523, other anti-scattering layers can suitably have these functions.

(9) In the first to fifth embodiments, the first glass substrates 111, 211, 411, and 511, and the second glass substrates 121, 221, 421, and 521, and the glass substrate 311 are glass plates made of silicate glass with a thickness of 2 mm or 3 mm. However, the constitution of the glass substrates is not limited thereto. As far as a material has a light-transmissibility and a high rigidity, no-alkali glass, phosphate glass, borate glass, soda-lime glass, kali glass, quartz glass, lead glass, barium glass, borosilicate glass, or phosphoric-base glass may be used as a material for a glass plate (highly rigid substrate). Alternatively, an air-blast cooling tempered glass and a chemically tempered glass may be used as a glass plate (highly rigid substrate). Besides, a plate-like member formed of light-transmissible ceramics with a light-transmissibility may be used as a glass plate (highly rigid substrate). A thickness of a member used as the substrate is preferably in a range between 1.5 mm to 3 mm, but is not limited thereto.

(10) In the first embodiment, the joining layers 114-1, 114-2, 124-1, and 124-2 are layers for integrally joining the first glass substrate 111 and the first anti-scattering layer 112, the first glass substrate 111 and the third anti-scattering layer 113, the second glass substrate 121 and the second anti-scattering layer 123, and the second glass substrate and the fourth anti-scattering layer 122. However, a diffusing agent such as glass beads may be substantially uniformly mixed in these joining layers, so that the joining layers can also function as diffusing parts. Alternatively, an ultraviolet absorbing agent may be mixed in the joining layer 124-2 positioned near a position closest to the emergent-side surface of the transmission type screen 100. In this case, the screen can be restrained from turning yellow, which might be caused by ultraviolet light contained in outside light. The same modification can be applied to the joining layers 214-1, 214-2, 224-1, 224-2, 314-1, 314-2, 414-1, 414-2, 424-1, 424-2, 514-1, 514-2, 524-1, and 524-2 in the second to fifth embodiments.

In the first to third embodiments, the joining layers 114-1, 114-2, 124-1, 124-2, 224-1, 224-2, 414-1, and 414-2 are formed of an acryl resin of ultraviolet curing type that cures by an ultraviolet irradiation. In the second to fifth embodiments, the joining layers 214-1, 214-2, 314-1, 314-2, 424-1, 424-2, 514-1, 514-2, 524-1, and 524-2 are formed of an acryl resin of pressure sensitive adhesion type which manifests an adhesion property when a pressure is applied thereto. However, materials used for these joining layers are not limited to these examples, and an acryl ester resin, phenol-base resins may be selected as a material for use in the joining layers. The joining manner is not specifically limited, and resins of heat curing type, ultraviolet curing type (UV curing type), electron radiation curing type (EB curing type), pressure sensitive adhesion type (PSA) or the like can be selected as a material for the joining layers. A thickness of the joining layer is preferably in a range of from 5 μm to 200 μm, but is not limited thereto.

(12) In the first to fifth embodiments, glass beads are used as a diffusing agent to be mixed in the respective layers. However, not limited thereto, a publicly-known diffusing agent including acryl-based diffusing agents and styrene-based diffusing agents may be used therefor. In the first to fifth embodiments, glass beads as a diffusing agent is substantially uniformly mixed in a polyethylene terephthalate resin or the like, in order to dispose an additional diffusing layer. However, not limited thereto, other publicly-known diffusing layers may be used, that are formed by, for example, mixing glass beads as a diffusing agent in PET, coating PET with various diffusing agents, or mixing various diffusing agent substantially uniformly in a polycarbonate resin.

The invention claimed is:

1. An optical deflecting sheet for use in a transmission type screen that emits imaging light projected from an incident side to an emergent side, comprising:
    a highly rigid substrate layer with a light-transmissibility and a high rigidity; and
    two or more layers laminated on the highly rigid substrate layer, the layers including at least a pair of anti-scattering layers disposed on opposite sides of the highly rigid substrate layer for preventing scattering of the highly rigid substrate layer;
    wherein at least one layer of the two or more layers includes an optical deflecting element that deflects imaging light by refracting or reflecting the imaging light;
    wherein the highly rigid substrate layer is formed of glass or translucent ceramic;
    wherein the optical deflecting element is a prism part formed by arranging a plurality of unit prisms each having an incident surface on which light is incident and a total reflecting surface for reflecting at least a part of light incident on the incident surface; and
    wherein at least another layer, that is different from the one layer of the two or more layers, includes an optical diffusing element that diffuses imaging light incident thereon, and the optical diffusing element is formed by arranging a plurality of unit optical shape portions each having a total reflecting surface that totally reflects at least a part of imaging light incident thereon.

2. The optical deflecting sheet according to claim 1, wherein
    the two or more layers further includes a layer including a second optical diffusing element formed by arranging the plurality of unit optical shape portions along the other direction substantially perpendicular to the one direction.

3. The optical deflecting sheet according to claim 1, wherein
    at least one of the two or more layers has a diffusing part, which is different from the optical diffusing element, that diffuses light.

4. The optical deflecting sheet according to claim 3, wherein
    at least one layer of the two or more layers that is laminated on a position closer to the incident side than the highly rigid substrate layer, and at least one layer of the two or more layers that is laminated on a position closer to the emergent side than the highly rigid substrate layer, have the diffusing parts, respectively.

5. The optical deflecting sheet according to claim 1, wherein
    the two or more layers includes a joining layer that is interposed between the highly rigid substrate layer and the anti-scattering layer so as to join the highly rigid substrate layer and the anti-scattering layer to each other; and
    the joining layer includes at least one of a diffusing agent for diffusing light and an ultraviolet absorbing agent for absorbing ultraviolet light.

6. A transmission type screen comprising the optical deflecting screen according to claim 1.

* * * * *

UNITED STATES PATENT AND TRADEMARK OFFICE
CERTIFICATE OF CORRECTION

PATENT NO.      : 7,885,003 B2
APPLICATION NO. : 11/575613
DATED           : February 8, 2011
INVENTOR(S)     : Daijiro Kodama, Tsuyoshi Kashiwagi and Kei Kato It is certified that error appears in the above-identified patent and that said Letters Patent is hereby corrected as shown below:

Title Page, please add:

Item (30), Foreign Application Priority Data

Jan. 11, 2005 (JP) ............... 2005-004484
Jan. 26, 2005 (JP) ............... 2005-017737
Jan. 26, 2005 (JP) ............... 2005-018575
Jan. 26, 2005 (JP) ............... 2005-018629
Jun. 29, 2005 (JP) ............... 2005-189313
Jul. 21, 2005 (JP) ............... 2005-211217
Jul. 21, 2005 (JP) ............... 2005-211230

Signed and Sealed this
Fifth Day of July, 2011

David J. Kappos
*Director of the United States Patent and Trademark Office*